US012682706B2

(12) United States Patent
Carter

(10) Patent No.: US 12,682,706 B2
(45) **Date of Patent: *Jul. 14, 2026**

(54) ACCESS MANAGEMENT SYSTEM

(71) Applicant: 1AHEAD Technologies, Charlotte, NC (US)

(72) Inventor: Ronald Carter, Matthews, NC (US)

(73) Assignee: 1HEAD Technologies, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,026

(22) Filed: Sep. 8, 2023

(65) Prior Publication Data

US 2024/0257592 A1 Aug. 1, 2024

Related U.S. Application Data

(63) Continuation of application No. 18/178,197, filed on Mar. 3, 2023, now Pat. No. 11,756,357, which is a (Continued)

(51) Int. Cl.
*G07C 9/00* (2020.01)
*B64C 39/02* (2023.01)
(Continued)

(52) U.S. Cl.
CPC ........ *G07C 9/00896* (2013.01); *B64C 39/024* (2013.01); *B64D 1/10* (2013.01);
(Continued)

(58) Field of Classification Search
CPC .. G07C 9/00896; G07C 9/00912; G07C 9/30; G07C 9/00563; G07C 9/00571;
(Continued)

(56) References Cited

U.S. PATENT DOCUMENTS 8,667,297 B2 3/2014 Salter et al.
8,689,249 B2 4/2014 Pino et al.
(Continued)

FOREIGN PATENT DOCUMENTS

WO 2013174983 A1 11/2013

OTHER PUBLICATIONS

Introducing Ring Always Home Cam: An Innovative New Approach to Always Being Home by Jamie Siminoff (Sep. 24, 2020) https://blog.ring.com/products-innovation/introducing-ring-always-home-cam-an-innovative-new-approach-to-always-being-home/, entire document.

(Continued)

*Primary Examiner* — Jared Walker
(74) *Attorney, Agent, or Firm* — Invention To Patent Services; Alex Hobson

(57) ABSTRACT

An access management system includes a mobile device with a processor and a memory and a software platform including at least a processor and a memory. The software platform is configured to analyze data obtained from the mobile device and other devices connected to the software platform. Specifically, the software platform is operable to determine if an access key received, read, or captured by a mobile device matches an access key for an authorized account, object, device, or space for the mobile device, and to provide access to the mobile device if the access key received, read, or captured by the mobile device matches the authorized access key.

16 Claims, 17 Drawing Sheets

Related U.S. Application Data continuation-in-part of application No. 18/157,464, filed on Jan. 20, 2023, now Pat. No. 11,854,328, which is a continuation-in-part of application No. 17/971,449, filed on Oct. 21, 2022, now Pat. No. 11,625,966, which is a continuation-in-part of application No. 17/900,362, filed on Aug. 31, 2022, now abandoned, which is a continuation-in-part of application No. 17/744,166, filed on May 13, 2022, now Pat. No. 11,468,723, which is a continuation-in-part of application No. 17/728,505, filed on Apr. 25, 2022, now Pat. No. 11,436,882, which is a continuation-in-part of application No. 17/591,883, filed on Feb. 3, 2022, now Pat. No. 11,398,120, which is a continuation-in-part of application No. 17/566,288, filed on Dec. 30, 2021, now Pat. No. 11,393,269, which is a continuation-in-part of application No. 17/556,483, filed on Dec. 20, 2021, now Pat. No. 11,403,901, which is a continuation-in-part of application No. 17/488,278, filed on Sep. 28, 2021, now Pat. No. 11,303,856, which is a continuation-in-part of application No. 17/469,863, filed on Sep. 8, 2021, now Pat. No. 11,790,713, and a continuation-in-part of application No. 17/363,262, filed on Jun. 30, 2021, now Pat. No. 11,151,825.

(60) Provisional application No. 63/407,611, filed on Sep. 16, 2022, provisional application No. 63/239,934, filed on Sep. 1, 2021, provisional application No. 63/228,433, filed on Aug. 2, 2021.

(51) Int. Cl.

| | |
|---|---|
| ***B64D 1/10*** | (2006.01) |
| ***B64D 47/02*** | (2006.01) |
| ***B64D 47/08*** | (2006.01) |
| ***G01S 19/01*** | (2010.01) |
| ***G05B 19/4155*** | (2006.01) |
| ***G06N 5/02*** | (2023.01) |
| ***G06Q 10/0836*** | (2023.01) |
| ***G06V 20/10*** | (2022.01) |
| ***G06V 20/52*** | (2022.01) |
| ***G07C 9/30*** | (2020.01) |
| ***G08B 3/10*** | (2006.01) |
| ***H04N 7/18*** | (2006.01) |
| *B64U 10/13* | (2023.01) |
| *B64U 101/30* | (2023.01) |
| *B64U 101/60* | (2023.01) |

(52) U.S. Cl.

CPC ............. *B64D 47/02* (2013.01); *B64D 47/08* (2013.01); *G01S 19/01* (2013.01); *G05B 19/4155* (2013.01); *G06N 5/02* (2013.01); *G06Q 10/0836* (2013.01); *G06V 20/10* (2022.01); *G06V 20/52* (2022.01); *G07C 9/00912* (2013.01); *G07C 9/30* (2020.01); *G08B 3/10* (2013.01); *H04N 7/185* (2013.01); *B64U 10/13* (2023.01); *B64U 2101/30* (2023.01); *B64U 2101/60* (2023.01); *G05B 2219/50391* (2013.01)

(58) Field of Classification Search

CPC ............ G07C 9/00309; G07C 9/00904; B64C 39/024; B64D 1/10; B64D 47/02; B64D 47/08; G01S 19/01; G05B 19/4155; G05B 2219/50391; G06N 5/02; G06N 3/008; G06N 3/0475; G06N 5/04; G06N 20/00; G06Q 10/0836; G06Q 10/083; G06Q 10/0832; G06Q 30/0613; G06Q 30/0641; G06V 20/10; G06V 20/52; G06V 20/625; G06V 40/1365; G06V 10/74; G06V 10/945; G06V 10/95; G06V 20/17; G06V 40/172; G08B 3/10; G08B 5/36; G08B 29/186; G08B 13/19619; G08B 13/1965; G08B 13/19652; G08B 13/19695; G08B 25/08; H04N 7/185; H04N 7/18; H04N 7/186; B64U 10/13; B64U 2101/30; B64U 2101/60; B64U 2101/31; B64U 2101/64; B64U 2201/102; B64U 50/39; B64U 70/90; B64U 50/37

See application file for complete search history.

(56) References Cited

U.S. PATENT DOCUMENTS

| | | | | |
|---|---|---|---|---|
| 8,945,017 | B2 | 2/2015 | Venkatraman et al. | |
| 9,005,129 | B2 | 4/2015 | Venkatraman et al. | |
| 9,063,330 | B2 | 6/2015 | LaValle et al. | |
| 9,365,188 | B1 | 6/2016 | Penilla et al. | |
| 9,499,128 | B2 | 11/2016 | Reh et al. | |
| 9,508,207 | B2 | 11/2016 | Kalb et al. | |
| 9,608,970 | B1 | 3/2017 | Gehret et al. | |
| 9,640,040 | B2 | 5/2017 | Irudayam et al. | |
| 9,646,165 | B1 | 5/2017 | Saylor | |
| 9,652,896 | B1 | 5/2017 | Jurgenson et al. | |
| 9,805,534 | B2 | 10/2017 | Ho et al. | |
| 9,842,447 | B2 | 12/2017 | Badger | |
| 9,870,698 | B2 | 1/2018 | Rabb et al. | |
| 9,911,290 | B1 | 3/2018 | Zalewski et al. | |
| 9,922,513 | B1 | 3/2018 | Hall et al. | |
| 9,923,879 | B1 | 3/2018 | Ziraknejad et al. | |
| 9,978,238 | B2 | 5/2018 | Fadell et al. | |
| 10,028,112 | B2 | 7/2018 | Child et al. | |
| 10,043,332 | B2 | 8/2018 | Scalisi et al. | |
| 10,083,006 | B1 | 9/2018 | Feuz et al. | |
| 10,147,249 | B1 * | 12/2018 | Brady | G07C 9/00571 |
| 10,467,891 | B1 | 11/2019 | Bart et al. | |
| 10,475,259 | B2 | 11/2019 | Carter | |
| 10,535,151 | B2 | 1/2020 | Bleyer et al. | |
| 10,586,114 | B2 * | 3/2020 | Potter | G08B 13/19602 |
| 10,635,907 | B2 | 4/2020 | Child et al. | |
| 10,643,412 | B1 * | 5/2020 | Yang | H04N 7/183 |
| 10,657,383 | B1 | 5/2020 | Solh et al. | |
| 10,715,791 | B2 | 7/2020 | Matson et al. | |
| 10,896,562 | B2 | 1/2021 | Carter | |
| 10,916,243 | B2 | 2/2021 | Devaraj et al. | |
| 11,132,877 | B2 | 9/2021 | Scalisi et al. | |
| 11,170,593 | B1 | 11/2021 | Schneider et al. | |
| 2005/0007451 | A1 * | 1/2005 | Chiang | G08B 13/19697 348/143 |
| 2006/0091206 | A1 | 5/2006 | Olsen et al. | |
| 2007/0103548 | A1 * | 5/2007 | Carter | H04N 7/144 348/E7.079 |
| 2007/0200914 | A1 * | 8/2007 | DuMas | G08B 13/19645 348/E7.086 |
| 2008/0036862 | A1 * | 2/2008 | Lang | H04N 7/186 348/E7.086 |
| 2008/0239072 | A1 * | 10/2008 | Cheng | H04N 7/186 348/143 |
| 2010/0017624 | A1 | 1/2010 | Chan et al. | |
| 2011/0248818 | A1 | 10/2011 | Hashim-Waris | |
| 2013/0017812 | A1 | 1/2013 | Foster | |
| 2013/0169802 | A1 * | 7/2013 | Chen | H04N 23/55 348/143 |
| 2013/0254548 | A1 | 9/2013 | Greene et al. | |
| 2014/0035721 | A1 | 2/2014 | Heppe et al. | |
| 2014/0267716 | A1 * | 9/2014 | Child | H04N 7/186 348/143 |
| 2014/0274013 | A1 | 9/2014 | Santavicca | |
| 2014/0373111 | A1 | 12/2014 | Moss et al. | |
| 2015/0022620 | A1 * | 1/2015 | Siminoff | H04M 1/0291 348/14.02 |

(56) References Cited

U.S. PATENT DOCUMENTS

| | | | | |
|---|---|---|---|---|
| 2015/0156031 | A1* | 6/2015 | Fadell | G08B 27/003 700/90 |
| 2015/0228281 | A1 | 8/2015 | Raniere | |
| 2016/0189503 | A1 | 6/2016 | Johnson et al. | |
| 2016/0219254 | A1 | 7/2016 | Hu et al. | |
| 2016/0266579 | A1 | 9/2016 | Chen et al. | |
| 2016/0351045 | A1 | 12/2016 | Salter | |
| 2017/0019700 | A1 | 1/2017 | Tseng | |
| 2017/0116835 | A1 | 4/2017 | Child et al. | |
| 2017/0249794 | A1 | 8/2017 | Davis | |
| 2018/0135336 | A1 | 5/2018 | Johnson et al. | |
| 2018/0178372 | A1 | 6/2018 | Lee et al. | |
| 2018/0191930 | A1* | 7/2018 | Jeong | H04N 23/51 |
| 2018/0233007 | A1 | 8/2018 | Williams | |
| 2019/0016511 | A1 | 1/2019 | Yang | |
| 2019/0025822 | A1 | 1/2019 | Sentosa et al. | |
| 2019/0033043 | A1 | 1/2019 | Piccioni | |
| 2019/0066485 | A1 | 2/2019 | Roberts et al. | |
| 2019/0156406 | A1 | 5/2019 | Landau et al. | |
| 2019/0263524 | A1 | 8/2019 | Sugaya | |
| 2019/0320867 | A1 | 10/2019 | Noh et al. | |
| 2019/0354220 | A1 | 11/2019 | Ribbich et al. | |
| 2020/0028672 | A1* | 1/2020 | Tang | H04L 9/3297 |
| 2020/0035050 | A1 | 1/2020 | Carter | |
| 2020/0126243 | A1 | 4/2020 | Bleyer et al. | |
| 2020/0279459 | A1 | 9/2020 | Singh et al. | |
| 2021/0029298 | A1* | 1/2021 | Mysore | H04N 23/66 |
| 2021/0080996 | A1 | 3/2021 | Hudman et al. | |
| 2021/0142603 | A1 | 5/2021 | Carter | |
| 2021/0160461 | A1 | 5/2021 | Martin et al. | |
| 2021/0351920 | A1* | 11/2021 | Tang | G07C 9/00309 |
| 2022/0189223 | A1 | 6/2022 | Carter | |
| 2023/0206708 | A1 | 6/2023 | Carter | |

OTHER PUBLICATIONS

Joshi et al. "GSM Based Security Automation System for Building Entry Management." (2019). 1-52 Jun. 30, 2019 (Jun. 30, 2019) Retrieved on Sep. 3, 2021 (Sep. 3, 2021) from https://ijsret.com/wp-contenUuploads/2019/05/IJSRET _ V5_issue3_297.pdf entire document.

* cited by examiner

ACCESS MANAGEMENT SYSTEM

CROSS REFERENCES TO RELATED APPLICATIONS

This application is related to and claims priority from the following U.S. patents and patent applications. This application is a continuation of U.S. patent application Ser. No. 18/178,197, filed Mar. 3, 2023, which is a continuation-in-part of U.S. patent application Ser. No. 18/157,464, filed Jan. 20, 2023, which is a continuation-in-part of U.S. patent application Ser. No. 17/971,449, filed Oct. 21, 2022, which is a continuation-in-part of U.S. application Ser. No. 17/900, 362, filed on Aug. 31, 2022, which is a continuation-in-part of U.S. application Ser. No. 17/744,166, filed on May 13, 2022, which is a continuation-in-part of U.S. application Ser. No. 17/728,505, filed on Apr. 25, 2022, which is a continuation-in-part of U.S. application Ser. No. 17/591,883, filed on Feb. 3, 2022, which is a continuation-in-part of U.S. application Ser. No. 17/566,288, filed on Dec. 30, 2021, which is a continuation-in-part of U.S. application Ser. No. 17/556,483, filed on Dec. 20, 2021, which is a continuation-in-part of U.S. application Ser. No. 17/488,278, filed on Sep. 28, 2021, now issued as U.S. Pat. No. 11,303,856, which is a continuation-in-part of PCT Application No. US2021/039812, filed on Jun. 30, 2021, and a continuation-in-part of U.S. application Ser. No. 17/469,863, filed on Sep. 8, 2021. PCT Application No. US2021/039812 is a continuation of U.S. application Ser. No. 17/363,262, filed on Jun. 30, 2021, now issued as U.S. Pat. No. 11,151,825, and a continuation-in-part of U.S. application Ser. No. 17/070,739, filed on Oct. 14, 2020, now issued as U.S. Pat. No. 11,128,840. U.S. application Ser. No. 17/363,262, filed on Jun. 30, 2021, is a continuation-in-part of U.S. application Ser. No. 17/070, 739, filed on Oct. 14, 2020, now issued as U.S. Pat. No. 11,128,840. U.S. application Ser. No. 17/488,278 is also a continuation-in-part of U.S. application Ser. No. 17/363, 262, filed on Jun. 30, 2021, which is a continuation-in-part of U.S. application Ser. No. 17/070,739, filed on Oct. 14, 2020, now issued as U.S. Pat. No. 11,128,840. U.S. application Ser. No. 17/488,278 also claims the benefit of and priority to U.S. Provisional Patent Application No. 63/228, 433, filed on Aug. 2, 2021, and the benefit of and priority to U.S. Provisional Patent Application No. 63/239,934, filed on Sep. 1, 2021. This application also claims the benefit of and priority to U.S. Provisional Patent Application No. 63/407, 611, filed Sep. 16, 2022. Each of the above referenced applications is hereby incorporated by reference herein in its entirety.

BACKGROUND OF THE INVENTION

1. Field of the Invention

The present application relates to security systems and entry management systems. More specifically, the present application relates to an artificial intelligence ("AI") entry management device, system, and method of using the same.

Description of the Prior Art

It is generally known in the prior art to provide doorbells with cameras. It is further known to provide geofencing, voice identification, voice recognition, and license plate readers.

Prior art documents include the following:

U.S. Pat. No. 10,607,461 for Drone based security system by inventor Williams, filed Jan. 31, 2018 and issued Mar. 31, 2020, discloses a drone security system with at least a drone and a drone base having been setup with locations that are part of a tradition security systems and where the traditional security system is in communication with drone base enabling the drone to respond to events that occur in the traditional security system and for the drone to also follow a predetermined path with checkpoints.

U.S. Pat. No. 8,689,249 for In-home system monitoring method and system having a video camera connected to a set-top box by inventors Pino, et al., filed Oct. 23, 2012 and issued Apr. 1, 2014, is directed to a method of receiving digital television programming content from a television service provider, receiving a first user input of a selected digital television programming content, receiving a message from a system, in response to receiving the message, causing a notification to be displayed on the television as an overlay over the displayed television programming content, receiving a first user command, determining a first control message to transmit to the system in response to receiving the first user command, transmitting the first control message. Also provided is a system including a video camera, an entry way security system, an HVAC system, a lighting system, an alarm system, or other system. User inputs may be received via a remote control to a set top box or from a computing device at a remote computer system through the internet and/or a mobile telephone network.

U.S. Pat. No. 11,170,593 for Multifunction smart door device by inventors Schneider, et al., filed May 5, 2020 and issued Nov. 9, 2021, is directed to multifunction smart door devices part of a system of multifunction smart door devices installed within or near stateroom doors of a cruise ship. Each smart door device can control access to a stateroom based on facial recognition or a wireless credential and can perform other functions such as controlling stateroom personalization features, providing an electronic peephole function, allowing controlled access for authorized crew members, accommodating remote unlocking, and providing notifications. Data obtained by the smart door devices can be provided to the cruise operator for service, safety, or security purposes, such as for anonymized foot traffic analysis, hazard detection, and stateroom access auditing. Smart door device functionality may be implemented in part by customers' mobile devices.

US Patent Publication No. 2021/0160461 for Smart home and security system by inventors Martin, et al., filed Nov. 25, 2020 and published May 27, 2021, is directed to a security and smart home system, components thereof, and associated methods. The system can include a host-carried monitor configured to monitor data associated with the host, such as motion data, position data, temperature data, or humidity data. The system can include one or more security devices located at a premises to monitor security data at the premises, with the one or more security devices in communication with a remote server programmed to process security event signals from the one or more security devices and transmit action instructions to the one or more security devices. Security devices can include an electrical power switch, an electrical power plug, and a camera.

US Patent Publication No. 2019/0354220 for Transparent display control device by inventors Ribbich, et al., filed May 15, 2019 and published Nov. 21, 2019, is directed to a control device for a building management system (BMS) including a touch screen display configured to mount to a mounting surface, a communications interface configured to communicate with the BMS, a near field communication (NFC) sensor configured to receive information from a NFC device, a microphone configured to detect vocal input, and a processing circuit coupled to the touch screen display. The processing circuit including a processor and memory coupled to the processor, the memory storing instructions thereon that, when executed by the processor, cause the control device to receive user input from at least one of the touch screen display, the NFC sensor, or the microphone, validate an identity of a user based on the user input, and cause the BMS to control an environmental variable of a space based on the validation.

U.S. Pat. No. 10,657,383 for Computer vision to enable services by inventors Solh, et al., filed Sep. 23, 2016 and issued May 19, 2020, is directed to computer vision for manual services. In some instances, a remote system may determine that a current time is within a threshold period of time of a scheduled service and, based on the determination, send a first message requesting image data to a camera apparatus located within an environment. After sending the first message, the remote system may receive image data associated with the environment from the camera apparatus and use the image to detect an object within the environment. The remote system can then send a second message to a device of a guest and a third message to a device of a user, where each of the second message and the third message indicates that the object is within the environment. In some instances, the object can include an animal while in some instances, the object can include a person.

U.S. Pat. No. 11,132,877 for Doorbell communities by inventors Scalisi, et al., filed Apr. 30, 2020 and issued Sep. 28, 2021, is directed to doorbells that can send data to each other to enable a first doorbell user to warn a second doorbell user regarding a suspicious visitor. A first user can indicate a first trait of a visitor via a first remote computing device. The first user can create a user group to enable the members of the user group to use their doorbells to take pictures of suspicious visitors and to send the pictures of the suspicious visitors to other members of the user group.

US Patent Publication No. 2019/0156406 for Method and system for apartment rental inspections without presence of brokers or rental agents by inventors Landau, et al., filed Nov. 22, 2017 and published May 23, 2019, is directed to a system for facilitating real estate (RE) unit rentals by intermediating landlords and potential tenants (PT) and enabling RE unit inspections and viewing without requiring on-site landlord representatives. The system includes a master-server facility including software modules and databases for executing system algorithms that enable and control communications between landlord communication devices, PT devices and apartment devices including a remote door lock, cameras and movement sensors. The door lock is remotely-operable and wirelessly controlled. The apartment devices include communication and monitoring devices temporarily installed in the RE units to enable RE unit inspections and viewing. The software modules including at least: a) a unit listing software; b) a tenant liaison module; c) an inspection scheduling module; d) a door opening module that sends to the PT devices at least one activation code for the door lock; and e) a tenant present module that verifies that the potential tenant is located in proximity to the entry door.

US Patent Publication No. 2021/0142603 for Secured delivery system and method of using same by inventor Carter, filed Jan. 15, 2021 and published May 13, 2021, is directed to a secured delivery system including a doorbell device comprising a scanner, and a locking mechanism operatively connected to the scanner a computer processor or a cloud server and a structure, such as a residence or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

U.S. Pat. No. 10,896,562 for Secured delivery system and method of using same by inventor Carter, filed Oct. 4, 2019 and issued Oct. 19, 2021, is directed to a secured delivery system including a doorbell device comprising a scanner, and a locking mechanism operatively connected to the scanner, a computer processor or a cloud server and a structure, such as a residence or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

U.S. Pat. No. 10,475,259 for Security system and method of using same by inventor Carter, filed Mar. 28, 2018 and issued Nov. 12, 2019, is directed to a security system including a doorbell device comprising a scanner, and a locking mechanism operatively connected to the scanner and a structure, such as a home or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

US Patent Publication No. 2021/0080996 for Adjustable head-mounted display by inventors Hudman, et al., filed Sep. 15, 2020 and published Mar. 18, 2021, is directed to a head-mounted display including a front, a back, a first actuator, a second actuator, a first adjustable member extending between the front and the back and operably engaging the first actuator, and a second adjustable member extending between the front and the back and operably engaging the second actuator. The first adjustable member and the second adjustable member may be adjustable in length via the second actuator to vary a gap distance between the front and the back. In some embodiments, the head-mounted display may include a wire routing assembly for routing wire(s) between the front and the back of the head-mounted display. Additionally, in some embodiments, the head-mounted display may include a harness for engaging a user.

US Patent Publication No. 2020/0126243 for Depth map with structured and flood light by inventors Bleyer, et al., filed Dec. 20, 2019 and published Apr. 23, 2020, is directed to a method including receiving an image of a scene illuminated by both a predetermined structured light pattern and a flood fill illumination, generating an active brightness image of the scene based on the received image of the scene including detecting a plurality of dots of the predetermined structured light pattern, and removing the plurality of dots of the predetermined structured light pattern from the active brightness image, and generating a depth map of the scene based on the received image and the active brightness image.

U.S. Pat. No. 10,715,791 for Virtual eyeglass set for viewing actual scene that corrects for different location of lenses than eyes by inventors Matson, et al., filed Apr. 28, 2016 and issued Jul. 14, 2020, is directed to a virtual eyeglass set including a frame, a first virtual lens and second virtual lens, and a processor. The frame may mount onto a user's head and hold the first virtual lens in front of the user's left eye and the second virtual lens in front of the user's right eye. A first side of each lens may face the user and a second side of each lens may face away from the user. Each of the first virtual lens and the second virtual lens may include a light field display on the first side, and a light field camera on the second side. The processor may construct, for display on each of the light field displays based on image data received via each of the light field cameras, an image from a perspective of the user's respective eye.

U.S. Pat. No. 9,063,330 for Perception based predictive tracking for head mounted displays by inventors LaValle, et al., filed May 22, 2014 and issued Jun. 23, 2015, is directed to a method of and apparatus for predictive tracking for a head mounted display. The method comprises obtaining one or more three-dimensional angular velocity measurements from a sensor monitoring the head mounted display and setting a prediction interval based upon the one or more three-dimensional angular velocity measurements such that the prediction interval is substantially zero when the head mounted display is substantially stationary and the prediction interval increases up to a predetermined latency interval when the head mounted display is moving at an angular velocity of or above a predetermined threshold. The method further includes predicting a three-dimensional orientation for the head mounted display to create a predicted orientation at a time corresponding to the prediction interval, and generating a rendered image corresponding to the predicted orientation for presentation on the head mounted display.

U.S. Pat. No. 10,535,151 for Depth map with structured and flood light by inventors Bleyer, et al., filed Aug. 22, 2017 and issued Jan. 14, 2020, is directed to a method including receiving an image of a scene illuminated by both a predetermined structured light pattern and a flood fill illumination, generating an active brightness image of the scene based on the received image of the scene including detecting a plurality of dots of the predetermined structured light pattern, and removing the plurality of dots of the predetermined structured light pattern from the active brightness image, and generating a depth map of the scene based on the received image and the active brightness image.

U.S. Pat. No. 9,652,896 for Image based tracking in augmented reality systems by inventors Jurgenson, et al., filed Nov. 30, 2015 and issued May 16, 2017, is directed to systems and methods for image based location estimation are described. In one example embodiment, a first positioning system is used to generate a first position estimate. A set of structure façade data describing one or more structure façades associated with the first position estimate is then accessed. A first image of an environment is captured, and a portion of the image is matched to part of the structure façade data. A second position is then estimated based on a comparison of the structure façade data with the portion of the image matched to the structure façade data.

U.S. Pat. No. 9,005,129 for Wearable heart rate monitor by inventors Venkatraman, et al., filed May 30, 2014 and issued Apr. 14, 2015, is directed to a biometric monitoring device used to determine a user's heart rate by using a heartbeat waveform sensor and a motion detecting sensor. In some embodiments, the device collects collecting concurrent output data from the heartbeat waveform sensor and output data from the motion detecting sensor, detects a periodic component of the output data from the motion detecting sensor, and uses the periodic component of the output data from the motion detecting sensor to remove a corresponding periodic component from the output data from the heartbeat waveform sensor. From this result, the device may determine and present the user's heart rate.

U.S. Pat. No. 8,945,017 for Wearable heart rate monitor by inventors Venkatraman, filed Jun. 3, 2014 and issued Feb. 3, 2015, is directed to a biometric monitoring device used to determine a user's heart rate by using a heartbeat waveform sensor and a motion detecting sensor. In some embodiments, the device collects collecting concurrent output data from the heartbeat waveform sensor and output data from the motion detecting sensor, detects a periodic component of the output data from the motion detecting sensor, and uses the periodic component of the output data from the motion detecting sensor to remove a corresponding periodic component from the output data from the heartbeat waveform sensor. From this result, the device may determine and present the user's heart rate.

U.S. Pat. No. 10,832,506 for Wireless device enabled locking system by inventors Myers et al, filed Jun. 23, 2017 and issued Nov. 10, 2020, is directed to an encrypted security system and associated methods for controlling physical access are described. The system includes a security server configured to receive a request for authentication from a mobile device, the request including information identifying the mobile device and a physical access control device. The security server forwards an encryption message including a plurality of unique identifiers to the physical access control device via the mobile device. The physical access control device is configured to authenticate the plurality of unique identifiers in the encryption message and operate an access control mechanism.

U.S. Pat. No. 11,151,816 for Methods and systems for access control and awareness management by inventors Schoenfelder et al., filed Jan. 4, 2014 and issued Oct. 19, 2021, is directed to systems and methods for access control management designed for multi-unit buildings. The disclosed systems can use mobile devices, a local mesh network, access control devices, and wireless communication to facilitate multi-unit real estate management. Mobile devices can download and use credentials to access appropriate areas and units in a building through local wireless communications with access control devices.

US Patent Pub. No. 2022/0036256 for Vehicle access control services and platform by inventors Zaid et al., filed May 17, 2021 and published Feb. 3, 2022, is directed to vehicle access control. In various embodiments, a vehicle reservation from a wireless communication device is received, the vehicle reservation is authenticated, and access to the vehicle is provided after authenticating the vehicle reservation. In various embodiments, a system for vehicle access control includes a vehicle access control component that is configured to provide access to a vehicle and a communication interface for communication with a wireless communication device, a communication interface for communication with a wireless communication device. Access to the vehicle is provided when a vehicle reservation is received from the wireless communication device.

U.S. Pat. No. 10,635,907 for Enhanced doorbell camera interactions by inventors Child et al., filed Apr. 17, 2017 and issued Apr. 28, 2020, is directed to techniques for enhanced interactions for a security automation system using a doorbell camera. One method includes detecting, by the doorbell camera, that a person is located within a distance threshold to an entry of a structure based on received sensor data; identifying, by the doorbell camera, a suggested security action for the security and automation system to perform based on the detecting; transmitting the suggested action to the security and automation system based on the identifying;

and broadcasting, via the doorbell camera, in response to the transmitting a message to the person located within the distance threshold.

U.S. Pat. No. 10,028,112 for Event triggered messaging by inventors Child et al., filed Sep. 21, 2016 and issued Jul. 17, 2018, is directed to apparatuses, techniques, and methods for a security and/or automation system. In some cases, these may include a first user recording a message and the message being broadcast or conveyed to a second user based on the second user's identity and/or location and/or a relevant time of recording or broadcasting, among other things. The methods may include receiving a first communication from a first user, storing the first communication in memory, identifying a second user at a first location, retrieving the first communication from memory, the retrieving based at least in part on the identification of the second user, and conveying the first communication to the second user at the first location.

U.S. Pat. No. 10,586,114 for Enhanced doorbell camera interactions by inventors Potter et al., filed Jan. 5, 2018 and issued Mar. 10, 2020, is directed to enhanced interactions for a security automation system using a doorbell camera. One method includes detecting, by the doorbell camera, an object located within a pre-determined distance from the doorbell camera; identifying, by the doorbell camera, a suggested security action for the security and automation system to perform based at least in part on the detecting; transmitting the suggested action to the security and automation system based at least in part on the identifying; and transmitting, in response to identifying the suggested security action, a message to a user associated with the security automation system regarding the suggested security action.

U.S. Pat. No. 10,083,006 for Intercom-style communication using multiple computing devices by inventors Feuz et al., filed Sep. 12, 2017 and issued Sep. 25, 2018 describes improved intercom-style communication using a plurality of computing devices distributed about an environment. In various implementations, voice input may be received, e.g., at a microphone of a first computing device of multiple computing devices, from a first user. The voice input may be analyzed and, based on the analyzing, it may be determined that the first user intends to convey a message to a second user. A location of the second user relative to the multiple computing devices may be determined, so that, based on the location of the second user, a second computing device may be selected from the multiple computing devices that is capable of providing audio or visual output that is perceptible to the second user. The second computing device may then be operated to provide audio or visual output that conveys the message to the second user.

U.S. Pat. No. 10,916,243 for Messaging from a shared device by inventors Devaraj et al., filed Dec. 27, 2016 and issued Feb. 9, 2021 describes methods and systems for facilitating communications between shared electronic devices. In some embodiments, a group account may be assigned to a shared electronic device. The group account may include one or more user accounts, where individuals associated with those user accounts may interact with the shared electronic device, and also may form a part of the group account. When a message is sent from one shared electronic device to another personal device or shared electronic device, the message may be indicated as being sent from the group account, as if the shared electronic device corresponds to its own separate account. In some embodiments, speaker identification processing may be employed to determine a speaker of the message and, if the speaker is able to be identified, the message may be sent from the corresponding speaker's user account instead of the shared electronic device's corresponding group account.

SUMMARY OF THE INVENTION

The present invention relates to a security management system operable to communicate with a plurality of other network devices.

Many consumers today purchase goods on the Internet from online retailers, and this form of shopping is expected to increase in the years to come. This form of shopping, which has become commonplace, requires the purchased goods to be shipped to the purchaser. Often, the goods are packaged and delivered to the residence of the purchaser while the purchaser is not home, and the packaged goods are merely left unsecured by the door of the purchaser's residence. Of course, such packages are prone to being stolen, resulting in significant financial loss to someone in the online retailer chain.

Therefore, a need exists for improved security management systems and methods of use thereof.

One object of the present invention is to provide an artificial intelligence (AI) entry management (EM) device for an entry management (EM) system. The AI EM device includes a camera, a microphone, a motion detector, a speaker, and a housing. In one embodiment, the housing includes a shape (e.g., oval shape) with a substantially open middle. In another embodiment, the housing is solid within the shape (e.g., oval shape). The substantially open middle includes a housing protrusion portion configured to house the camera, the microphone, the motion detector, and the speaker. In one embodiment, an AI EM device or AI EM system, as described herein, is part of a smart-home device that has other functions, such as opening other entry points to a property or building, turning on lights, setting temperature for a heating or air conditioning system and the like.

In one embodiment, the present invention includes an access management system including an access management device including a processor, a memory, and a microphone, and a software platform including at least a processor and a memory, wherein the access management device is operable to receive audio via the microphone, wherein the access management device is operable to send the audio or a transcription of the audio to the software platform, wherein the audio or the transcription of the audio includes at least one recipient account, and wherein the software platform is operable to send the audio or the transcription of the audio to the at least one recipient account.

In another embodiment, the present invention includes an access management system including an access management device including a processor, a memory, a camera, and a microphone, and a software platform including at least a processor and a memory, wherein the access management device is operable to receive audio via the microphone, wherein the software platform is operable to authorize an identity of a user associated with the audio via voice recognition, facial recognition, or recognition of a virtual key associated with the user upon the audio or an image including facial features of the user or the virtual key associated with the user being captured by the access management device, wherein the access management device is operable to send the audio or a transcription of the audio to the software platform, wherein the audio or the transcription of the audio includes at least one recipient account, and wherein the software platform is operable to send the audio or the transcription of the audio to the at least one recipient account.

In yet another embodiment, the present invention includes an access management system including an access management device including a processor, a memory, a camera, and a microphone, and a software platform including at least a processor and a memory, wherein the access management device is operable to receive audio via the microphone, wherein the access management device is operable to send the audio or a transcription of the audio to the software platform, wherein the audio or the transcription of the audio includes at least one recipient account, wherein the software platform is operable to send the audio or the transcription of the audio to the at least one recipient account, and wherein the audio or the transcription of the audio is sent via a short message service (SMS) text message, an email communication, or a mobile application push message to the at least one recipient account.

These and other aspects of the present invention will become apparent to those skilled in the art after a reading of the following description of the preferred embodiment when considered with the drawings, as they support the claimed invention.

DETAILED DESCRIPTION

Figure 1:
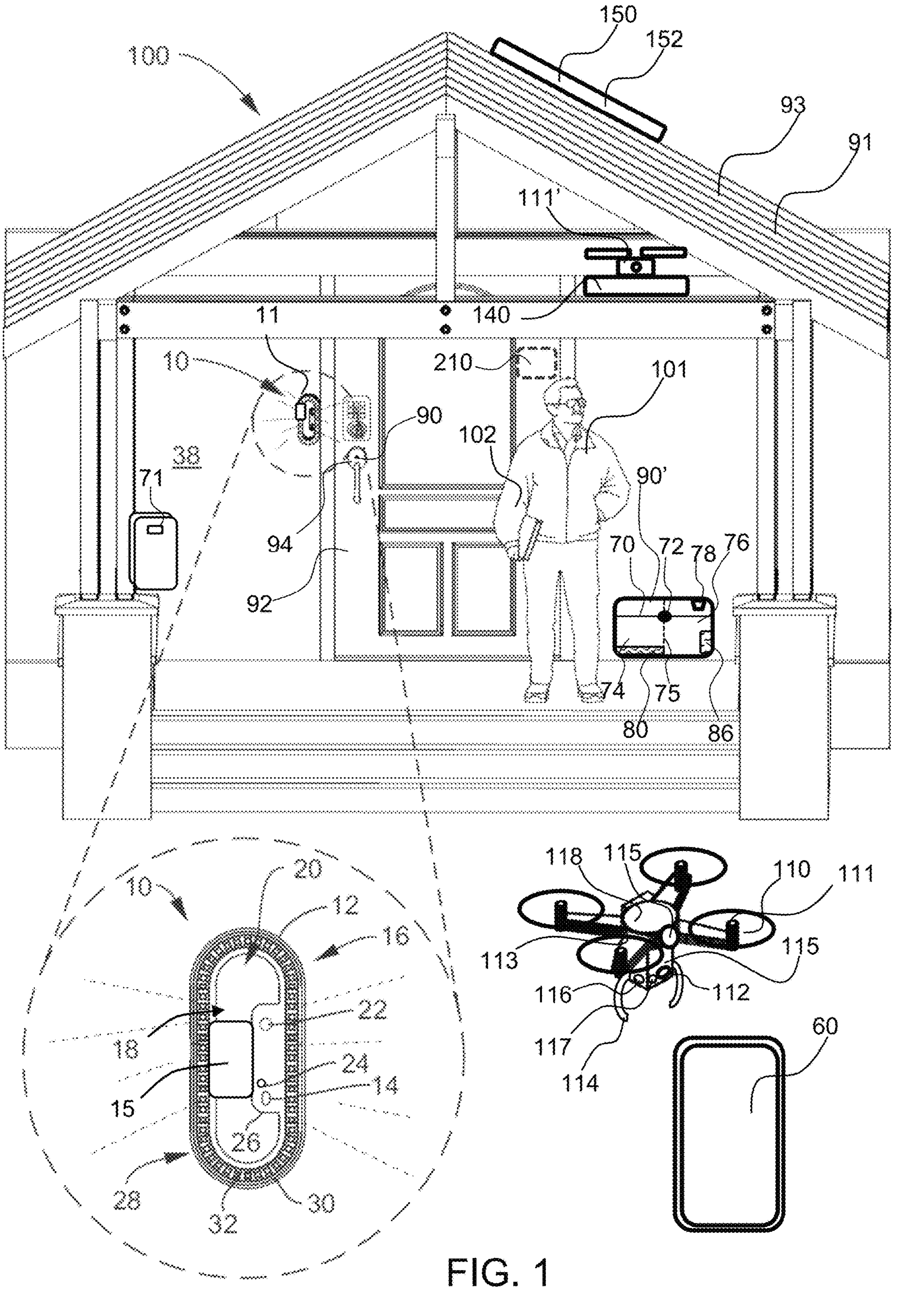
FIG. 1 shows a perspective environmental view of an AI EM device and system according to select embodiment of the invention.
Figure 2:
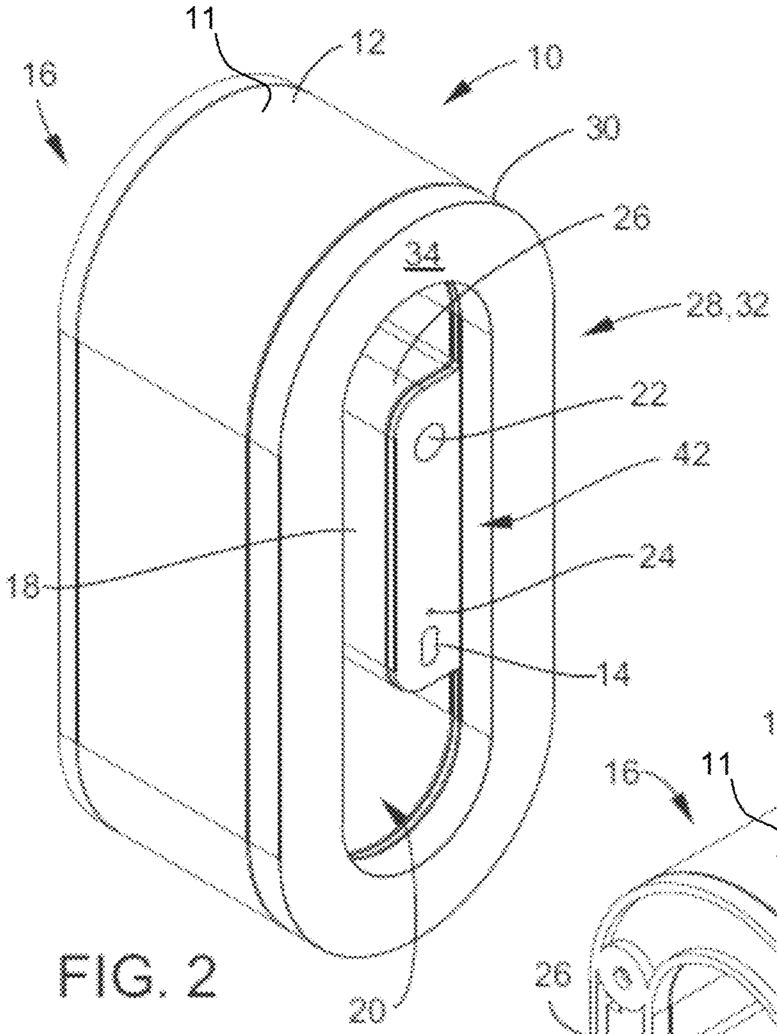
FIG. 2 shows a front left perspective view of an AI EM device according to select embodiment of the invention.
Figure 3:
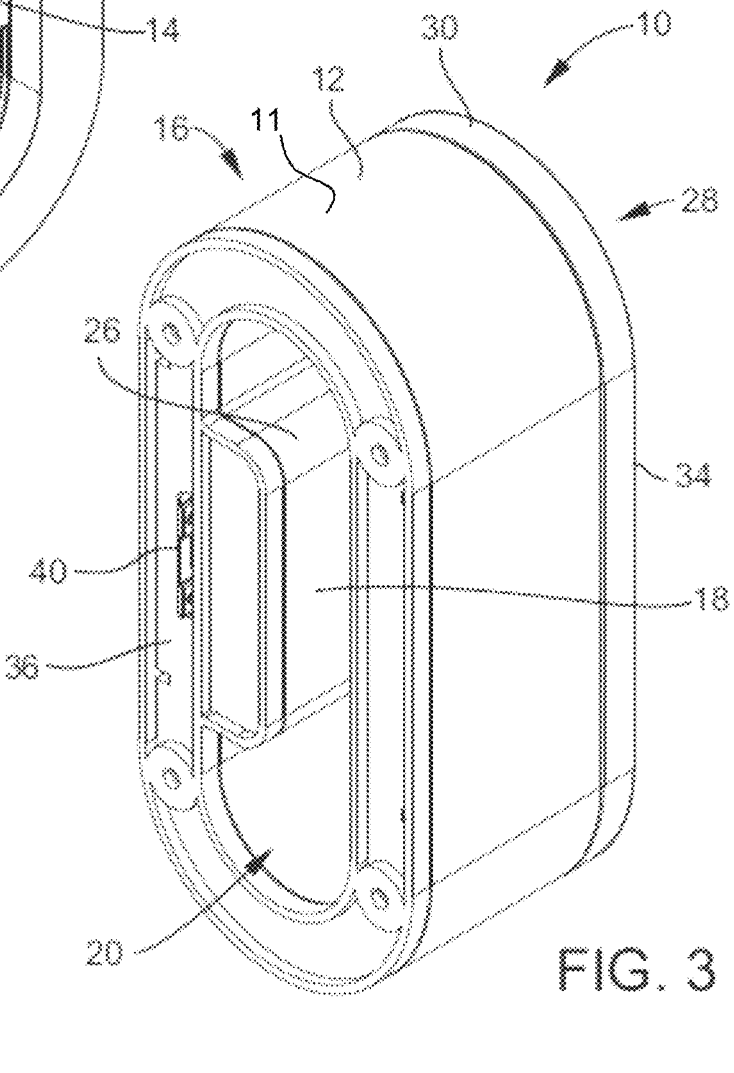
FIG. 3 shows a back left perspective view of the AI EM device according to FIG. 2.
Figure 4:
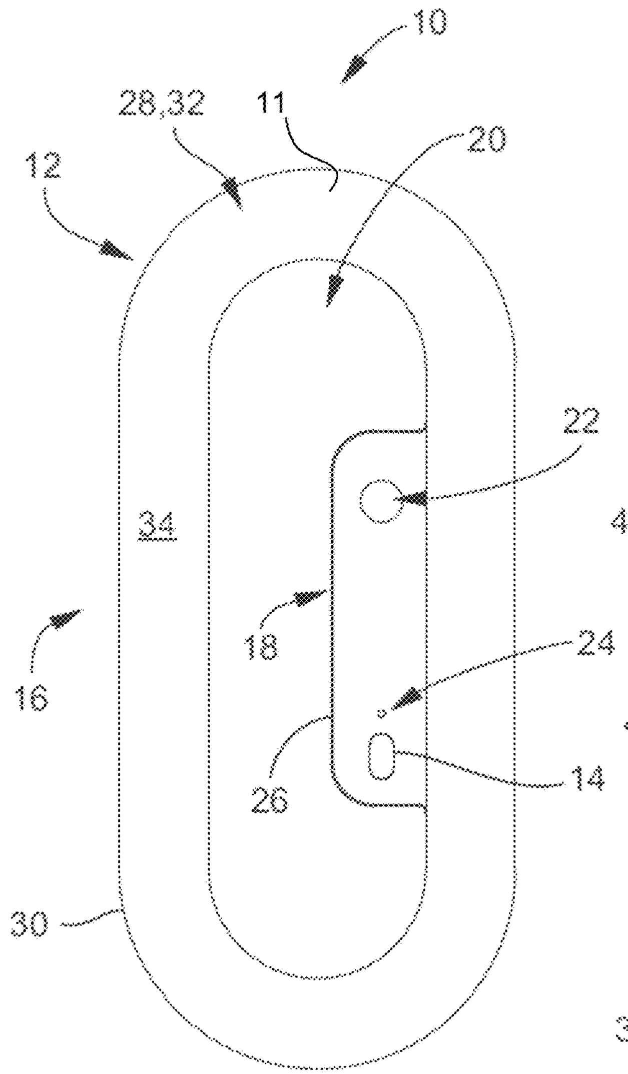
FIG. 4 shows a front view of the AI EM device according to FIG. 2.
Figure 5:
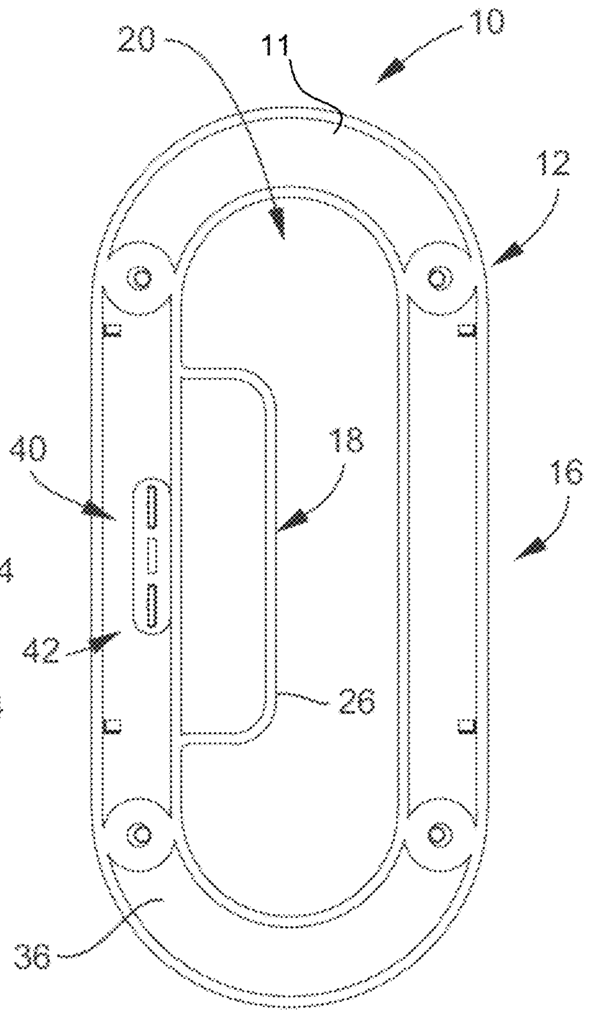
FIG. 5 shows a back view of the AI EM device according to FIG. 2.
Figure 6:
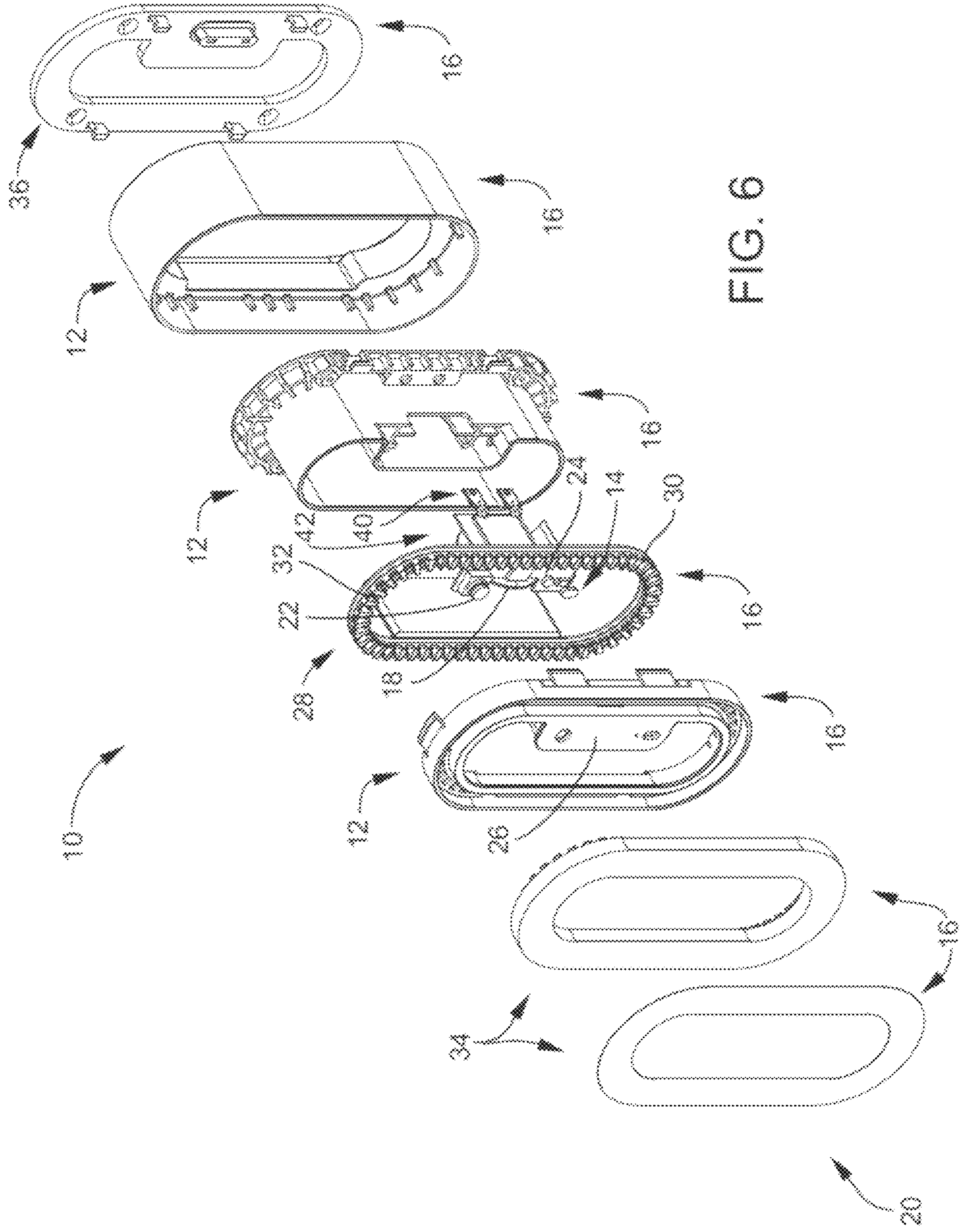
FIG. 6 shows a front right perspective partially disassembled view of the AI EM device according to FIG. 2.
Figure 7:
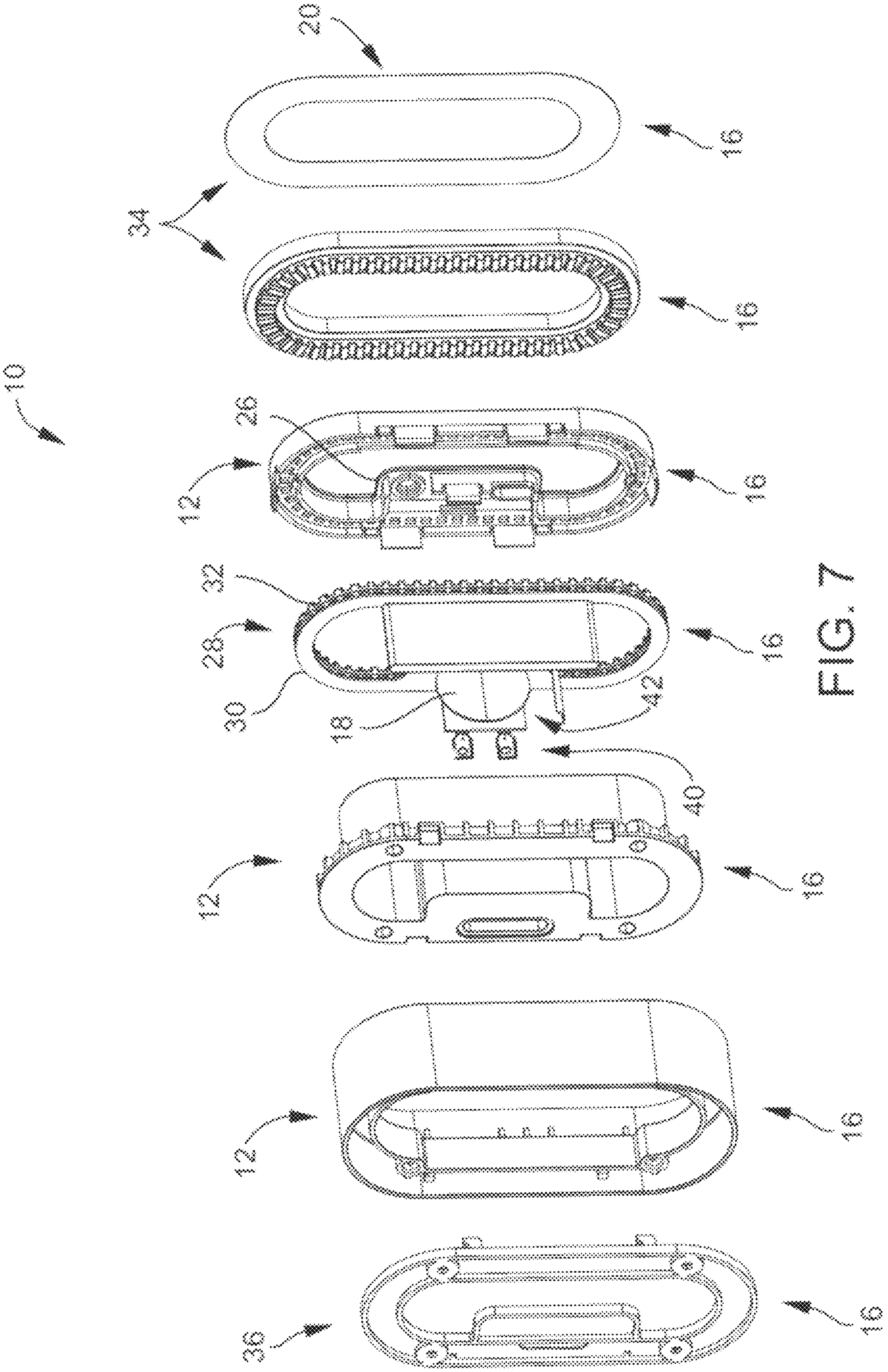
FIG. 7 shows a back left perspective partially disassembled view of the AI EM device according to FIG. 2.

The present invention is generally directed to entry management systems.

In one embodiment, the present invention includes an access management system including an access management device including a processor, a memory, and a microphone, and a software platform including at least a processor and a memory, wherein the access management device is operable to receive audio via the microphone, wherein the access management device is operable to send the audio or a transcription of the audio to the software platform, wherein the audio or the transcription of the audio includes at least one recipient account, and wherein the software platform is operable to send the audio or the transcription of the audio to the at least one recipient account.

In another embodiment, the present invention includes an access management system including an access management device including a processor, a memory, a camera, and a microphone, and a software platform including at least a processor and a memory, wherein the access management device is operable to receive audio via the microphone, wherein the software platform is operable to authorize an identity of a user associated with the audio via voice recognition, facial recognition, or recognition of a virtual key associated with the user upon the audio or an image including facial features of the user or the virtual key associated with the user being captured by the access management device, wherein the access management device is operable to send the audio or a transcription of the audio to the software platform, wherein the audio or the transcription of the audio includes at least one recipient account, and wherein the software platform is operable to send the audio or the transcription of the audio to the at least one recipient account.

In yet another embodiment, the present invention includes an access management system including an access management device including a processor, a memory, a camera, and a microphone, and a software platform including at least a processor and a memory, wherein the access management device is operable to receive audio via the microphone, wherein the access management device is operable to send the audio or a transcription of the audio to the software platform, wherein the audio or the transcription of the audio includes at least one recipient account, wherein the software platform is operable to send the audio or the transcription of the audio to the at least one recipient account, and wherein the audio or the transcription of the audio is sent via a short message service (SMS) text message, an email communication, or a mobile application push message to the at least one recipient account.

None of the prior art discloses a software platform connected to an access management device operable to display or communicate an access key to a device requesting entry or access, wherein the device or a software platform connected to the device is operable to validate the access key, and upon validation of the access key, the access management device is operable to provide access or entry.

The software platform described in the present invention is operable to include a server computer, a cloud platform and/or an edge device, and a database or other data store, and is connected over a network with the AI EM device and other electronic devices described herein, such as robots, drones, cameras, and Internet of Things (IoT) devices. The server computer, cloud platform and/or edge device include at least one processor and at least one memory, and are operable for network communication with other electronic devices which are not connected to the platform, such as law enforcement or devices controlled by providers of security. In select embodiments of the disclosed AI EM device, a plurality of lights is included. The plurality of lights is positioned around a periphery of the housing. In one embodiment, the plurality of lights is positioned around a periphery of a shape (e.g., an oval shape) of the housing. In select embodiments, each of the plurality of lights includes a light emitting diode. In one embodiment, each of the light emitting diodes of the plurality of lights is configured to light up based on sounds emitted from the speaker, whereby the plurality of lights is configured to mimic the AI EM device as if it were talking. The plurality of lights is configured to indicate an alarm has been triggered by flashing, and is further configured to indicate a status of the AI EM device such as via a solid color (e.g., green for operational and red for one or more problems existing with the AI EM device).

In select embodiments of the disclosed AI EM device, an LED lens is included. The LED lens is configured to cover and protect the plurality of lights. In one embodiment, the LED lens has an oval shape.

In select embodiments of the disclosed AI EM device, a mounting bracket is included. The mounting bracket is configured for mounting the housing of the AI EM device to a surface. In one embodiment, the mounting bracket has an oval shape.

In select embodiments of the disclosed AI EM device, a power source is included. The power source includes a hardwired power source, a battery powered power source, at least one solar panel, the like, or combinations thereof.

In select embodiments of the disclosed AI EM device, a wireless communication device is included. The wireless communication device is housed inside of the housing protrusion portion of the housing of the AI EM device. The wireless communication device is configured to communicate with the EM system or other AI EM devices via wireless communication. In one embodiment, the wireless communication of the wireless communication device is selected from a group consisting of: WI-FI, UHF radio waves in the industrial, scientific and medical (ISM) radio bands (e.g., from 2.402 GHz to 2.480 GHz), and building personal area networks (PANs), also known as BLUETOOTH® (Bluetooth trademark owned by Bluetooth SIG, Inc. of Kirkland, WA), the like, or combinations thereof.

One feature of the disclosed AI EM device is that the speaker is positioned in the housing protrusion portion and oriented toward the substantially open middle. This orientation of the speaker allows for projecting sound from the speaker out of the AI EM device.

The AI EM device includes at least one processor and at least one memory. The AI EM device further includes a non-transitory computer readable storage medium including software. The software includes program instructions configured for providing artificial intelligence to the AI EM device. In select embodiments, the software is configured for development of intelligence within the AI EM device, including, speech recognition, problem-solving, learning, planning, the like, combinations thereof, etc. In select embodiments of the disclosed AI EM device, the processor is a networked processor. The networked processor is connected to the AI EM device via wireless communication to the wireless communication device on the AI EM device. In one embodiment, the processor is housed inside of the housing protrusion portion of the housing of the AI EM device.

An exemplary AI EM system employs an AI system similar to or including features of the WATSON AI system. WATSON is a supercomputer that combines artificial intelligence (AI) and sophisticated analytical software for optimal performance as a "question answering" machine. The supercomputer is named for IBM's founder, Thomas J. Watson. The WATSON supercomputer processes at a rate of 80 teraflops (trillion floating-point operations per second). To replicate (or surpass) a high-functioning human's ability to answer questions, WATSON accesses 90 servers with a combined data store of over 200 million pages of information, which it processes against six million logic rules. It is a platform for exploring, visualizing and presenting data that utilizes WATSON's cognitive capabilities to automatically surface data-driven insights and recommend ways of presenting the data.

In another aspect, the invention includes an AI EM system. The disclosed AI EM system includes utilizing the disclosed AI EM device in any of the various embodiments and/or combination of embodiments shown and/or described herein. As such, in general, the disclosed AI EM system includes the disclosed EM device with a camera, a microphone, a motion detector, a speaker, a wireless communication device, a smart wearable device, the like, and/or combinations thereof. In addition, in one embodiment, the disclosed AI EM system includes an AI device. The AI device is in communication with the EM device (e.g., wired communication, wireless communication). In another embodiment, the AI device includes a processor with a non-transitory computer readable storage medium having software with program instructions configured for providing artificial intelligence to the AI EM device.

One feature of the disclosed AI EM system is that the software has programming instructions that, when executed, cause the EM device to execute entry management and ecommerce support functions including, but not limited to, the delivery of messages, directives, instructions, greetings, recordings, and facilitating the connection of a third party for two-way audio/video communication.

The motion detector of the EM device is configured to activate upon motion and provide a greeting, command, or instructions, whereby the system activates upon recognition of a paired mobile device. The paired mobile device includes a stored identification paired with the system (e.g., via the approval of an owner/administrator). In one embodiment, the owner/administrator in the system includes, but is not limited to, individuals assigned programming rights configured to allow the owner/administrator to make selections (e.g., remotely) via the AI EM system. When activation occurs, the AI EM system is configured to provide a response. In one embodiment, the response is a spontaneous response, an automatic response, or a pre-programmed response in accordance with the device it detects.

The AI EM system is configured to provide a response in accordance with the image read by its camera. In one embodiment, the response is a spontaneous response, or a pre-programed response in accordance with the image read by its camera.

When activated, the platform or system sends a notification to the user device of the owner/administrator with an option to engage remotely in two-way communication, activate a preprogrammed or custom message, provide a virtual key or activate the recording for a message, detect a person or a device via the camera, the microphone, the motion detector, or the wireless communication device and provide an intelligent response to the person or device via the speaker or the wireless communication device. In one embodiment, the notification is sent simultaneously when activated. In one embodiment, the present invention provides for identification of a specific person via voice identification or voiceprint recognition. In one embodiment, voiceprint recognition is conducted on the software platform of the present invention or through software of the AI EM device. Voiceprint recognition is operable to be accomplished using any method known in the art, including the method described in U.S. Pat. No. 10,629,209, which is incorporated herein by reference in its entirety. In one embodiment, voiceprint recognition or voice identification includes other forms of audio identification, such as identifying a certain pitch or note or series of pitches or notes that are generated via an electronic device.

The AI EM system is operable to present a question to ask if a person within proximity of the EM device desires to leave a message. If the system receives an affirmative response, then the system is operable to record an audio message via the microphone of the AI EM device. The affirmative response is recognized via voice recognition in one embodiment, or software on the AI EM device or the platform of the present invention which recognizes words and/or phrases spoken by a person. Voice recognition according to the present invention includes any voice recognition technology known in the art, such as the technology described in U.S. Pat. No. 10,650,802, which is incorporated herein by reference in its entirety. In one embodiment, this message is relayed to an administrator device (i.e., a user device of an administrator) immediately or upon receiving a request from the administrator device to play the message. The message is operable to also include an identification of the person who left the message, as identified by the system of the present invention or by the person leaving the message. For example and not limitation, the administrator device is a smart electronic device that includes, but is not limited to, a smart wearable device, a wearable device, a portable device, and/or a smart portable device. For example and not limitation, the smart wearable device is a smart watch, smart glasses, virtual reality device, and/or augmented reality device. The AI EM system is also operable to transmit a question and/or prompt to a user device (e.g., with or without administrative privileges) within proximity of the EM device. The user device is configured to receive a selection based on the question and/or prompt. For example, and not limitation, the question and/or prompt from the system relates to whether the user of the user device desires to interface with an administrator. The user device is configured to receive a selection via a display screen and transmit the selection to the AI EM system. The AI EM system is then further operable to transmit a request to an administrator device. The administrator device is configured to receive a selection relating to the request. If the request is approved, the AI EM system is configured to initiate an audio interface or call (e.g., video call) between the administrator device and the user device. The administrator device is configured to display the image data captured by the AI EM device and the AI EM device is configured to display image data captured by the administrator device. In another example of an AI EM system according to the present invention, the EM device is configured to record messages for at least one administrator device and/or transmit messages to at least one administrator device. A message is indicated, sent, or accessible for only one or more than one recipient.

The present invention also provides for a package to be scanned by the camera of the EM device and for the AI EM system to create or to initiate a geofence around a predetermined region in proximity to the EM device, or around the range of visibility of the camera of the EM system, by way of example and not limitation, a monitored designated area (MDA) or multiple monitored designated areas (MDAs) created by the AI EM system in the view of the camera, or in view of multiple cameras of the AI EM system. Geofences are operable to be defined by the software platform of the present invention based on receipt of input such as property boundary information or other geographic information not specifically tied to a field of visibility of an electronic device, or by one or more devices connected to the software platform of the present invention. A geofence includes, but is not limited to, a virtual geographic boundary, defined by at least one geographic designator or a plurality of points in physical space, such as global positioning system (GPS) coordinates, latitude and longitude coordinate points, radio frequency identification (RFID) technology, BLUETOOTH technology, Internet Protocol (IP) addresses, or any other method known in the art, that enables software to trigger a response when a mobile device enters or leaves a particular area. One example of geofences used in the present application include the geofences described in U.S. Pat. Nos. 9,906,902, 10,121,215, 9,875,251, 10,115,277, 10,237,232, 10,582,333, 9,986,378, 10,375,514, 10,235,726, 10,805,761, and 10,979,849, each of which is incorporated herein by reference in its entirety. One or more devices connected to the software platform of the present invention, including the EM device, are operable to detect an event, an activity, an object, a person, or a device within the at least one geofence. These devices are operable to communicate with the software platform to identify a motion, a person, a package, an object, or a device. In one embodiment, the one or more devices are operable to detect entry into and exit from at least one geofence. Alternatively or additionally, the one or more devices are operable to detect the presence of an activity, event, object, person, or device proximal to the at least one geofence. The one or more devices are operable to send a request of identification to the object, person, or device within the at least one geofence or approaching the at least one geofence. In one embodiment, the device includes a drone. The one or more devices are operable to receive an audio response and/or visual response and analyze the response or send the response to the software platform for analysis according to any method described herein or known in the art.

In one embodiment, when the geofence or MDA is initiated, the EM device is configured to utilize the motion detector, camera, microphone, or combinations thereof for creating the geofence or MDA monitored area, having a proximity distance from the AI EM device, and/or for detecting a breach of the geofence area or MDA. In select embodiments, when a breach of the geofence area or MDA is detected, the AI EM system is configured to: alert the owner via a wireless notification, trigger the EM device to set off an alarm of the EM device, trigger an external alarm, the like; and/or or combinations thereof. In select embodiments, when the package is placed in the geofence monitored area or MDA, then the EM device is activatable when input is received (e.g. from a user device) belonging to a carrier entering the geofence area, or the EM device is activatable to monitor the geofence area or MDA via the motion detector, camera, microphone, or combinations thereof. In other select embodiments, the geofence or MDA is operable to be deactivated after the EM device receives a scan of the package or a virtual key, whereby the package is retrieved, whereby the notification, alarms, or combinations thereof are deactivated by the scanning of the package or the virtual key, and the geofence monitored area or MDA is operable to be reactivated after a subsequent scan.

In another embodiment, the AI EM system is operable to implement proximity detection and alerts upon a trigger, such as the EM device scanning a package or a user entering a house associated with the AI EM system. By way of example, the AI EM system is operable to detect movement in a visual or auditory range of the AI EM device. Alternatively, scanning a label of a package or another trigger event causes the AI EM device to arm other devices to detect movement or sound. In one example, a camera connected to the EM device either directly or through a platform is operable to detect movement in an area near a delivered package, with this area being outside of a range of vision of the AI EM device but within an area inside a range of vision of the camera. The area inside the range of vision of the camera is operable to be a defined space (e.g., a geofence) or an area within a predetermined distance of a monitored area (e.g., a package delivery zone, a front porch, etc.). Geofences and monitored areas are operable to be defined by the system centroidally (i.e., relative to a central point) or non-centroidally (e.g., a perimeter around an object or a perimeter of a space, such as a perimeter of a porch, a package delivery zone, a front porch region, etc.). Alternatively, the range of vision or visibility of the camera included within the housing of the EM device defines the monitored area or region in proximity to the EM device.

In one embodiment, geofences are defined through the use of internet protocol (IP) addresses such that the geofences are not defined visually and do not need to be monitored visually. Rather, in one embodiment, a geofence is established around a physical boundary, such as the perimeter of a property or the perimeter of a curtilage of a house. A detection device, such as an electronic device detector or mobile phone detector, determines when an electronic device enters the geofence and sends an alert to the entry management device regarding the presence of the electronic device. In one embodiment, the detection device is a detector as described in U.S. Pat. No. 8,718,597 or 10,547,736, each of which is incorporated herein by reference in its entirety. Electronic devices include, by way of example and not limitation, smart phones, wearables, cellular phones, laptops, vehicles with wireless connectivity capabilities, drones, robots, or any other electronic device known in the art operable for cellular or wireless network connection. In one embodiment, the platform of the present invention recognizes the electronic device through connection with a device connected to the platform on the property. Upon recognition by the platform of an electronic device that is on a whitelist, or a list of electronic devices that are permitted to be in the geofence, a record of the electronic device entering the geofence is stored on the platform. Additionally, an alert including an identification of the electronic device and a time of entry of the electronic device into the geofence is sent to a device associated with the platform in one embodiment. If the electronic device is on a blacklist, or a list of electronic devices which are not permitted to be within the geofence, a record of the electronic device entering the geofence is stored on the platform and an alert including an identification of the electronic device and a time of entry of the electronic device into the geofence is sent to a device associated with the platform. Additionally, a notification is operable to be sent from the platform to the blacklisted device indicating that the person associated with the blacklisted device should leave the premises immediately. In one embodiment, an alert is also sent from the platform to a law enforcement device in the event that the blacklisted electronic device is associated with a person who is not legally authorized to be on the premises, such as a person who is the subject of a restraining order by one of the occupants of the house on the premises, a criminal with one or more outstanding warrants against them, or a person of interest in a crime. In one embodiment, the device associated with the platform is operable to send a command to the platform to instruct one or more aerial or land robots, cameras, or any other device connected to the platform described herein to monitor the electronic device or take any action described herein against the blacklisted electronic device which has entered the geofence.

In the event that the electronic device is not a whitelisted device or a blacklisted device, the platform is operable to request an identification from the electronic device and store the identification and the time of entry into the geofence. An alert is also preferably sent to a device associated with the platform including the identification of the electronic device and the time of entry into the geofence. In one embodiment, the device associated with the platform is operable to send a command to the platform to notify authorities, instruct one or more aerial or land robots, cameras, or any other device connected to the platform described herein to monitor the electronic device or take any action described herein against the electronic device which is not whitelisted and not blacklisted which has entered the geofence. In one embodiment, the platform is operable to receive a command from a device associated with the platform to whitelist or blacklist the electronic device which was previously not whitelisted or blacklisted. The platform preferably stores the duration of occupancy within the geofence as well as the exit time of the electronic device from the geofence, and is further operable to send an alert or notification to a device associated with the platform including the occupancy time and exit time of whitelisted, blacklisted, or not yet whitelisted or blacklisted devices within the geofence. In one embodiment, alerts or notifications are not sent for certain whitelisted devices such as devices belonging to occupants of a household.

An exemplary AI EM system is configured to collect audio-visual information that is recorded in the event of a breach of an access point or geofence. Sensors on an access point, or within or in proximity to the geofence, are coupled with the AI EM system and when an access point is opened without authorization from the AI EM system, an alarm is configured to sound and the camera and microphone are configured to record information for later evaluation to determine the source of the breach. For example, a video is recorded that is later watched to identify a thief breaking into a home. Note, in one embodiment, a motion sensor is coupled with the AI EM system and video and audio is recorded when the motion detector is activated.

Another AI EM system embodiment of the present invention includes an EM device constructed and configured to communicate directly via wireless or wired communication (e.g., radiofrequency, BLUETOOTH, ZIGBEE, WI-FI, Near Field Communication (NFC), a Link 16 network, and/or a mesh network and/or other similar communication methods), with a smart electronic device including a memory, a processor, and a visual display. The EM device includes a housing including at least one input capture device, further including at least one of an image capture device, a video capture device, an audio capture device, an audio transmitting device, an image transmitting device, and/or a video transmitting device. In one embodiment, the EM device collects at least one of visual information and audio information. The smart electronic device includes, but is not limited to, a smart wearable device, a wearable device, a portable device, and a smart portable device. The smart wearable device includes, but is not limited to, smart watches (e.g., FITBIT, SAMSUNG GALAXY, APPLE WATCH, WEAR OS, or WHOOP) and virtual reality and augmented reality devices (e.g., GOOGLE GLASS, VALVE INDEX, OCULUS, and HOLOLENS). For further details relating to these and related smart wearable devices, see U.S. Pat. Nos. 10,715,791; 9,063,330; 10,535,151; 9,652,896; 9,005,129; and 8,945,017, and US Patent Publication Nos. 2021/0080996 and 2020/0126243, each of which is incorporated herein by reference in its entirety. The smart wearable device is operable to display an image or a visual virtual key or to emit audio or an auditory virtual key, which is readable or received by the AI EM device, a physical access point, a virtual access point, or any other physical or virtual device, account, or system, such as a virtual account (e.g., bank account, computer account, etc.), an electronic device, a vehicle, a physical space, or a virtual space or is configured to start or activate a machine, a robot, or a drone. Virtual reality (VR) is a simulated experience that is similar to or completely different from the real world. Applications of virtual reality include entertainment (e.g., video games), education (e.g., medical or military training), and business (e.g., as virtual meetings). Augmented reality devices are configured to superimpose images and/or electronic media on a display presented to modify a user's view of the real world, wherein the view includes live or transmitted, alone or combined with or without audio. Virtual reality includes augmented transmissions of live video, recorded video, live or recorded images or a series of images, and combinations, with or without audio.

In one embodiment, the EM device and/or the smart electronic device is configured to transmit image and audio data in real-time and/or near-real-time. Preferably, the EM device and the smart electronic device are configured to transmit image and audio data in real-time and/or near-real-time. Additionally, the EM device and/or the smart electronic device is configured to record the audio data and the visual data. The EM device is further configured to transmit the recorded data to the smart electronic device. In yet another embodiment, the EM device is further configured to time stamp the visual and audio data (e.g., via the software platform). Preferably, the smart electronic device is operable to display timestamp data via the visual display and/or to include timestamp data saved or otherwise associated with the image, video, and/or audio data captured or received as input(s) by the EM device. The EM device is further configured to provide real-time alerts and/or messages to the smart electronic device. Additionally, the EM device is configured to receive real-time and/or near real-time data from the smart electronic device. Advantageously, the smart electronic device is configured to display the real-time and/or near-time data (e.g., video data, audio data, image data, alerts, messages).

The AI EM system is configured for two-way communication with the smart electronic device. The AI EM system is configured to transmit captured audio and/or visual data to the smart electronic device. The AI EM system is further configured to receive audio and/or visual data from the smart electronic device. For example and not limitation, the AI EM system is configured to transmit a virtual key, a password, and/or other verification means/mechanism (e.g. a collection of images to be verified) to the smart electronic device. The smart electronic device is then configured to receive input related to the virtual key, password and/or other verification means (e.g., from a user device). In one embodiment, the verification means includes the EM device receiving a selection of at least one image based on a prompt. The smart electronic device is configured to receive at least one image selection including but not limited to, via a control mechanism attached to the smart electronic device. For example, and not limitation, the control mechanism includes, but is not limited to, a button, a virtual button, a switch, a virtual switch, a dial, a virtual dial, and/or a graphical user interface (GUI) configured to select at least one image and/or other verification means. Alternatively, in one embodiment, the smart electronic device and/or smart electronic wearable device is configured to track the motion of a user's head via a camera and to determine where a user is looking based on head position. Alternatively, or additionally, the smart electronic device is further configured to track the rotation and/or orientation of a user based on at least one sensor. For example, and not limitation, the at least one sensor includes an accelerometer and/or a gyroscope. The smart electronic device is further operable to track the user's eye position(s). In one embodiment, AI EM system is configured to identify which image is selected based on the duration of time that a user looked at an image. In yet another embodiment, the smart electronic device is configured to display a virtual keypad. In one embodiment, the smart electronic device monitors a user's hand position in relation the virtual keypad and receives a password, code, and/or answer to a security question based on the user's hand position.

The smart electronic device is further configured to capture audio and/or visual data (e.g., an image, video) of a user and an environment surrounding the user. The smart electronic device is further operable to transmit the captured audio and/or visual data to the EM device. The EM device is operable to perform image, audio, and/or video analysis on the audio and/or visual data obtained from the at least smart wearable device. The image, audio, and/or video analysis includes, but is not limited to, recognition of at least one person, at least one weapon, at least one action, and/or at least one sound. Advantageously, the EM device is configured to compare the audio and/or visual data captured by the smart electronic device with historical visual and/or audio data. In one embodiment, the EM device is configured to generate an alert and/or message based on the comparison of the audio and/or visual data with the historical audio and/or visual data.

In another example, the smart electronic device is configured for use by an owner of a dwelling and/or housing, property owner for commercial buildings, property management entity, etc. The smart electronic device is configured to receive the audio and/or visual data from the EM device. For example, and not limitation, a virtual reality headset is worn by an owner who is engaged with an immersive virtual reality environment. The virtual reality headset is configured to display the audio and/or visual data from the EM device via a virtual reality display. Advantageously, the virtual reality headset is further configured to generate a prompt in the virtual reality environment and is operable to receive input (e.g., from the wearer of the virtual reality headset (e.g., based on audio command, entry into a GUI, etc.)). In one embodiment, the input includes an action for the EM system based on the audio and/or visual data. For example, and not limitation, the prompt includes whether an individual should be granted access to enter the housing or dwelling. If the smart wearable device receives a command to grant access to the individual, then the smart electronic device is configured to send a command to the EM device to disengage the lock. This enables a home owner to still receive updates and maintain security while immersed in a virtual reality environment.

Advantageously, the AI EM system is operable to provide a duration of time for an access point to be unlocked. For example, and not limitation, after an individual has been authorized to enter through an access point, the EM device is configured to provide a duration of time to remain unlocked. Once the duration of time has lapsed, then the EM device is configured to send a command to the electronic lock to engaged and lock an access point. Furthermore, the EM system is configured to transmit a message and/or alert to the smart electronic device to indicate the duration of time that the access point will be unlocked. Advantageously, the EM system is operable to generate an alert and/or message when the duration of time is expiring and to transmit a prompt to the smart electronic device to determine if the duration of time needs to be extended.

Unlocking of an access point is operable to occur through any method described herein or known the art, such as through provision of an image, a code, authorization received by the platform of the present invention or the AI EM device, or through voice identification or voice recognition. Advantageously, by providing entry via voice identification or voiceprint recognition, the AI EM device provides for hand free entry into a space.

In another example, the AI EM system is configured for use with a third-party. For example, and not limitation, the AI EM system includes a software platform in network communication with a third-party. For example, and not limitation, a third-party includes a security management company, a first responder, police, homeowners, business owners, and/or property management companies. The AI EM system is configured to transmit audio and/or visual data relating to a smart electronic device detected by the EM device and/or a network device. The third party is operable to send a command to the electronic lock based on the transmitted audio and/or visual data.

In one embodiment, the AI device is configured to learn various inputs. An AI device is configured to learn from past events and learn to recognize or predict when a particular person is arriving or departing from a dwelling and produce messages or questions that correspond with a recognized person or event. The AI EM system is further configured to learn to associate features of a person or vehicle to verify a person or a company. For example, the AI EM system is configured to use the camera to take pictures when a delivery person arrives and to further analyze these pictures for logos or emblems to identify a person approaching the AI EM device. The camera is further operable to detect emblems, logos, color or uniforms, hat shapes, etc. Likewise, an exemplary AI EM system is configured to detect threats including masks or a weapon, such as a gun or knife. In the event that a threat is detected, a robot, land or aerial, is configured to record images and/or video of the threat and is further configured to follow said threat as they leave the area. A robot is operable to communicate, such as by transmitting data (e.g., video and/or audio data, position data, such as through a global positioning system (GPS)) to at least one user device of an administrator and/or emergency authorities to aid in tracking and locating said threat, such as said third party. The AI EM system is operable to control the robot without input from the administrator to record images and/or follow a threat. In one embodiment, the robot includes artificial intelligence embedded in the robot and acts independently to recognize threats, record threat data, images, and video, and/or follow a threat. A robot is further configured to receive packages (e.g., from a delivery person) and to transport the package to a secondary location, such as within a dwelling or another building, or to a storage container. The access point is configured to be unlocked by the system for the robot to deliver a package. Likewise, a robot is configured to retrieve a package through an access point and deliver the package to a person or other robot at the location.

Accordingly, in one embodiment, the present invention is directed to an AI EM system comprising an AI EM device including a housing comprising: a camera, a microphone, a speaker, a controller, a wireless communication device, an access point including an electronic lock that is controlled by the controller to lock and unlock said access point, an AI device in communication with the AI EM device including a processor with a non-transitory computer readable storage medium comprising software having program instructions configured for providing AI to the AI EM device, a robot having a wireless signal transceiver that communicates with the controller of the AI EM device, wherein the AI EM device is configured to work on a networkable platform with networked software accessible and interactive with said AI EM device and member devices running the networked software and participating on the networkable platform, wherein the networkable platform is configured for communication between said member devices including member devices of owners, service personnel, property management, real estate professionals, short term rentals, hotels, and employees, wherein the networkable platform is configured to provide access and logistics to access points. The camera is adapted to read a virtual key, and upon verifying the virtual key, the software of the AI device is configured to unlock said electronic lock to said access point. The software of the AI device is configured to provide a logistic message via the speaker including directions to the access point. In one embodiment, the robot includes a robot speaker. In one embodiment, the robot speak is operable to emit the logistic message and/or the contextual greeting. In one embodiment, the robot is configured to open the access point. In one embodiment, the robot includes a package manipulator configured to retain and release a package, wherein the robot is configured to move a package from a first location to a second location. The robot preferably includes a robot camera configured to take images. In one embodiment, the robot includes an AI device that is configured to identify a package or a threat from an image taken by the robot camera. In one embodiment, the threat is a person. The robot is configured to take images of said threat and transmit said image of said threat to said AI EM system or a user device of an authority. The robot is configured to track the threat and configured to transmit a location of said threat to said AI EM system or the authority user device. The robot is configured to take an image of a vehicle related to the threat and is configured to transmit said image of the vehicle to the AI EM system or an authority. In one embodiment, the AI EM system further includes a docking station for the robot. In one embodiment, the docking station includes a charging port to charge a battery on the robot when said robot is docked on the docking station. In one embodiment, the docking station also includes an interchangeable battery configured to be exchanged with a battery on the robot when the robot is docked on the docking station. The docking station is also operable to receive power from a renewable power source (e.g., solar power). The docking station includes a motion detector in one embodiment. The docking station is configured to monitor a substantial portion of a perimeter of a building having said access point. In one embodiment, at least 80% of the perimeter is monitored by the motion detector. In one embodiment, the docking station also includes a speaker. The docking station is also preferably configured to emit an alarm. In another embodiment, the docking station includes a motion detector. In one embodiment, the alarm is emitted when motion above a threshold motion is detected by the motion detector. A plurality of robots and a plurality of docking stations are also operable to be provided. In one embodiment, the plurality of robots are configured to dock on said docking stations. In one embodiment, the docking stations are configured around a building configured on a property. In one embodiment, the property includes said access point. In one embodiment, the plurality of robots each includes a robot camera that is configured to take images. In one embodiment, the plurality of robots are configured to monitor a substantial portion of a perimeter of the building. In one embodiment, at least 80% of the perimeter is monitored by said cameras on said plurality of robots. Each of the plurality of robots includes a microphone that is configured to record sounds. In one embodiment, the robot (e.g., each of the plurality of robots) includes a controller. In one embodiment, the robot acts autonomously from the EM device to monitor a perimeter around a building. Each of the plurality robots includes a speaker that is configured to emit an alarm when a threat is detected. Additionally, in one embodiment, each of the plurality robots includes a light that is configured to turn on when a threat is detected. In one example, a first robot of the plurality of robots communicates a location of said first robot to a second robot of the plurality of robots to follow a threat. The plurality of robots is operable to include aerial robots that follow a threat. In one embodiment, the plurality of robots is operable to form a robot swarm around said threat. A mobile device that interfaces with the AI EM system is also operable to be included in the present system. In one embodiment, the mobile device is configured to activate the robot to monitor a substantial portion of a perimeter. The robot is also configured to conduct surveillance routes from the docking station. The robot includes a deterrent device in one embodiment, such as a pepper sprayer or a weapon such as a gun, knife or spear.

In one embodiment, the system includes a multiplicity of robots, each configured to operate within and only within a specific region. In one embodiment, the specific region is a geofenced area. In one embodiment, if a first robot is tracking an individual or object within a first geofenced area and reaches a boundary of the first geofenced area, the first robot sends a command to the software platform to activate a second robot in a second geofenced area to continue tracking the individual or object. In another embodiment, if a first robot is tracking an individual or object within a first geofenced area and reaches a boundary of the first geofenced area, the first robot sends a signal directly to a second robot in a second geofenced area to activate and continue tracking the individual or object. This system is particularly useful for systems including both indoor robots and outdoor robots, as it allows a person or object to be tracking from indoors into the outdoors, rather than setting a hard boundary for the indoor robot at the door. Furthermore, it allows robots to not extend beyond a reasonable range that would otherwise place them in areas where they are unable to transmit or receive data or where they are unable to return to a docking station.

In one embodiment, each robot is assigned to report and investigate alarms from specific access management devices. In one embodiment, when an access management device detects a first breach at a first access management device and a first robot is assigned to execute a path to inspect the first breach. If a second breach at a second management device occurs while the first breach is still being investigated, the software platform automatically determines which of the currently unassigned robots is nearest to the access management device that reported the second breach. This helps to prevent situations in which first and second breaches occur roughly simultaneously and would otherwise cause a first robot to inefficiently attempt to inspect both or be caught alternating between each breach, thereby being unable to report to either properly.

A robot includes, but is not limited to, a land or aerial robot, wherein the land robot moves over land and wherein the aerial robot is configured to fly. In one embodiment, an aerial robot includes one or more propellers. In one embodiment, a land robot includes a wheel or wheels, actuating legs or treads for movement over land. These features of the land robot are operable to interface with a track for the land robot in one embodiment, such that the land robot runs only on a track on the premises. In yet another embodiment, a robot is configured to monitor an area around a dwelling or building, such as a place of business, with a camera. In one embodiment, a robot is instrumental in creating the geofence area. In one embodiment, a camera includes a thermal camera that more effectively detects when a person or animal is moving about a building. A thermal camera is configured to capture still digital images or video. Thermal cameras or night vision lenses on cameras of robots or drones enable viewing and analyzing images at night. In one embodiment, these images are transmitted to the platform for analysis, or are transmitted to a device associated with the platform. The drone or robot is operable to transmit location data for the objects in the images via geofencing, Global Positioning System (GPS), or any other method of geolocation known in the art. In one embodiment, a real-time or near real-time position of the robot or drone is sent to a device associated with the platform, such as an administrator device. Alternatively or additionally, the platform sends the real-time or near real-time position of the drone to an authority or law enforcement device. In yet another embodiment, the drone or robot determines the real-time or near real-time location or approximate location of the object or person being tracked, sends this information to the platform, and the platform sends the real-time or near real-time location or approximate location to an administrator device or law enforcement or authority device. Position or geolocation data includes GPS data, coordinate points, or any other location data known in the art. Robots or drones are also operable to follow or track a person, objects such as cars or other drones or robots, or any other moving object such as an animal for a predetermined distance, and send geolocation data relating to the person or object being tracked in real time or near real time to an electronic device associated with the AI EM device and/or an authority device (such as a police device) as the robot or drone tracks the person or object. In one embodiment, the predetermined distance is the distance which the drone or robot is operable to travel away from a docking/charging station and return to the docking/charging station to be recharged without a battery of the drone or robot dying or losing power. Alternatively, the predetermine distance is any other distance operable to be received through the platform by an administrator account. In one embodiment, the drone or robot stops tracking an object or person when the object or person is out of range of detection of the robot or drone.

In one embodiment, a robot is configured to dock with a docking station wherein the robot is charged, or exchanges batteries. The docking station is operable to be hard wired to receive electricity from the dwelling or place of business to charge the robot or the batteries for the robot, and/or the docking station is operable to be coupled with a renewable power supply, such as a wind generator (wind turbine), or a solar generator, such as a photovoltaic cell (solar panel). The docking station is further configured in strategic positions about the dwelling or place of business to provide effective monitoring. For example, four robots are configured with one at each corner of the home. The robots and/or the docking stations are configured to provide a substantially complete perimeter monitoring of the building, dwelling or place of business. In one embodiment, at least 80% or more of the perimeter is captured by a camera of the plurality of robots. In a preferred embodiment, at least 90% or more of the perimeter is captured by a camera of the plurality of robots. In a more preferred embodiment, at least 95% or more of the perimeter is captured by a camera of the plurality of robots. In a most preferred embodiment, 100% of the perimeter is monitored and there is overlap in the monitored area from one robot to another robot.

In one embodiment, a docking station is further configured under an overhang or eaves of a building or under the rain gutter of the building for protection from the elements. An aerial robot is operable to dock on top of the docking station between the overhang and the docking station. In one embodiment, an aerial robot includes a docking extension the enables the aerial robot to dock to the docking station from underneath of the docking station or horizontally with the docking station. In another embodiment, a docking station includes a docking cover that is configured to extend over the aerial robot to protect the aerial robot from the elements. In yet another embodiment, the docking cover is transparent to enable surveillance by the aerial robot when docked under the docking cover. In one embodiment, a docking station includes a light that acts as an exterior light or flood light around the building and this light is configured to illuminate an area around the building, thereby improving the surveillance of the docking station or aerial robot. In another embodiment, robots or drones are constructed with a waterproof, water resistant, fireproof, bullet resistant, and/or bullet proof material. Alternatively, the robots or drones are encapsulated with a waterproof, water resistant, fireproof, bullet resistant, and/or bullet proof material. In another embodiment, any device described herein, such as an AI EMD, camera, or any other device exposed to the elements, is operable to be constructed with or encapsulated by a waterproof, water resistant, fireproof, bullet resistant, and/or bullet proof material.

In one embodiment, the robots (e.g., aerial robots or land robots) are configured to monitor or conduct surveillance using a camera and/or a microphone. The robot is further operable to be programmed to focus in on any movement detected above some threshold of movement, and/or follow a person entering a geofence region or area around a dwelling or access point. The robots are further operable to capture images, photographs, audio, and/or video, of a person entering such an area. In addition, the robots further include lights and these lights are operable to be programmed to activate when motion is detected or a sound is detected. The lights include, but are not limited to, bright lights, such as flood light, producing about 500 lumens or more, or about 500 lumens or more, about 1,000 lumens or more, about 2,500 lumens or more, about 5,000 lumens or more and any range between and including the lumens provided. In addition, in another embodiment, the robots are configured with a speaker that is configured to produce an alarm when an intruder is detected, such as motion above a threshold motion being detected or sound above a threshold sound being detected. In yet another embodiment, the lights are any suitable color and are operable to flash in an alarm mode. In one embodiment, the lights are operable to flash in an alarm mode while an alarm sound is emitted from the speaker. The AI EM system, such as a computer or mobile device, such as a mobile phone or a smart wearable device as described herein, is operable to activate the surveillance mode of the robots (e.g., after receiving input from a user device via a user interface). Also, the AI EM system is operable to activate an alarm mode to cause the robot(s) to produce flashing lights and/or an alarm sound from their speakers (e.g., after receiving input from a user device). The AI EM system is further operable to receive an input to activate a light mode (e.g., from a user device), wherein the lights on the robot are turned on. The robots include aerial robots that are configured around the home and the lights on the robots improve the visibility around the home, for example.

An exemplary AI EM system includes a robot, such as a land or aerial robot, that is configured to move packages from a first location to second location, monitor a delivery location and/or communicate with people such as a delivery person. In one embodiment, a robot includes a speaker, such as a directional speaker, to enable communication with a third party to provide a greeting and/or logistic information to said third party. The speaker is operable to transmit a message that was recorded by a user or an administrator, such as specific instructions including logistic instructions. When a delivery person arrives and is identified by the robot, the pre-recorded message is emitted through the robot speaker. In addition, the AI EM system is operable to send a notification to a user device when a person arrives at the building or home. The user device is configured to display a video captured by the camera on the robot and to communicate with the person in real-time through the robot speaker. For example, and not limitation, the user provides a greeting and then provides specific instructions for delivery of a package. The robot is configured to receive communication from a user mobile device such as a mobile phone or a smart wearable device as described herein.

In another embodiment, a robot is configured to lead the delivery person to an access point for delivering the package. An exemplary robot is configured to take a package (e.g., from a delivery person) and deliver the package to an access point, such as inside a building or into a storage container. A directional speaker is operable to enable communication with a third party with some level of privacy. In one embodiment, only the person the speaker is directed at effectively hears the communication. Also, a directional speaker is operable to enable effective communication from an aerial robot wherein the communication, such as logistic instructions, is heard by a third party over noise made by the aerial robot from the propellers, for example. In one embodiment, the robot is further configured to receive audio data (e.g., from a user device) relating to an administrator or authorities, and is configured to play the audio data through the robot speaker to enable an administrator and/or authorities to communicate via the robot. In one embodiment, a robot is configured to pick up a delivery package using a package manipulator and deliver the package to a delivery location, which includes, but is not limited to, a storage container or a secondary location (e.g., to a back porch or fenced in area) for added security. In an exemplary embodiment, an aerial robot is operable to guide or direct a delivery person to a delivery location. An aerial robot is operable to be used for monitoring a delivery location and provides input to a geofence or MDA and provides input to the exemplary AI EM system if someone intrudes into a geofence location. An exemplary AI EM system is configured to direct and control a robot to investigate abnormalities in a geofenced area, MDA, or surrounding area, such as when a noise is detected. Likewise, an exemplary robot is be configured to follow and record a delivery to an access point, to ensure the delivery is made.

In one embodiment, an aerial robot is small in size, or micro-robots, having a length, width and height of no more than about 25 mm, or even no more than about 10 mm. These micro aerial robots are inconspicuous and easy to dock around the building.

In yet another embodiment, a drone swarm is utilized to follow, track, and deter threats. A drone swarm is defined as two or more robots, such as aerial robots, also referred to as drones, that follow a threat (e.g., an individual). In one example, a drone swarm is operable to follow a person that has stolen a package delivered to an access point, or a storage container or that has breached a geofence area or a monitored designated are or areas (MDA) created by the AI EM device in the view of the camera.

An exemplary AI EM device is configured to work on a networkable platform with networked software accessible and interactive with the EM device and member devices running the networked software and participating on the networkable platform. In one embodiment, the networkable platform is configured for communication between said member devices including member devices of owners, service personnel, property management, real estate professionals, short term rentals, hotels, and/or employees. In one embodiment, the networkable platform is configured to provide access and logistics to access points.

The software of the AI device is operable to perform name recognition, facial recognition, or voiceprint recognition (voice identification). In one embodiment, the software of the AI device is operable to communicate with devices located within a premises or building including the EM device. The software of the AI device is further operable to enable the EM device to establish contact, record messages, or deliver a message. In one embodiment, the software of the AI device is further operable to enable the EM device to establish contact, record messages, or deliver a message using the name and/or facial recognition. When the EM device is activated by motion, the detection of a paired mobile device, the presentation of a virtual key, or the owner/administrator user device, the EM device is configured to cause the programming instructions of the software to activate or turn on the AI EM system. In one embodiment, the disclosed AI EM system is that the AI device is configured to cause the EM device to detect the person and interpret voice detected by the microphone from the person, i.e., perform voice recognition of the word(s) and/or phrase(s) spoke by the person. The AI device is operable to provide an intelligent response, including but not limited to, logistics, a greeting, a command, directions, a message, an inquire, a recording request, an alarm to the speaker, the like, and/or combinations thereof. The wireless communication device is preferably operable to establish the identity of the person or the user device once paired. In one embodiment, after pairing, the AI device is configured to recognize the user device and provide a customized greeting, specific instructions, access, or actions for the associated device. Alternatively, the AI EM device is operable to identify a voice and provide a customized greeting, specific instructions, access, or actions for the person associated with the voice.

The AI device is further operable to require authentication of an image or mobile device that is active and unlocked, the device must be active, or combinations thereof, prior to providing the customized greeting, the specific instructions, access, or the actions for the associated device.

In one embodiment, the AI device is configured to recognize the previously paired mobile device and a virtual key or an identification sequence. In one embodiment, if there is not a confirmed identification, the system seeks a third-party authentication. In one embodiment, the third-party authentication is an embedded code within the virtual key, and/or an audible or verbal response code including a word or words, a sentence, a number or numbers, sounds, and/or letters. The virtual key utilized is operable to include a humanly created mark, drawing, written sequence of numbers, letters, abstract sketch, or picture. In one embodiment a virtual key includes a digital photograph that an administrator user device is configured to send to a third party for entry. For example, and not limitation, the digital photograph is from the administrator's library of photographs. In one embodiment, a virtual key includes words, letters, and the like. In another embodiment, a virtual key further includes a particular motion across a touchscreen, such as the display screen of the AI EM device. For example, and not limitation, a virtual key that is from an administrator's personal photo library or stored on the administrator's user device in their photo gallery is a personalized virtual key. Also, in one embodiment, the present invention AI EM system is configured to create a virtual key based on input received (e.g., from a touch screen of the administrator's user device). Another example of a personalized virtual key includes a specific zig-zag pattern. An application software is part of the AI EM system and is operable to create a unique personalized virtual key through taking a photograph or using the touchscreen to draw out a virtual key (e.g., via user input). This application or subroutine is opened when a new authorization for entry in entered into the system. The system is operable to ask for the person's name, contact information, time or entry, or span of time, access point to be unlocked and for any messages to be delivered to the person/entrant upon receiving the virtual key to the AI EM device. A personalized virtual key includes a digital file that is created on or stored on an administrator's electronic device and therefore is more secure than a virtual key that is generic.

A virtual key is operable to be used as an electronic device or file virtual key. In one embodiment, the virtual key is used to unlock an electronic device or a file in an electronic device. In one embodiment, a computer is operable to require a virtual key to be shown to a camera (e.g., a camera coupled to the computer) before the computer will unlock for use. In one embodiment, the virtual key takes the place of a password that is typed into the computer. Passwords can be hacked and stolen, but a virtual key is much more difficult to obtain as it is configured on a separate electronic device or a separate physical item. Likewise, a virtual key is operable to be used to unlock a file on an electronic device. The computer is operable to request that a virtual key be verified by showing the virtual key to the camera of the computer before a file is operable to be opened. Again, this is very difficult for a hacker to obtain.

An exemplary AI EM system requires a plurality of virtual keys to be shown or displayed prior to verification and unlocking of a locked access point. For example, and not limitation, the AI EM system is configured to request two or more images via the user device. The AI EM system is configured to receive data relating to the two or more images via the user device. In one embodiment, the AI EM system is further configured to determine whether the digital images, such as digital photographs, were presented in a specific sequence to produce the virtual key. The AI EM system is further operable to send the digital photographs in a single file and/or send them as separate files for security purposes. In one embodiment, a virtual key requires the AI EM system to receive a selection of digital images via a display screen of the AI EM device. The AI EM device is further operable to display a plurality of images, such as four or more images. THE AI EM device is configured to receive a selection of at least one of the plurality of images via the user device to produce the virtual key. Again, the AI EM system is operable to send the images to the user device so the user knows which images to select on the display screen of the AI EM device. Furthermore, the AI EM system, in one embodiment, is configured to receive a selection of at least one digital image and/or virtual key via touch screen 17 prior to granting entry. In one embodiment, for example, and not limitation, the AI EM system receives a selection of a plurality of digital images to produce a virtual key and the image virtual key requires each image virtual key 50, 50', 50" to be selected in a specific sequence, such as balloon, dog, cat. In one embodiment, a plurality of other digital images 66 or photographs are also be displayed on the display screen during the selection or entry of the virtual key.

The platform, a system administrator device, or the AI EM system is operable to automatically send an image virtual key to a user device, such as to a mobile electronic device, such as a mobile phone or a smart wearable device as described herein. The virtual key is viewable via the user's electronic device and then selectable via the touch screen. In another embodiment, the AI EM system is configured to enable entry of the image virtual key by selection of the correct images only when the user device is within a certain range of the EM device. Again, the images must be selected in a specific order. The platform, the system administrator device, or the AI EM system is operable to send image virtual keys to a user device based on a predetermined time. In one example, the platform, the system administrator device, or the AI EM system sends image virtual keys to a cleaning professional's electronic device prior to their weekly scheduled arrival. Then, when the cleaning professional device is detected within range of the EM device, the EM device is operable to communicate with the cleaning professional's electronic device to send the image virtual key for selection by the cleaning professional device. The user device (e.g., a smart wearable device) is further operable to display a plurality of digital images. The user device is operable to receive a selection of the image virtual key via a touch screen and/or other user interfaces.

In an alternative embodiment, a virtual key includes a biometric identifier of a user, such as a fingerprint of a user recognized by a fingerprint scanner or facial features of a user recognized by facial recognition software of the EM device or by facial recognition software of a platform in network communication with the EM device. The virtual key is also operable to include a voiceprint or voice identification corresponding to the voice of a specific person. A database stored in the platform stores biometric data and grants certain permissions to each user based on the biometric data received from the user. For example, the AI EM system is configured to grant a user access to the garage based on verification of the user's biometric data. The AI EM system is further configured to grant a user access to the entirety of a house based on verification of the user's biometric data. The biometric key is also operable to include a voiceprint or voice identification of a user as described herein.

A wireless communication component of the EM device is operable for exchanging data between the EM device and fixed and/or mobile devices over short distances using Wi-Fi or UHF radio waves in the industrial, scientific and medical radio bands (e.g., from 2.402 GHz to 2.480 GHz), and building personal area networks (PANs) (e.g., Bluetooth® (Bluetooth trademark owned by Bluetooth SIG, Inc. of Kirkland, WA)). The EM device is configured to work on a networkable platform with networked software accessible and interactive with any other devices running the networked software and participating on the networkable platform. In one embodiment, the networkable platform is configured for use by a variety of members including owners, service personnel, property management, real estate professionals, short term rentals, hotels, employees, the like, etc. In one embodiment, the networkable platform is operable to provide access and logistics to additional industries and users.

In select embodiments of the disclosed AI EM system, a transponder device is included. The transponder device is configured to utilize a global positioning system or a wireless communication to identify a mobile device and begin to transmit a signal for easy identification and detection. In select embodiments, the transponder is configured to be attached to a stationary object, a door, a room, a building box, and/or a storage container. In one embodiment, upon the EM device detecting the device, the programming instructions of the software is also configured to: send out an audible noise, illuminate, provide mapping instructions or directions to the mobile device to provide guidance in locating a specific location of the stationary object, door, room, building box, or the storage container via the speaker; illuminate lights on the EM device; provide a mapping direction on the device including: an exact location; a location inside a building, a building without a geo address, a container, a storage unit; the like; and/or combinations thereof. As such, the transponder device is configured to take over where a global positioning system ends to guide the person or the device to a specific location inside a geofence or outside a geofence. The EM device is operable to utilize the global positioning system, Wi-Fi, RF, or a wireless communication to identify a mobile device previously paired and initiate actions including messages, access, logistics to guide the person or the device to the specific location such that the geo position of the EM device activates various actions. When the transponder is activated and detects the person or the device within a set range, the transponder device is further configured to emit a signal, a sound, a light, or input to the device configured to guide and direct the person or the device to the specific location.

A camera of the EM device is operable to read a virtual key (e.g., presented from a user device and/or a user) and upon reading the virtual key, the EM device is further configured to unlock an access point, provide a greeting, instructions or logistics, record a message, or establish contact with the individual requested. In select embodiments, the virtual key includes a humanly created image selected from a group consisting of: a humanly created photo; a humanly created picture; a humanly created drawing; a humanly created mark; a humanly created number or numbers; a humanly created letter or letters; a humanly created word or words; the like; and/or combinations thereof.

In another embodiment of the present invention a device associated with a party requesting entry to a physical or virtual space or access to an account, device, or system is operable to read, scan, or receive an access key including at least one of a virtual key or other key, token, image, and/or audio for granting access or entry to the physical or virtual space or access to the account, device, or system. The access key including the virtual key, other key, token, image, and/or audio is operable to be displayed on a display or played through a speaker of the AI EM device or another device associated with the account, device, or system to which entry or access is requested. In one embodiment, the virtual key, other key, token, image, or audio includes a combination of one or more of the aforementioned items, such as audio and an image. In another embodiment, a key is transmitted wirelessly from an AI EM device or another device associated with the account, device, or system to which entry or access is requested to the mobile device. In one embodiment, the device associated with the party requesting access or entry is operable to transmit a notification to the server computer or platform associated with the account, device, or system to which entry or access is requested. The server computer or platform is operable to include a whitelist or list of approved devices for access or entry. If an identifier corresponding to the device associated with the party requesting access or entry is on the white list or list of approved devices, access or entry is granted. If the identifier corresponding to the device associated with the party requesting access or entry is on a white list or a list of prohibited devices, access or entry is denied. If the identifier corresponding to the device associated with the party requesting access or entry is not on a list, access or entry is operable to be granted or denied based on a setting associated with the account, device, or system determined by an administrator or a default setting. In one embodiment, the server computer or platform maintains a log of which devices have been granted access or entry or denied access or entry, including a date, time, and device identifier. The device identifier is operable to include an International Mobile Equipment Identity (IMEI), a Media Access Control (MAC) address, or any other identifier known in the art. In one embodiment, the communication between the device associated with the party requesting access or entry, the server computer or platform, and the AI EM device or another device associated with the account, device, or system to which entry or access is requested occurs through a mobile application.

In another embodiment, the AI EM device or other device associated with the account, device, or system to which entry or access is requested is operable to send information, such as instructions relating to access or entry, to the device associated with the party requesting access or entry upon receiving or reading the virtual key, other key, token, image, or audio from the mobile device. The device associated with the party requesting access or entry is operable to display the information on a display of the device associated with the party requesting access or entry or play audio and/or video through the device associated with the party requesting access or entry. In one embodiment, the information includes directions to a location, such as the location of a device, an entry point, or an access point. The directions are operable to be displayed via a mobile application such as a mobile application associated with the platform of the present invention, or a third-party mobile application such as a mapping application including GOOGLE MAPS or APPLE MAPS. The real-time location of the device associated with the party requesting access or entry is operable to be displayed on the map displayed in the application along with the locations of other devices of interest, at least one access point, or at least one entry point. Relevant information regarding the locations of other devices of interest, at least one access point, or at least one entry point, including directions to the locations of other devices of interest, at least one access point, or at least one entry point, is operable to be communicated via a speaker of the device associated with the party requesting access or entry, the AI EM device, or any other device within audial proximity to the device associated with the party requesting access or entry. In one embodiment, the information includes instructions on how to access an access point or an entry point such as a keycode or combination to unlock a lock, how to turn on a device, vehicle, or tool, how to operate a device, vehicle or tool, or how to access an account. In one embodiment, the vehicle is a rental vehicle or a self-driving vehicle.

In yet another embodiment, the AI EM device or other device associated with the account, device, or system to which entry or access is requested is operable to send a second virtual key, other key, token, image file, or audio file to the device requesting access or entry. This second virtual key, other key, token, image file, or audio file is operable to be read at another AI EM device or another device associated with the account, device, or system to which entry or access is requested. The AI EM device or other device associated with the account, device, or system to which entry or access is requested is operable to be any device described herein, including a device mounted on or attached to a building or object, a mobile phone, a smart wearable device, a robot, a drone, a tool, a vehicle, a computer such as a laptop, and an Internet of Things (IoT) device. In one embodiment, the device associated with a party requesting entry to a physical or virtual space or access to an account, device, or system is a robot, drone, a vehicle such as a self-driving car, or other device operable to move autonomously or via operator control. By providing for the AI EM device to be a mobile device such as a phone or a smart wearable device, the present invention provides for people such as gatekeepers like guards, employees at a hotel or rental location, retail store, warehouse, and/or a government facility to provide access or entry to other parties regardless of where the guards or employees are currently located.

Embodiments where the access management device is operable to display, send, or transmit an access key to a computing device associated with a party requesting access or entry are advantageous in scenarios where multiple devices, objects, or entry points are available, and a party requesting access or entry requires verification of the correct device, object, or entry point. By way of example, there are typically numerous vehicles in a vehicle rental parking lot and numerous rooms in a hotel. The present invention provides information relating to the correct vehicle or room for the renter as well as instructions on how to locate or access the vehicle or room. In one embodiment, information about the vehicle or room is transmitted to the device associated with the party requesting access or entry in parallel with an action taken by an access management device, such as providing directions or access to the room or vehicle, thereby providing an improvement over prior art methods of providing information regarding rental vehicles or lodging. The present invention is similarly operable to be utilized in connection with exercise machines in a gym, workstations in an office environment, inventory management, package retrieval, and in retail and warehouse environments for obtaining relevant information about objects and locations. However, as one of ordinary skill in the art appreciates, these are only examples of the application of the present invention, and the present invention is operable to be utilized in any setting or environment in which access, entry, or information is required or desired.

In select embodiments of the disclosed AI EM system, the access point includes a delivery storage container or mailbox. In these embodiments, the EM device is operable to lock and unlock the delivery storage container or mailbox. In select embodiments, the delivery storage container or mailbox include a refrigerated compartment on an inside of the delivery storage container or mailbox. In one embodiment, the refrigerated compartment is configured for food or other refrigerated items. In select embodiments, the refrigerated compartment is a first portion of the inside of the delivery storage container, and a second portion of the inside of the delivery storage container is configured for parcels. In other select embodiments, the refrigerated compartment is the entire inside of the delivery storage container. Yet in other select embodiments, the refrigerated compartment is the entire inside of a first delivery storage container and a second delivery storage container is configured for parcels. In other select embodiments, the delivery storage container or mailbox includes a warmer on the inside of the delivery storage container or mailbox. The warmer is configured to warm the inside of the delivery storage container or mailbox. The AI EM system is further configured to control the delivery storage container or mailbox with the ability to select warmer, refrigerated, parcel, or a combination thereof per section of the delivery storage container or mailbox.

In select embodiments, the delivery storage container or mailbox is positioned just inside a door of a home and the EM system is configured to unlock and lock the door of the home for deliveries to the delivery storage container or mailbox. In one embodiment, the position of the delivery storage container or mailbox is configured to prevent the need for deliveries to be walked through the house to the kitchen. A feature of the delivery storage container or mailbox is the inclusion of an ultraviolet light on an inside. The ultraviolet light is configured for sanitizing the inside of the delivery storage container or mailbox including sanitizing any parcels placed in the inside of the delivery storage container or mailbox.

In select embodiments, the delivery storage container or mailbox include the EM device on an outside of the delivery storage container or mailbox. The EM device is configured in a separate location from the storage container, however.

The AI EM system is further configured to produce an alarm including an alarm noise and/or light. The alarm utilizes a light and/or speaker that is part of the EM device and/or the storage container. In select embodiments, the delivery storage container and/or the EM device produces an alarm when the storage container is jostled or opened without authorization. A closure sensor is operable to detect the position of the closure to the storage container and when the closure is opened without authorization, an alarm is initiated. In another embodiment, the storage container further includes a global positioning device, that is used by the AI EM system to monitor the location of the storage container. If the storage container is moved beyond a threshold distance from a set location, such as beyond the perimeter of an administrator's property, the AI EM system is operable to initiate an alarm. In this situation, the alarm is initiated on the storage container, in an effort to prevent the storage container from being stolen and an alert notification is sent to a user device corresponding to an administrator and/or authorities, such as the police. An exemplary storage container includes an accelerometer that detects if motion of the storage container. Again, if the storage container is jostled, such as when trying to be opened without authorization, an alarm is initiated to deter the thief. By way of example and not limitation, an alarm includes a light and/or sound emitted from the storage container and/or EM device and an alert is sent to a user device corresponding to an administrator when an alarm is activated.

A light on a delivery storage container is configured for illuminating the delivery storage container and area around the delivery storage container or mailbox. In one embodiment, a speaker on a delivery storage container is configured to communicate with a delivery person and provide logistic instructions regarding a delivery, such as which compartment to deliver a package into. In other select embodiments, the delivery storage container or mailbox includes a power source being selected from a group consisting of a wired power source; a battery-operated power source; a solar power source; the like; and/or a combination thereof. In other select embodiments, the delivery storage container or mailbox includes a warmer configured to heat the inside of the delivery storage container or mailbox. In other select embodiments, the delivery storage container or mailbox includes a wireless connection configured to control the delivery storage device or mailbox via a mobile device or a personal computer, including being configured to control the locking and unlocking of the delivery storage container or mailbox, controlling the temperature inside of the delivery storage container or mailbox via the warmer or the refrigerated compartment, the ultraviolet light inside of the delivery storage container or mailbox, or combinations thereof.

Upon reading a virtual key, the EM device is configured to activate a drone to retrieve deliveries from a specific location. The EM device is also configured to act as a receptionist device for corporate, commercial, institutional or industrial applications. The receptionist device is configured to provide custom messages for each occupant and for receiving and recording custom messages for each user. The receptionist device is operable to forward information wirelessly to each occupant, or information is retrieved from the EM device by displaying a virtual key assigned to each occupant. The EM system is operable to include a plurality of EM devices configured as receptionist devices for corporate, commercial, institutional, or industrial applications. In one embodiment, each of the plurality of EM devices is operable to interact and communicate with each other, whereby the plurality of EM devices is configured to relay messages to the occupant.

A microphone of the EM device is operable to identify an audible key from the person or the device. Upon identifying the audible key via the microphone, the EM device is operable to unlock an access point and/or provide a greeting, information, or logistics. In select embodiments, the audible key includes a word, words, a sentence, and/or a number identified via voice recognition or audio recognition, a sound or sounds, or a voiceprint identification (voice identification) of a person, wherein the microphone is configured to match the audible key with the person or device. In select embodiments, the EM device is configured to assign audible keys to a variety of users, whereby the EM device is further configured to provide access or information to each of the variety of users. In other select embodiments, the EM device is configured to maintain a record of each of the variety of users. Yet in other select embodiments, the EM device is configured to record audible messages.

Advantageously, the AI EM system is configured to record data, such as interactions with the system including, but not limited to, audio recordings, video recordings, dates, times, third person identification, such as electronic address, dates and/or times of entry, what access point was locked or unlocked, dates and times of system breaches, such as a lock being opened without access, or a storage container being moved. A sensor is operable to monitor the lock status of a lock on an access point, including a lock on a storage container for delivery. In addition, in one embodiment, a storage container includes a motion sensor or a GPS as described herein and the system is operable to record if the storage container is tampered with or record a location if it is stolen and moved to a new location. The AI EM system is further operable to keep records of the virtual keys used for entry. This recorded data is stored and secured on a database or computer storage drive such that only a system administrator is granted access to this recorded data.

In a further embodiment, a software platform of the AI EM system is operable to analyze images, video, audio, or any other content provided by the AI EM system to provide data such as foot traffic analytics, length of visits for customers, an amount of time spend browsing particular items or sections of items, and wait times for customers. The AI EM system is operable to create customer profiles based on this information and retrieve information from the customer profile for use at a later date, such as when a customer returns and is recognized by the AI EM system via facial recognition, scanning a code or image by the AI entry device, audial identification by the customer of their identity, or any other method described herein.

In another embodiment, the platform of the present invention provides for automated follow ups with customers or visitors to a retail space or office space. By way of example, the software platform of the AI EM system collects contact information associated with visitors such as an email address, phone number, or social profile account through manual entry from a device in network connection with the AI EM system or through identification of this contact information through web crawling or internet searches based on a customer's name, facial recognition, or any other method of identification of a person described herein. In one embodiment, information is extracted from a social media profile such as LINKEDIN, FACEBOOK, INSTAGRAM, TWITTER, or any other website or platform. For example, the information includes a job title, a company of employment, and/or hobbies and interests from a social media profile. By way of example, visitors to an office receive an email message (e.g., via the visitor's mobile device) including a survey, follow up on services provided, or solicitation from the business associated with the office 1 week after their visit to the office.

In another aspect, the present invention includes an AI EM system with a plurality of EM devices. Each of the plurality of EM devices are operable to be the disclosed EM device in any of the various embodiments and/or combination of embodiments shown and/or described herein. As such, in general, each of the EM devices are configured for use with an AI device in communication with the EM device including a processor with a non-transitory computer readable storage medium comprising software having program instructions configured for providing AI to the EM device. A network platform in communication with each of the plurality of EM devices is also included. The network platform is configured to allow each of the plurality of EM devices to communication with each other.

In select embodiments of the disclosed AI EM system with a plurality of EM devices, the plurality of EM devices are installed in a neighborhood. In one embodiment, each of the plurality of EM devices is configured to communicate if a burglary occurs in any other house or activate and pan the streets to record all traffic activity.

The terminology used herein is for the purpose of describing particular embodiments only and is not intended to limiting of the disclosure. As used herein, the term "and/or" includes any and all combinations of one or more of the associated listed items. As used herein, the singular forms "a", "an" and "the" are intended to include the plural forms as well as the singular forms, unless the contest clearly indicates otherwise. It will be further understood that the terms "compromises" and/or "comprising" when used in this specification, specify the presence of stated features, steps, operations, elements and/or components, but do not preclude the presence of addition of one or more other features, steps, operations, elements, components and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

A storage container, as used herein, is a receptable configured for receiving a package and includes a lock that is controlled by the AI EM system, and is further configured to be a portable storage container that is operable to be moved to a desired location or a storage container that is fixed in a location, such as a mailbox. In one embodiment, a storage container is an example of an access point that is locked and unlocked by the AI EM system.

A smart-home system, as used herein, is a system that utilizes electronic locks to lock and unlock entry ways, such as doors to a building such as a home or place of business from a remote source, such as a mobile device or mobile phone or a smart wearable device as described herein. A smart-home system, in one embodiment, further includes subsystems to turn on or off lights, set the temperature on a home heating or air conditioning system and the like.

Referring now to FIGS. 1-7, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims are operable to be embodied in many different forms and should not be construed to be limited to the embodiments set forth herein. The examples set forth herein are non-limiting examples and are merely examples among other possible examples.

Referring now to FIGS. 1-7, in a preferred embodiment, the present invention overcomes the above-mentioned disadvantages and meets the recognized need for such an apparatus or method by providing of a smart-home system 11 having an AI EM device 10 for an EM system 100. Advantageously, the smart-home system 11 is operable to include a plurality of IoT or smart home devices which are in network communication with the AI EM device 10 or operable for one-way communication or two-way communication with the AI EM device 10 or a platform connected to the AI EM device 10. In one example, the AI EM device 10 is operable to send a command to one or more IoT devices based on the AI EM device 10 scanning a code or an image, recognizing a user based on audio or video input, or any other method described herein. In one embodiment, the one or more IoT devices communicate over an industry standard protocol, such as MATTER provided by the CONNECTIVITY STANDARDS ALLIANCE, which enables devices provided by different companies to communicate using the same protocols. In one embodiment, the communication protocol includes an Internet Protocol (IP) based communication protocol. In another embodiment, the software platform provides an indication of the interoperability of IoT devices with the devices already registered with the software platform. In one embodiment, this indication of interoperability is provided via a software such as "The GearBrain" IoT Configurator.

In an exemplary embodiment, the AI EM device 10 is operable to communicate with cameras to capture imagery data and track a person around a property. A camera is operable to activate itself upon detecting motion via a motion detector on the camera or upon a motion detector of another device detecting motion which is in the field of view of the camera. Upon detecting motion, the camera is operable to send an alert to the software platform, the entry management device, and/or a mobile device connected to the software platform. For example, a camera detects a guest or intruder using image or audio recognition and alerts the AI EM device 10 regarding the presence of the guest or intruder. The AI EM device 10 is operable to send an alert to a device based on this detection or is operable to command other cameras, robots, or IoT devices to track, record, communicate with, or otherwise engage with the guest or intruder. In one embodiment, a prerecorded or real-time or near real-time recording (e.g., received from a user device associated with the AI EM device 10) is sent from the AI EM device 10 to other cameras, robots, or IoT devices for playback in real-time or near real-time. The recording is operable to be played aloud by multiple devices simultaneously or sequentially in one embodiment. Sequential playing of this recording is determined by which device(s) the intruder is closest to, with the devices closest to the intruder playing the recording first and devices further away from the intruder or guest playing the devices next. These recordings are operable to be repeated by these devices until an intruder or guest is no longer identified as being on the property or until a predetermined threshold of number of playbacks is reached, which causes an alert to be sent to a user device associated with the AI EM device 10 or to the authorities.

In one embodiment, the AI EM device 10 is operable to command and control these cameras based on the detection of an intruder, a guest, or any other event. For example, a camera sends an image, a video, audio, or a notification of movement detection to the AI EM device 10, and the AI EM device 10 sends the image, the video, or the audio to the software platform, and the software platform uses an AI or machine learning (ML) algorithm or other algorithm, which in one embodiment includes facial recognition or action recognition to identify an intruder or a guest. The software platform then sends a command to the AI EM device 10 to command the camera to zoom in on the intruder or guest or track the intruder or guest. In one embodiment, an alert is sent to a user device associated with the AI EM device 10 that a certain person is on the property along with an identification of where that person is on the property (e.g., Karen is in your driveway or Roy is in your backyard). Alternatively, the AI EM device 10 commands another IoT device or a camera to zoom in on, track, or otherwise engage with the guest or intruder. In one embodiment, the AI EM device 10 is operable to analyze the audio, video, or image using an algorithm such as an artificial intelligence algorithm or machine learning algorithm without sending the audio, video, or image to a software platform. Alternatively, a local computing device such as an edge device is operable to analyze the audio, video, or image. In one embodiment, upon detection of an intruder or guest, the EM device instructs one or more cameras to scan the premises for a vehicle and capture images of a vehicle. In one embodiment, cameras include all functionality recited with respect to robots below, including weapon detection, action detection, etc.

In one embodiment, one or more cameras in combination with the AI EM device 10 are operable to detect a delivery of a package, such as drone delivery of a package and provide an alert to a user device associated with the AI EM device 10. The one or more cameras are operable to capture images, video, or audio, and recognize delivery of a package via a shape of a package or actions associated with delivering the package, such as a drone landing and taking off or a delivery person performing the action of delivering a package. This recognition occurs through software of the cameras, software of the AI EM device 10 upon images, video, or audio being sent to the AI EM device 10, or the software platform upon images, video, or audio being sent to the platform. This is particularly useful in situations when the delivery location is out of a line of sight of the AI EM device 10.

In one embodiment, an AI EM device 10 includes camera 22, microphone 24, motion detector 14, speaker 18, and housing 12. In one embodiment, the housing 12 has oval shape 16 with substantially open middle 20. Substantially open middle 20 includes a housing protrusion portion 26 configured to house camera 22, microphone 24, motion detector 14, and speaker 18. Shapes other than oval shapes (e.g., rectangular, circular, square, etc.) are compatible with the present invention.

In another embodiment, plurality of lights 28 are included with AI EM device 10. Plurality of lights 28 are positioned around periphery 30 of oval shape 16 of housing 12. In select embodiments, each of the plurality of lights 28 include a light emitting diode 32, also known as LEDs. One feature is that each of the light emitting diodes 32 of the plurality of lights 28 are configured to light up based on sounds emitted from speaker 18. With this configuration, one feature of the invention includes the plurality of lights 28 are configured to mimic AI EM device 10 as if it were talking. The plurality of lights 28 are configured to indicate an alarm has been triggered by flashing. Additionally, or alternatively, the plurality of lights 28 are configured to indicate a status of the AI EM device 10. As shown in the Figures, and best shown in FIGS. 6 and 7, in select embodiments of the disclosed AI EM device 10, LED lens 34 are included. LED lens 34 are operable to cover and protect the plurality of lights 28, like light emitting diodes 32. LED lens 34 include an oval shape 16 of housing 12. Alternative LED lens shapes are compatible with the present invention. In alternative embodiments, the LED lens includes a shape similar to that of the housing. For example, and not limitation, the LED lens is circular when the housing is circular.

In one embodiment, mounting bracket 36 is included with AI EM device 10. Mounting bracket 36 is configured for mounting housing 12 of AI EM device 10 to surface 38, as shown in FIG. 1. Mounting bracket 36 includes the oval shape 16 of housing 12. Alternative mounting bracket shapes are compatible with the present invention. In one embodiment, a shape of the mounting bracket matches a shape of the housing. In one example, the mounting bracket is rectangular for a rectangular housing.

In another embodiment, power source 40 is included with AI EM device 10. Power source 40 includes, but is not limited to, a hardwired power source (as shown in the Figures), a battery powered power source, a solar power source, the like, or combinations thereof.

In yet another embodiment, wireless communication device 42 is included with AI EM device 10. Wireless communication device 42 is housed inside of housing protrusion portion 26 of housing 12 of AI EM device 10. Wireless communication device 42 is operable to communicate with EM system 100, like a networked software platform, or the like, or other AI EM devices 10 via a wireless communication. The wireless communication of wireless communication device 42 includes, but is not limited to, Wi-Fi; UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, WA); the like; or combinations thereof.

One feature of the disclosed AI EM device 10 is that speaker 18 is operable to be positioned in housing protrusion portion 26 and oriented toward substantially open middle 20. This orientation of speaker 18 allows for projecting sound from speaker 18 out of AI EM device 10.

The AI EM device 10 includes at least one processor, at least one memory, and a non-transitory computer readable storage medium including software. The software includes program instructions configured for providing artificial intelligence to AI EM device 10. In select embodiments, the software is operable for development of intelligence within AI EM device 10, including, but not limited to, speech recognition, problem-solving, learning, planning, the like, combinations thereof, etc. In select embodiments of AI EM device 10, the processor includes a networked processor. The networked processor is connected to AI EM device 10 via a wireless communication to wireless communication device 42 on AI EM device 10. In other select embodiments, the processor includes a chipped processor. The chipped processor is housed inside of AI EM device 10, including, but not limited to, inside of housing protrusion portion 26 of housing 12 of AI EM device 10.

In another aspect, the present invention includes an AI EM system 100. The AI EM system 100 includes, but is not limited to, utilizing the disclosed AI EM device 10 in any of the various embodiments and/or combination of embodiments shown and/or described herein. As such, in general, the disclosed AI EM system 100 includes the disclosed AI EM device 10 with camera 22, microphone 24, motion detector 14, speaker 18, wireless communication device 42, the like, and/or combinations thereof. In addition, AI EM system 100 includes an AI device. The AI device is in communication with AI EM device 10. The AI device includes a processor with a non-transitory computer readable storage medium having software with program instructions configured for providing artificial intelligence to the AI EM device 10.

The AI EM device system 100 and AI EM device 10 is operable to unlock an access point including, but not limited to a door or gate or a storage container. As shown in FIG. 1, the AI EM device 10 is configured on a dwelling 91, an exemplary access point 90, and is configured to unlock the door-lock 94 on the door 92 of the dwelling. Also, the AI EM device 10 is further configured to unlock the lock 72 on the storage container 70, another access point 90', to enable retrieval of items therein or delivery of item into the storage container, or a compartment thereof.

As shown in FIG. 1, an exemplary AI EM system includes a robot 110, such as an aerial robot 111, that is operable to use a package manipulator 114 to pick up and release packages for movement of a package from a first location to a secondary location. The aerial robot is configured to fly and is commonly referred to as a drone. The aerial robot further includes a camera 112 for taking digital photographs or video and is operable to transfer the photographs and video to the exemplary AI EM system. The aerial robot is operable to be used for monitoring and surveillance of a delivery area and is further operable to create and monitor a geofence and/or MDA after a package has been delivered. After a package has been delivered, the aerial robot is operable to monitor an area and take and send images to a user device of administrator of someone entering a geofence area and/or an MDA. A robot speaker 116 is operable to be used to communicate with a third party, such as a delivery person, to provide logistic instructions for package delivery. A speaker is further operable to be used as an audible alarm. A microphone 117 is operable to receive communication from a third party that is provided to an administrator of the AI EM system, for example. An exemplary robot has a wireless signal transceiver 118 for communication with the AI EM system 100 such as the AI EM device 10. The robot is operable to send photographs, video, audio recordings and the like to the AI EM system which is operable to transfer the photographs, video, audio recordings, and the like to a user device of an administrator or a third party. A robot is further operable to communicate directly with a user device of an administrator or authority using the wireless signal transceiver 118. In one embodiment, the robot includes a controller 113 that incorporates artificial intelligence to control functions of the robot. A robot or drone is also operable to be controlled independently via the AI EM device or another device connected to the software platform of the present invention. The artificial intelligence of the robot is operable to interface with the artificial intelligence of the AI EM device, for example. Robot 110, like a drone or a land robot, is configured to be activated by AI EM system to investigate any suspicious activity, or threats, determined by the AI device. Once activated, robot 110, like a drone, is configured to leave its docking station and investigate such suspicious activities and/or threats. Whereby, robot 110 or drone is operable to relay information, like images, back to the system, issue a command to the suspicious activity or threat, and follow or track the individuals or vehicles, like by transmitting images of the vehicle, license plate, color, make, etc., as well as providing locational information or direction information of such suspicions activities and/or threats. The robot 110 or drone is operable to recognize the license plate characters and send these characters to the platform and/or the law enforcement device in one embodiment. In one embodiment, the robot 110, drone, or another device connected to the platform of the present invention such as a camera includes a license plate reader such as an automated license plate reader. One example of an automated license plate reader is described in U.S. Pat. No. 10,719,743, which is incorporated herein by reference in its entirety. Alternatively, recognition of the license plate characters is performed via software on the platform according to any method known in the art, including but not limited to optical character recognition. In one embodiment, the images, license plate characters, locational information, and/or directional information is sent to a platform of the present invention. Additionally, the images, license plate characters, locational information, and/or directional information is operable to be sent directly to a law enforcement device, either through the platform or by the robot 110 or drone directly. As such, robot 110, such as a drone, is operable to act as a deterrent for suspicious activities or threats. In one embodiment, a robot includes a light 119 that is activated when a motion or sound above a threshold value is detected. The robot speaker 116 is further operable to emit an alarm and the robot light 119 is operable to flash a color when a threat is detected, such as a person that is not identified by the AI EM system or someone carrying a weapon, such as a gun or knife. The robot speaker and a corresponding robot microphone also provide for two-way communication through the robot. Preferably, a mobile application associated with a person associated with the property running on a mobile device including a microphone and speaker provides for the person associated with the property to communicate with another person remotely through the robot.

An exemplary robot 110, such as the aerial robot 111, is operable to return to a docking station 140 wherein the robot is operable to monitor an area with the camera 112 and microphone 117 and recharge. As shown, aerial robot 111' is docked to the docking station 140 and is being charged, wherein a rechargeable battery 115 is receiving electrical power. This charging electrical power is operable to come from the dwelling, or from a renewable power source 150, such as a solar panel 152 as shown.

An AI EM system 100 includes or is operable to interface with a storage container 70 to lock and unlock said storage container for delivery and safe storage of items therein. A storage container 70, including a mailbox 71, collectively referred to herein as a storage container, further includes a lock 72 and a wireless signal transceiver 78 for receiving a wireless signal from the wireless communication device 42 of the AI EM device 10. An exemplary storage container includes a plurality of compartments that include separate locks 72, 72' for separate closures 79, 79' and features for retaining items therein, such as a heating device 80 or refrigeration device 86. As shown, a first compartment 74 includes a heating device 80 and a second compartment 76, separated from the first compartment by a divider 75, has a refrigeration device 86. Grocery items that need to be refrigerated are delivered into the refrigerated compartment and in cold climates, medications and other items are stored in the heated compartment to prevent freezing.

An AI EM system 100, as shown in FIG. 1, includes a number of control interfaces, such as the AI EM device 10, a mobile electronic device 60, such as a mobile phone, a smart wearable device, an electronic wearable device, tablet computer, or a control panel 210, which is configured within the dwelling 91 or building 93. The control interfaces are operable to set up specific routines or directions for the system after receiving input (e.g., from a user device). The routines or directions include setting a start and end time for a particular surveillance protocol including surveillance flight paths of aerial robots, for example. The AI EM device is configured to receive a selection of a start time of 10 PM and an end time of 8:00 AM for aerial robots fly surveillance flight paths or routes about the building from the user device. In one embodiment, the AI EM device, or a computing device in network communication with the AI EM device or platform, instructs a robot such as a drone or a land robot to create a defined patrol path, such as a flight path or a land path. In one embodiment, these paths are defined and implemented using the Global Positioning System (GPS). Alternatively, these paths are defined and implemented using any method of geolocation known in the art or described herein, such as geofencing. In one embodiment, a robot or drone is operable to survey a designated area using GPS or any other method of geolocation in the art to generate patrol paths such as flight paths or land paths for other robots or drones. By way of example and not limitation, an aerial robot is operable to instruct a land robot to follow a certain path based on data collected by the aerial robot, such as images, audio, or video. In one embodiment, the aerial robot is operable to perform image or audio recognition or send the images, audio, or video to the platform or the AI EM device to perform image or audio recognition. In one embodiment, a robot instructs other robots to follow paths independent of the robot or simultaneously with the robot. Programming of patrol paths includes programming periodic surveillance or triggered surveillance, such as surveillance triggered by image or audio recognition. The present invention is operable to use a combination of technology to enable mapping of areas and implementation of patrol routes. For example, Light Detection and Ranging (LIDAR) and/or Airborne Laser Swath Mapping (ALSM) are operable to be used in locations where density prevents GPS mapping. The present invention also is configured to receive a selection of drones or robots to follow patrol paths created by a robot or drone through the platform or the AI EM device of the present invention.

A mobile device connected to the software platform of the present invention is also operable to program, change, or alter a response of a drone, robot, or other device upon detection of an object, person, event, or threat in real time or near real time. In one embodiment, the mobile device is operable to program, change, or alter the response via the AI EM device.

The mobile electronic device 60 and or the control panel is configured to view images taken by the AI EM device 10 and/or a robot camera 112. Any of these control interfaces include artificial intelligence and are operable to communicate through the AI EM device or directly with components of the system, such as the robots and/or the storage container and/or any other access point, such as the front door to operate a smart lock to open or lock.

Figure 8:
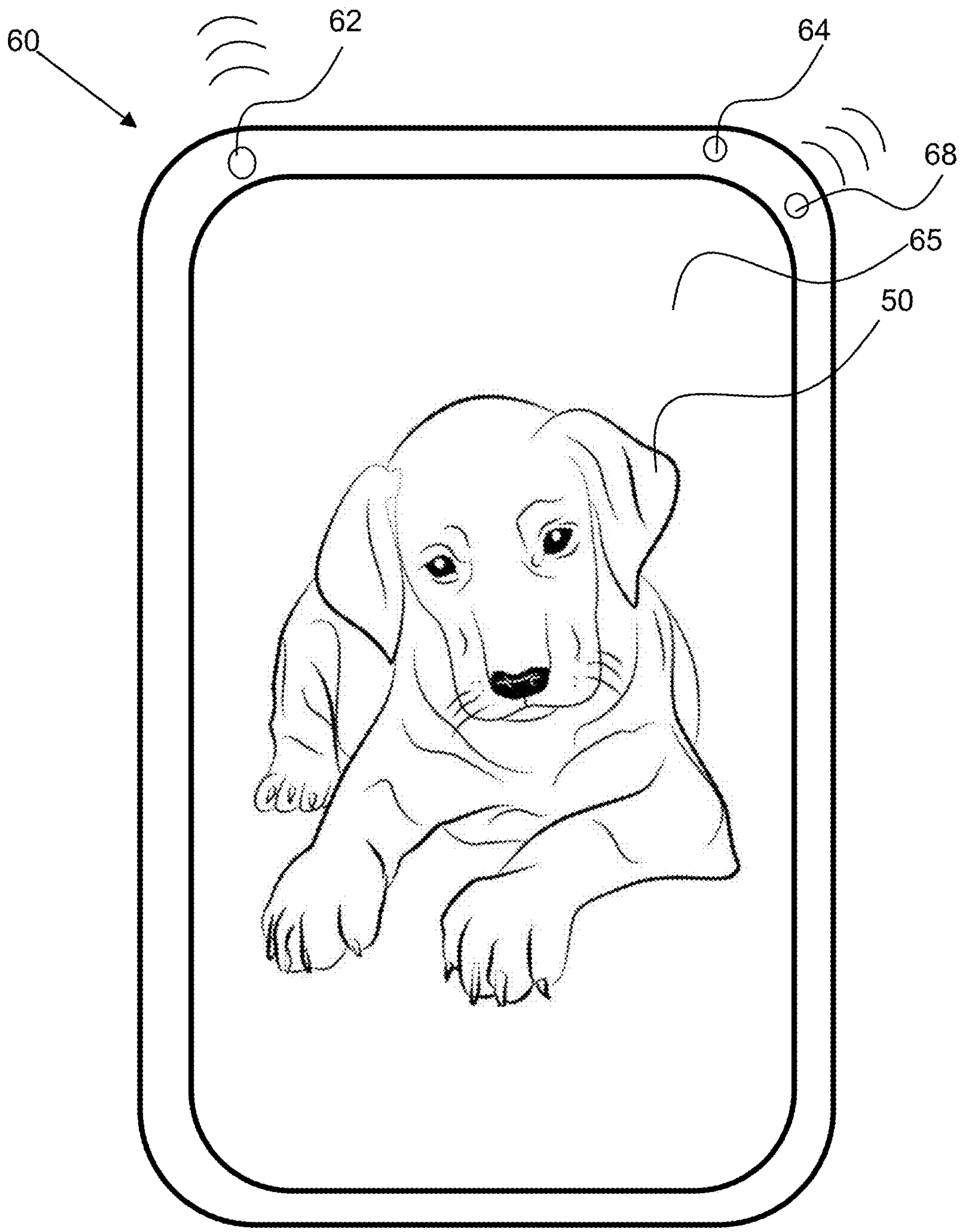
FIG. 8 shows a front view of a mobile electronic device with a digital photograph that is an image virtual key configured to be identified by the camera of the AI EM device and verified for access to an access point.

In one embodiment, an AI EM system 100 is configured to unlock the lock 72 of the storage container 70, or a compartment thereof, when a virtual key is verified by the AI EM device 10. As described herein, a virtual key includes an image that is read by camera 22 of the AI EM device 10, or an audible virtual key that is received by the microphone 24 of the AI EM device 10. An image virtual key 50, includes but is not limited to, a digital image that is sent by an AI EM system administrator, such as through an APP or as an attachment in a text message to a third party's mobile electronic device. As shown in FIG. 8, a user device of an administrator is configured to send a digital photograph of a puppy to a third party's mobile electronic device 60 which was received by a wireless communication device 62, such as a wireless signal transceiver. This image is shown on the display screen 65 to the camera 22 of the AI EM device 10 to gain access to an access point, wherein the door-lock 94 of the door to the dwelling is unlocked, or the lock 72 on the storage container 70 is unlocked, for example. In addition, the virtual key further includes an audible key that is played by the mobile device through the speaker 68. The microphone on the AI EM device is operable to receive the audible key in order to verify it. In an exemplary embodiment, both an image virtual key and an audible key are required for verification before an access point is unlocked. The mobile electronic device 60 further includes a microphone 64 for providing verbal input that is delivered to the AI EM system.

In one embodiment, an AI EM system 100 is configured to unlock the lock 72 of the storage container 70, or a compartment thereof, when a non-fungible token (NFT) or an image corresponding to a NFT is read by the AI EM device 10 and verified by the software platform. Alternatively, the NFT or image corresponding to the NFT is read by the AI EM device 10 and verified by the AI EM device 10 via a local database stored on the AI EM device 10. In another embodiment the NFT or image corresponding to the NFT is verified using an edge device or other device connected to the AI EM device 10. A NFT is a unique piece of data that is stored on a digital ledger and that can thus be used to represent a physical and/or a digital asset, e.g., in a transaction, in an inventory. In one embodiment, the NFT or the image associated with the NFT includes a virtual key. Because an NFT is unique, it certifies the identity and uniqueness of the associated asset. The token itself consists in one embodiment of cryptographic hashes of a chain of data blocks. The token is non-fungible in that a first token is not directly interchangeable with a second token; rather, the value of the first token and the value of the second token are determined in terms of a fungible unit (e.g., a cryptocurrency) in one embodiment. In one embodiment, the platform provides for creating an NFT from an image in a minting process. A NFT is operable to be minted from any image described herein. In order to mint an NFT, a user account is connected to a digital wallet. The digital wallet is in one embodiment a third-party digital wallet (e.g., METAMASK, TRUST WALLET, COINBASE) that is integrated into and/or accessible by the software platform of the present invention. Alternatively, the digital wallet is created and hosted by the software platform of the present invention. When the user account is connected to the digital wallet, the user account is operable to upload the image, e.g., as a file. The user account is operable to edit the image and/or descriptive data such as metadata regarding the image. The user account is also operable in one embodiment to edit the parameters of the image and/or its associated NFT, including but not limited to a scarcity, a uniqueness, a number of copies, an indivisibility, ownership data, copyright rules, a transparency, an interoperability, identification data, certification data, and/or at least one token standard for creating NFTs. In one embodiment, the platform is operable to support all ETHEREUM Request for Comment (ERC) standards as described by the ETHEREUM Improvement Proposals (EIP). For example, the platform is operable to support EIP-721: ERC-721 Non-Fungible Token Standard, which was written by Entriken, et al., and published Jan. 24, 2018 and which is incorporated herein by reference in its entirety. Tokenization standards for blockchain platforms other than ETHEREUM are also compatible with the present invention. In one embodiment, the platform supports fractional NFTs (f-NFTs), wherein the platform is operable to split the non-fungible token such that a user account is operable to own a fraction of the non-fungible token and its corresponding asset. Minting the NFT means that the token is stored on the distributed ledger (e.g., the blockchain) and is therefore immutable. The image is mapped to the token, and the token is stored in the digital wallet associated with the user account. In one embodiment, the token includes a cryptographic hash of data corresponding to the image. The image itself is preferably not stored in the digital wallet in order to allow for more efficient use of space in the digital wallet. In one embodiment, the platform of the present invention deploys at least one smart contract to handle minting of the NFT. In one embodiment, the parameters related to the NFT are accessible via the digital inventory and/or the digital gallery.

In one embodiment, a user account includes a media wallet. The media wallet is operable to store the NFT in a separate location from the digital wallet and is also stored on the blockchain. In one embodiment, the media wallet is operable to log media consumption data wherein the media consumption data includes views, shares, screenshots (including screen captures and/or screen recordings), comments, image data, video data, audio data, user data about a user account accessing the NFT, and/or web analytics related to the NFT. In one embodiment, the media wallet is further operable to manage access permissions to NFTs. In one embodiment, the access permissions are managed with at least one smart contract. The media wallet and the digital wallet are operable to be in communication with each other wherein the media wallet is operable to facilitate transactions of NFTs by accessing the digital wallet in order to send and/or receive fungible tokens in exchange for an NFT.

In one embodiment, the platform is operable to create an NFT in an automated manner. The platform is operable to recognize images, videos, and/or audio samples of value, save a piece of digital media based on the images, video, and/or audio samples of value, and tokenize the piece of digital media by minting an NFT and attaching the NFT to the piece of digital media. In one embodiment, the platform is operable to recognize the value of the piece of digital media by identifying at least one person, event, and/or context in the piece of digital media. The platform is then operable to create the NFT, set the parameters of the NFT and, in one embodiment, offer the NFT for sale in a marketplace. This embodiment is useful in situations where the NFT provides for entry to a commercial establishment, such as an exclusive club. The software platform of the present invention is operable to provide a marketplace for NFTs for commercial establishments. In another embodiment, the software platform is operable to make an NFT non-transferable, such as for an NFT used to obtain access to a family dwelling. Revocation of the ability of a NFT to unlock an access point via an AI EM device is also operable to be performed via the platform. Because every NFT is inherently unique, this advantageously provides for access of a specific account associated with the NFT to be restricted or prohibited while still providing for other accounts associated with different NFTs to access the entry point.

In another embodiment, each time an NFT is used to access an entry point, the entry is recorded on a blockchain or other distributed ledger. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

The present invention also provides for a cryptocurrency transaction to be processed upon a NFT or image associated with the NFT being read by an AI EMD. By way of example, an entry fee to a venue is charged to a user account upon the NFT or image associated with the NFT being read by the AI EMD. In another embodiment, a user account receives a cryptocurrency payment upon the NFT or image associated with the NFT being read by the AI EMD. By way of example, a service provider such as a house cleaner or a delivery driver is operable to be compensated upon scanning the NFT or image associated with the NFT. In another embodiment, the NFT or image associated with the NFT does not grant access to an entry point but rather only provides for payment via cryptocurrency to a user wallet from a different user wallet. The user wallet or the different user wallet is operable to be a user wallet associated with the AI EMD of the present invention, a service provider, or any other party.

A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the EIP-20: ERC-20 Token Standard, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet.

Alternatively, the present invention is operable to integrate a payments platform that is compatible with cryptocurrency, including, but not limited to, VENMO, PAYPAL, COINBASE, and/or payments platforms associated with financial institutions.

In another embodiment, the AI EMD or software platform provides data or information upon the NFT or the image associated with the NFT being read and verified. Any of the information or data described herein is operable to be provided upon the NFT or the image associated with the NFT being read and verified. Alternatively, the AI EMD or software platform is operable to instruct another device to perform an action upon the NFT or the image associated with the NFT being read or verified, such as an IoT device performing any action described herein or any other device in communication with the AI EMD or the software platform described herein performing any action described herein.

In yet another embodiment, an access key such as a virtual key, image, audio clip, video clip, NFT, or any other key, code, or data which is transmitted via a short-range or long-range communication protocol or operable to be captured by a camera, an image reader, a scanner, a microphone, or any other input device described herein or known in the art, is utilized in combination with polymorphic encryption such that a new access key, such as a new virtual key, a new image, a new audio clip, a new video clip, a new NFT, a new key, a new code, or new data is generated by the platform or an application connected to the platform at a predetermined time interval for an account which has been granted access to an access point (referred to herein as a "polymorphic access key"). Predetermined time intervals include at the beginning of every week (e.g., 12:01 am every Monday), the beginning of every day, every hour, or any other predetermined time period. In one embodiment, the predetermined time interval is not a regular time interval but is operable to be defined as a custom time. In another embodiment, polymorphic encryption is utilized such that each time an access point is accessed, a new access key, such as a new virtual key, a new image, a new audio clip, a new video clip, a new NFT, a new key, a new code, or new data is automatically generated by the platform and sent to an account or available for an account to access the next time that access is desired by the account. Using polymorphic encryption also provides for limiting the number of times that a device or account can access an access point by only providing a certain number of access keys to an account, such as a predetermined number of access keys. Polymorphic encryption advantageously provides for a new access key to be generated to provide access to the same access point at different periods in time. Changing the access key provides for increased security for an associated access point, as each access key has a shorter lifespan than a static access key, and outdated access keys which are intercepted by or obtained by third parties will not work to provide access to an access point. Examples of polymorphic encryption are discussed in U.S. Pat. Nos. 10,476,669, 9,866,373, each of which is incorporated herein by reference in its entirety. In one embodiment, polymorphic encryption is utilized such that each new access key is viewable via an electronic device (such as an image) or playable via an electronic device (such as audio). Alternatively, each access key is not viewable via an electronic device associated with an account which has been provided access, and is simply transmitted by the electronic device to an entry management device either automatically or upon selection of a command on the entry management device. In one embodiment, the access key is transmitted via short range communication such as Near Field Communication (NFC), BLUETOOTH, or radio frequency (RF). In certain embodiments, an image or other visual media such as a video or a graphics interchange format (GIF) file is operable to include an associated code. The code is operable to be embedded in the file, such as in the file header, at the end of the image file, or in metadata associated with the file. Advantageously, providing an associated code with the image provides for an additional layer of security, such that the image or other visual media cannot be merely copied and used by another device for access; rather, to grant access or entry, the associated code must be sent to the reader from the device which displays the image, such as a mobile phone using a short range communication protocol (e.g., NFC, RF, BLUETOOTH, etc.). In one embodiment, the reader sends a request to the device displaying the image after reading the image. Alternatively, the code is transmitted from the device while the image is displayed. This is in contrast to prior art such as Quick Response (QR) codes or bar codes used for tickets to venues in that these QR codes or bar codes can be duplicated via a variety of techniques or easily intercepted or sent to third parties. In other words, the mobile device is configured to display an image associated with the polymorphic access key and emit the wireless communication including a code associated with the polymorphic access key, with the image associated with the polymorphic access key not providing access to the account, the electronic device, the vehicle, the physical space, or the virtual space or not being configured to start or activate the machine, the robot, or the drone upon reading or receiving the image associated with the polymorphic access key without also reading or receiving the code associated with the polymorphic access key.

The access key is preferably able to be displayed on or transmitted from a mobile electronic device, such as a mobile phone, a tablet, a smart watch, a pager, or any other device operable to receive data via a communications protocol or communications network. In one embodiment, the mobile electronic device includes cellular and/or wireless internet connectivity. Alternatively, the mobile electronic device does not include cellular and/or wireless internet connectivity and is operable to receive an access key such as a virtual key, image, audio clip, video clip, NFT, or any other key, code, or data over a network or through a one-way communications protocol. In one embodiment the mobile electronic device is configured to only receive the access key over a first network such as a radio network and communicate the access key to a reader via a second network or via a second communication protocol such as NFC or Bluetooth. Advantageously, a device configured to receive an access key via a first network which is not configured to send data over the first network provides a solution for entry management for restricted facilities via an electronic device where devices which are configured to send information over a cellular network are prohibited, such as cellular phones or smart phones in a government facility.

In one embodiment, the polymorphic access key is generated in real time or in near real time by an algorithm of the present invention in the cloud, at a server, by another device connected to the platform such as an administrator device, or at an edge device. The polymorphic access key is operable to be generated upon a request of a device authorized to receive the polymorphic access key upon the software platform verifying the identity of the device. In one embodiment, the identity of the device is verified using a device identifier, a device Internet Protocol (IP) address, or a medium access control (MAC) address. Alternatively, polymorphic access keys are created in advance and sent to an account or a device associated with an account upon occurrence of a trigger event, such as a request for the access key, a time period expiring, or a prior access key expiring or being utilized to request access.

In one embodiment, polymorphic access keys of the present invention are utilized to provide access to any type of device or account known in the art. In an exemplary embodiment, a polymorphic access key is provided to an account on a mobile device to enable access to an account on another electronic device. For example, the polymorphic access key on the mobile device is operable to provide access to an email account on a laptop upon the laptop receiving and verifying the polymorphic access key from the mobile device. The polymorphic access key is operable to be verified by the access management device requesting verification of the polymorphic access key from the software platform in one embodiment. Other accounts, such as social media accounts, financial accounts, streaming accounts, and accounts for merchant websites, are operable to be accessed through use of the polymorphic access key instead of a username and password. In one embodiment, a device loads a website which prompts for a polymorphic access key to access an account. A mobile device receives a communication or an instruction to request a polymorphic access key, requests a polymorphic access key, and displays or otherwise communicates the polymorphic access key to the device to login and access the account. The mobile device is operable to receive a communication from the device which includes an instruction to request the polymorphic access key, such as a communication via a wireless network (e.g., over WIFI) or using short-range communication protocol such as NFC or RF. Alternatively, the mobile device is identified by a phone number, email address, or another unique identifier. A reader on the device such as a camera, NFC reader, or RF reader is operable to read or receive the polymorphic access key, verify the polymorphic access key is valid and corresponds to a particular account, and then cause the website to log into the account. Although the term "website" is used in this example, any other type of software login is considered within the scope of the present invention, such as a mobile application or desktop application. Accordingly, the present invention provides for account access without a username and password and just through the polymorphic access key in one embodiment. In another embodiment, the polymorphic access key is operable to provide access to a virtual space on the mobile device or on a separate device, such as a virtual reality (VR) or augmented reality (AR) device. A virtual space includes a location in a metaverse or a virtual world in one embodiment. In another embodiment, the polymorphic access key is operable to provide access to files, documents, data, or any type of media on the mobile device or another electronic device. Like the polymorphic access key which is operable to provide access to an access point, these polymorphic access keys are operable to be a virtual key, image, audio clip, video clip, NFT, or any other key, code, or data which is transmitted via a short-range or long-range communication protocol or operable to be captured by a camera, an image reader, a scanner, a microphone, or any other input device described herein or known in the art. A back-end system for the associated account is operable to generate the polymorphic code in real time or near real time in one embodiment. Alternatively, for an account which has a fixed permitted number of times the account is operable to be accessed, a predetermined series of polymorphic access keys is operable to be generated, with a mobile device receiving one key in the series of polymorphic access keys sequentially based upon the polymorphic access keys already sent to the mobile device and used to access an account. Polymorphic access keys are also operable to provide access to other devices, such as access to a user account on a laptop, access to a smart device or Internet of Things (IoT) device, or any other device in the art for which access is desired or required. In another embodiment, polymorphic access keys are operable to provide access to computers, electronic devices, doors or access points, and any type of data or information. Polymorphic access keys are also operable to start or operate electric vehicles or gas-powered vehicles such as cars, boats, planes, and lawn mowers, and to start or operate machines, robots, and drones. Advantageously, the polymorphic encryption prevents the fraud and misuse and hacking into of devices, vehicles, machines, robots, and drones. In yet another example, polymorphic access keys are provided to a mobile device for a short-term rental such as a hotel room or an AIRBNB property automatically at predetermined time periods. For example, a first access key is provided at the check-in time (e.g., 3 pm). A second access key replaces the first access key upon the expiration of the active time period for the first access key (e.g., midnight), with the second access key being operable to access a virtual or physical space or account for a predetermined time period. In one embodiment, polymorphic access keys are assigned based on the Internet Protocol (IP) address of a device, such as a mobile phone.

Another feature of AI EM system 100 is that the software includes programming instructions that, when executed, cause AI EM device 10 to execute entry management and ecommerce support functions including the delivery of messages, directives, instructions, greetings, recordings, and facilitating the connection of a third party for two-way audio/video communication.

A greeting includes, but is not limited to, a contextual greeting that includes some context to the third party, such as their name, or the name of an organization they are associated with. For example, a friend Jan, comes over to water the plants while an owner is away and the AI EM device system is operable to provide a greeting to Jan that includes her name. In another example, a UPS delivery driver is operable to be tracked by the AI EM device system and a greeting that includes the "UPS" name is provided when the delivery person moves within a threshold range or distance of the AI EM device or when they provide their virtual key. The AI EM system is operable to track an electronic device having a global positioning system by receiving a location from the mobile electronic device or by interfacing with a program, such as an Application software, or App, to receive location information regarding the electronic device. For example, and not limitation, a package delivery person includes a transponder or other device that is used to track their location or the location of their vehicle and the AI EM system is operable to interface with a program or database to determine this location.

In one embodiment, a greeting is contextual for a particular occasion, such as for holidays or special occasions including birthdays, anniversaries and the like. An exemplary AI EM system is operable to offer occasion greeting packages that include a song or other occasion specific messages for an additional fee to the administrator.

In one embodiment, the AI EM system 100 includes a motion detector 14 of AI EM device 10 that is configured to activate upon motion and provide a greeting, command, or instructions, whereby system 100 is operable to activate upon recognition of a paired mobile device. The paired mobile device includes a stored identification paired via the approval of an owner/administrator. The pair mobile device is configured to receive the approval via an owner/administrator mobile device. The owner/administrator includes individuals assigned programming rights configured to allow the owner/administrator to make selections remotely via the AI EM system. When activation occurs, the AI EM device 10 is configured to provide a spontaneous response, or a pre-programmed response in accordance with the device it detects. In yet another embodiment, the AI EM system 100 includes an AI EM device 10 configured to provide a spontaneous response, or a pre-programed response in accordance with the image read by camera 22.

In one embodiment, the AI EM system 100 is operable, when activated, simultaneously, to send a notification to the user device of an owner/administrator with an option to engage remotely in two-way communication, activate a preprogrammed or custom message, provide a virtual key or activate the recording for a message, detect a person or a device via camera 22, microphone 24, motion detector 14, or wireless communication device 42 and provide an intelligent response to the person or device via speaker 18 or wireless communication device 42.

In yet another embodiment, the AI EM system 100 is configured when a package is scanned by camera 22 of AI EM device 10, to initiate a geofence and/or MDA around an area of AI EM device 10. A geofence is a monitored area within proximity of an access point and/or the AI EM device. An MDA, or monitored designated area, is an area created by AI EM device within the field of view of camera 22. A geofence and/or MDA proximity distance from an access point and/or the AI EM device is about 1 m or more, about 5 m or more, about 10 m or more, about 20 m or more, about 50 m or more. In one embodiment, when the geofence and/or MDA of AI EM device 10 is initiated, AI EM device 10 is configured to utilize motion detector 14, camera 22, microphone 24, or combinations thereof, for detecting a breach of the geofence area and/or MDA around AI EM device 10. In select embodiments, when a breach of the geofence area and/or MDA around AI EM device 10 is detected, the AI EM system 100 is configured to: alert the owner via a wireless notification; trigger the EM device to set off an alarm of the EM device; trigger an external alarm; the like; and/or or combinations thereof. In select embodiments, when the package is placed in the geofence area and/or MDA around AI EM device 10, the AI EM device 10 is operable to receive input to activate and to monitor the geofence area and/or MDA via motion detector 14, camera 22, microphone 24, or combinations thereof. In other select embodiments, the AI EM device is operable to receive input to deactivate the geofence area and/or MDA about the AI EM device 10. In one embodiment, the input includes, but is not limited to, scanning of the package or a virtual key, whereby the package is retrieved. Once scanned, the notification, alarms, or combinations thereof are deactivated by the scanning of the package or the virtual key, and a subsequent scan can reactivate the geofence area and/or MDA around AI EM device 10. The AI device 10 is configured to learn various inputs according to one embodiment of the present invention. For example, the software of the AI device is configured to relate to the occupants of the building for enabling name recognition by AI EM device 10. The AI device is further operable to enable AI EM device 10 to establish contact, record messages, or deliver a message from the person or persons named. In another embodiment, the AI device is operable to interface with other AI devices, like other AI EM devices 10 configured as a part of AI EM system 100. When AI EM device 10 is activated by motion, the detection of a paired mobile device, the presentation of a virtual key, or the owner/administrator, AI EM device 10 is configured to cause the programming instructions of the software to activate or turn on AI EM system 100. The AI device 10 is also operable to cause AI EM device 10 to detect the person and interpret voice detected by microphone 24 from the person. Upon detecting a person and interpreting a voice detected by the microphone 24, the AI EM device 10 is configured to provide an intelligent response including, but not limited to, logistics, a greeting, a command, directions, a message, an inquire, a recording request, an alarm to speaker 18, the like, and/or combinations thereof. The wireless communication device 42 is configured to establish the identity of the person or the device once paired. In one embodiment, after pairing, the AI device is configured to recognize the device and provide a customized greeting, specific instructions, access, or actions for the associated AI device 10. The AI device is further configured to require authentication of an image or mobile device that is active and unlocked, AI device 10 must be active, or combinations thereof, prior to providing the customized greeting, the specific instructions, access, or the actions for the associated device 10. Advantageously, the AI device 10 is operable to recognize the previously paired mobile device and a virtual key or an identification sequence. In one embodiment, if there is not a confirmed identification, a third-party authentication is sought which is an embedded code within the virtual key, or an audible or verbal response code including, but not limited to, a word or words, a sentence, a number or numbers, sounds, or letters. Examples of virtual keys include, but are not limited to, a humanly created mark, drawing, written sequence of numbers, letters, abstract sketch, or picture.

The wireless communication device 42 of AI EM device 10 is operable for exchanging data between AI EM device 10 and fixed and mobile devices over short distances using wireless communications, including, but not limited to, Wi-Fi or UHF radio waves in the industrial, scientific and medical radio bands (e.g., from 2.402 GHz to 2.480 GHz), and building personal area networks (PANs), also known as Bluetooth® (Bluetooth trademark owned by Bluetooth SIG, Inc. of Kirkland, WA). The AI EM device 10 is operable to communicate directly with, or through the platform with, one or more electronic devices of security personnel or law enforcement. The AI EM device 10 is operable to work on a networkable platform with networked software accessible and interactive with any other devices running the networked software and participating on the networkable platform. In one embodiment, the networkable platform is configured for use by a variety of members including owners, service personnel, property management, real estate professionals, short term rentals, hotels, employees, the like, etc. In one embodiment, the networkable platform is operable to provide access and logistics to additional industries and uses.

In one embodiment, the AI EM device 10 is operable to scan a code, an image, or any other data or symbol which is operable to grant access to a property and retrieve a profile associated with the device or account associated with the code, image, or the other data or symbol operable to grant access to the property. The AI EM device 10 is then operable to send one or more command and control messages to one or more of a plurality of IoT devices or other devices connected to the AI EM device 10 over a network or via one-way or two-way wireless or wired communication. For example, a profile includes settings for one or more thermostats, one or more smart locks, one or more lighting devices, one or more smart window devices, one or more media devices, and/or one or more smart sockets. The AI EM device is operable to control these devices directly through a wireless connection between the AI EM device and the devices or through a platform, with the AI EM device and the devices being connected to a network such as a wireless network (e.g., WI-FI, cellular, etc.). All references to control of other devices through the AI EM device described herein are understood to encompass direct control or control of other devices through a platform. The software platform associated with the AI EM device is operable to store account or profile information for a plurality of users. In one embodiment, a hierarchy of profiles or accounts exists, wherein higher ranked accounts (e.g., parent or administrator accounts) are operable to set and overrule settings for lower ranked accounts (e.g., child, guest, or service people accounts). Overruling settings includes manually overruling settings through the platform based on input (e.g. provided via a user device). The overruling settings are associated with the lower ranked account or overruling implemented settings in a property or house upon the EM device allowing a user device associated with a higher ranked profile to enter a home. In one embodiment, compromise settings exist between two accounts of the same hierarchical level. For example, a compromise setting includes the thermostat settings of a first account overruling the thermostat settings of a second account but the lighting settings of the second account overruling the lighting settings of the first account. Profiles are customizable such that there are different settings for different times of the year, different days of the week, and different times of day.

In one example, the AI EM device 10 receives an image from a device associated with the profile, and the AI EM device 10 sends a command to a smart thermostat to set a temperature of one or more rooms or floors to a certain setting. These temperature settings are operable to be set through a software application connected to the AI EM device 10 or the software platform of the present invention. In one embodiment, there is a hierarchy of profiles, such that settings of an adult account overrule settings of a child account. For example, a child account includes a thermostat setting of 75 degrees for a living room, and an adult account includes a thermostat setting of 72 degrees for the living room. If the child account is granted access by the AI EM device 10, the AI EM device 10 sends a command to the thermostat for the living room to set the temperature to 75 degrees. Upon the adult account being granted by the AI EM device 10, the AI EM device 10 commands the thermostat to adjust the temperature in the living room to 72 degrees. Conversely, if the adult account is granted access first by the AI EM device, the AI EM device sends a command to the thermostat to adjust the temperature of the living room to 72 degrees. Upon the child account being granted access by the AI EM device after the adult account has already been granted access, the AI EM device does not send a command to the thermostat to adjust the temperature of the living room. In another example, only certain thermostats are commanded to adjust the temperature of certain rooms or floors. An adult account granted access to the property only causes thermostats on the first floor to be adjusted as to a predetermined settings since the bedroom of the adult is on the first floor. Conversely, a child account granted access by the AI EM device after an adult account is granted access does not cause the settings of any network devices or IoT devices to change since the adult account has a higher priority than the child account.

In another embodiment, a child account is granted access to certain rooms or certain areas in a property via unlocking of smart lock IoT devices for these rooms or areas when the AI EM device grants access to a child account. The child account is permitted to access a study via unlocking of a smart lock associated with the study but a smart lock associated with a playroom is not unlocked in one embodiment. Alternatively, thermostat or lighting IoT devices are utilized to incentivize or disincentivize certain behavior, with a thermostat in a study being set to a warmer temperature in winter months than a thermostat in a play room upon the child account being granted access by the AI EM device.

Additionally, network connected or IoT lighting devices are operable to be controlled based on the AI EM device granting property access a certain account. For example, the AI EM device is operable to grant access to a guest account associated with a service technician such as a plumber and turn on lighting associated with the area the plumber will be working (such as a bathroom or a kitchen) and lighting on a path from the entryway to the area where the plumber will be working. In another embodiment, these lighting devices are operable to include settings associated with a particular account or profile. In one embodiment, an adult profile includes a brightness setting for one or more lighting devices, with the AI EM device operable to overrule or not implement settings associated with a child profile based on the adult profile settings. Lighting devices are also operable to be utilized to incentivize or disincentivize certain behavior, with lighting in a study being set to automatically be turned on for weeknights after school hours for a child account while lighting in a playroom is not automatically turned on for a child account during these time periods.

Smart window devices such as smart curtains or smart blinds are also operable to be controlled autonomously based on profile settings. In one example, smart curtains are automatically opened upon a maid account being granted access to a property by the AI EM device.

In another embodiment, profile settings also control media devices such as audio, video, and/or gaming devices. By way of example, an audio device connected to the AI EM device is operable to play a different audio track or playlist associated with a profile upon the user device associated with that profile being granted access by the AI EM device.

Smart sockets are also operable to be connected to the AI EM device platform. Any electrical device is operable to be plugged into a smart socket, with the AI EM device being operable to cause the smart socket to be powered on or off based on settings associated with a profile upon the user associated with that profile being granted access by the AI EM device. For example, a stove is powered on when the person who typically cooks dinner is granted access by the EM device. In another example, a laptop computer is provided power when the owner of that computer is granted access via the EM device.

IoT or network devices include at least one alarm system associated with the access point in one embodiment, with the alarm system operable to be automatically deactivated upon the EM device receiving a command to unlock the access point. The EM device is preferably in wireless communication with at least one alarm system associated with the access point, and wherein, upon receiving a command to unlock the access point, the facial recognition module identifies any authorized individuals within a predetermined distance of the access point, and the at least one alarm system is automatically disactivated if any authorized individuals are detected.

In one embodiment, settings for any network device or IoT device are operable to be overruled in real-time via an interface of a mobile device by an administrator or parent account.

In another embodiment, wearables or sensor data is operable to be uploaded to the platform, and IoT devices are operable to be automatically adjusted based on this data. For example, body temperature data is operable to be sent to the platform and thermostat temperature or the temperature of a cooling or heating device, such as a cooling or heating mattress pad, mattress, or piece of furniture such as a chair is operable to be adjusted based on the wearable data in real time or near real time. Additionally, or alternatively, the AI EM device is operable to provide wearable data and other data about settings and history of settings for IoT or network devices to an account associated with the platform, such as a caregiver or nurse account. This enables a caregiver or nurse to better care for people in the property, and in one embodiment the caregiver or nurse account is operable to overrule settings on the fly for the benefit of the health of people within the house.

Wearable data is also useful for granting access to certain devices or areas within a house. For example, the system (e.g., via an EM app) is operable to verify a child exercised for a predetermined period of time using wearable data (e.g., steps, heart rate, etc.). The system (e.g., via the EM app) is operable to grant access to a device (e.g., gaming console) or a room of a house (e.g., playroom).

In one embodiment, a mobile device associated with a profile remains in network communication with the platform or the AI EM device while the mobile device is within the house or property associated with the AI EM device. In one embodiment, a geofence is created around the house or the property (including the boundaries of the property), and the platform or AI EM device determines when the mobile device and/or a smart electronic device leaves the geofence and automatically locks the access point and turns off or adjusts settings associated with one or more IoT devices or network devices. In another embodiment, an application on the mobile device and/or the smart electronic device is operable to determine a geolocation of the mobile device and/or the smart electronic device and transmit the geolocation of the mobile device and/or smart electronic device to the platform, with the platform being operable to automatically lock the access point and turn off or adjust settings associated with one or more IoT devices or network devices upon the mobile device and/or smart electronic device moving a certain distance away from the AI EM device. Location data is created in the present invention using one or more hardware and/or software components. By way of example and not limitation, geolocation data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Geofence and geolocation technology is also operable to be used to determine when child accounts or guest accounts have left a house or property. In one embodiment, an alert is sent to a user device corresponding to a parent account or administrator account upon a detection by the platform that a child account or guest account has left the property or house.

In select embodiments of AI EM system 100, a transponder device is included. The transponder device is configured to utilize a global positioning system or a wireless communication to identify a mobile device and begin to transmit a signal for easy identification and detection. In select embodiments, the transponder device is attached to a stationary object, a door, a room, a building box or a storage container. In one embodiment, upon AI EM device 10 detecting the transponder device, the programming instructions of the software are configured to: send out an audible noise, illuminate, provide mapping instructions or directions to the mobile device to provide guidance in locating a specific location of the stationary object, door, room, building box, or the storage container via the speaker; illuminate lights on the EM device; provide a mapping direction on the device including: an exact location; a location inside a building, a building without a geo address, a container, a storage unit; the like; and/or combinations thereof. As such, the transponder device is configured to take over where a global positioning system ends to guide the person or the device to a specific location inside a geofence or outside a geofence. The AI EM device 10 is operable to utilize the global positioning system, Wi-Fi, radiofrequency (RF), Bluetooth®, or another wireless communication to identify a mobile device previously paired and initiate actions including messages, access, logistics to guide the person or the device to the specific location such that the geo position of AI EM device 10 activates various actions. When the transponder device is activated and detects the person or the device within a set range, the transponder device is operable to emit a signal, a sound, a light, or input to AI EM device 10 configured to guide and direct the person or the device to the specific location.

The camera 22 of the AI EM system 100 is operable to read a virtual key from the person or the device, and upon reading the virtual key, AI EM device 10 is configured to unlock an access point, provide a greeting, instructions or logistics, record a message, or establish contact with the individual requested. In select embodiments, the virtual key includes, but is not limited to, a humanly created image including, but not limited to: a humanly created photo; a humanly created picture; a humanly created drawing; a humanly created mark; a humanly created number or numbers; a humanly created letter or letters; a humanly created word or words; the like; and/or combinations thereof. The camera 22 is also operable to read a virtual key from the person or the device, and upon reading the virtual key, AI EM device 10 is configured to activate a drone to retrieve deliveries from a specific location.

In select embodiments of AI EM system 100, the access point is a delivery storage container or mailbox. In these embodiments, AI EM device 10 is operable to lock and unlock the delivery storage container or mailbox. In select embodiments, the delivery storage container or mailbox include a refrigerated compartment on an inside of the delivery storage container or mailbox. The refrigerated compartment is configured for food or other refrigerated items. In select embodiments, the refrigerated compartment is a first portion of the inside of the delivery storage container, and a second portion of the inside of the delivery storage container is configured for parcels. In other select embodiments, the refrigerated compartment is the entire inside of the delivery storage container. Yet in other select embodiments, the refrigerated compartment is the entire inside of a first delivery storage container and a second delivery storage container is configured for parcels. In other select embodiments, the delivery storage container or mailbox includes a warmer on the inside of the delivery storage container or mailbox. In one embodiment, the warmer is configured to warm the inside of the delivery storage container or mailbox. In one embodiment, a feature of AI EM system 100 is that system 100 is configured to control delivery storage container or mailbox the ability to select warmer, refrigerated, parcel, or a combination thereof per section of the delivery storage container or mailbox. In select embodiments, the delivery storage container or mailbox is positioned just inside a door of a home and AI EM system 100 is configured to unlock and lock the door of the home for deliveries to the delivery storage container or mailbox. In one embodiment, the position of the delivery storage container or mailbox is configured to prevent the need for deliveries to be walked through the house to the kitchen. A feature of the delivery storage container or mailbox is the inclusion of an ultraviolet light on an inside. The ultraviolet light is configured for sanitizing the inside of the delivery storage container or mailbox including sanitizing any parcels placed in the inside of the delivery storage container or mailbox. In select embodiments, the delivery storage container or mailbox includes AI EM device 10 on an outside of the delivery storage container or mailbox. In other select embodiments, the delivery storage container or mailbox includes an alarm attached to the delivery storage container or mailbox configured for security. In other select embodiments, the delivery storage container or mailbox includes lighting attached to the delivery storage container or mailbox configured for illuminating the delivery storage container or mailbox and area around the delivery storage container or mailbox. In other select embodiments, the delivery storage container or mailbox includes a power source which includes, but is not limited to: a wired power source; a battery-operated power source; a solar power source; the like; and/or a combination thereof. In other select embodiments, the delivery storage container or mailbox includes a warmer configured to heat the inside of the delivery storage container or mailbox. In other select embodiments, the delivery storage container or mailbox includes a wireless connection configured to control the delivery storage device or mailbox via a mobile device or a personal computer, including being configured to control the locking and unlocking of the delivery storage container or mailbox, controlling the temperature inside of the delivery storage container or mailbox via the warmer or the refrigerated compartment, the ultraviolet light inside of the delivery storage container or mailbox, or combinations thereof.

In yet another embodiment, the AI EM system 100 is operable to create and analyze data relating to delivery services and supply chain management. In this embodiment, scanning of a code on a package by the EM device updates a database with information including time and date of delivery, length of time from when merchant shipped the good to when the customer received the good, and other pertinent information for insights on supply chain. Aggregation and analytics of this data provides for determining trends in deliveries in certain geographic areas and determining average delivery times for certain couriers from the time of hand off to the courier to delivery. For example, the AI EM device is operable to provide data related to the frequency of use of the AI EM device for entry, package delivery, or any other function described herein, the type of deliveries made, the cost of products delivered, a number of deliveries made by different couriers using the EM device, a total cost of products delivered using the EM device, an average cost of products delivered using the EM device, and/or any other statistic operable to be determined from a label of a package or through image or audio analysis. In one example, the platform is operable to aggregate this data across multiple AI EM devices for certain locations, such as neighborhoods, zip codes, cities, states, countries, etc.

This information is useful for providing analytics about which couriers are active in a certain area, which merchants are shipping packages in a certain area, and even granular analytics relating to individual delivery drivers, routes, and supply chain. Potential consumers of this information include couriers to determine courier competitor activity by date, time, and geographic area, and merchants to determine merchant competitor activity by date, time, and geographic area. For example, a clothing merchant is interested in activity of a competitor in a certain geographic area and is able to obtain information about this activity through the aggregation of data by the AI system of the present invention regarding different courier activity for different merchants in a geographic area.

In another embodiment, the AI EM system 100 is operable to create and store data relating to entries and attempted entries for the AI EM device, such as an aggregated number of attempts to access the access point using the EM devices and a number of times entry has been granted to the access point using the EM device.

In one embodiment, the AI EM device 10 is configured as a receptionist device for corporate, commercial, institutional or industrial applications. The receptionist device is configured to provide custom messages for each occupant and for receiving and recording custom messages for each user. In one embodiment, the receptionist device is operable to forward wirelessly forward information to each occupant, or information is retrieved from AI EM device 10 by displaying a virtual key assigned to each occupant. As discussed above, a plurality of AI EM devices 10 are operable to be configured as receptionist devices for corporate, commercial, institutional, or industrial applications. In one embodiment, each of the plurality of AI EM devices 10 is operable to interact and communicate with each other. In one embodiment, the plurality of AI EM devices 10 is operable to relay messages to the occupant.

The microphone 24 of the AI EM device 10 is operable to identify an audible key from the person or the device. Upon identifying the audible key via microphone 24, AI EM device 10 is configured to unlock an access point or provide a greeting, information or logistics. In select embodiments, the audible key includes, but is not limited to, a word, words, a sentence, a number, a sound or sounds, wherein microphone 24 is configured to match the audible key with the person or device. In select embodiments, the AI device is configured to assign audible keys to a variety of users, whereby the AI device is further configured to provide access or information to each of the variety of users via a user device. In other select embodiments, the AI device is configured to maintain a record of each of the variety of users. Yet in other select embodiments, the AI device is configured to record audible messages.

In another aspect, the present invention includes an AI EM system 100 with a plurality of AI EM devices 10. Each of the plurality of AI EM devices 10 is the disclosed AI EM device 10 in any of the various embodiments and/or combination of embodiments shown and/or described herein. As such, in general, each of the AI EM devices 10 is configured for use with an AI device in communication with the EM device 10 including a processor with a non-transitory computer readable storage medium comprising software having program instructions configured for providing artificial intelligence to the AI EM device 10. A network platform in communication with each of the plurality of AI EM devices 10 is included. The network platform is configured to allow each of the plurality of AI EM devices 10 to communication with each other.

In select embodiments of AI EM system 100 with a plurality of AI EM devices 10, the plurality of AI EM devices 10 are located in a neighborhood. In one embodiment, each of the plurality of AI EM devices 10 are configured with the ability to communicate if a crime such as a burglary occurs in any other house or activate and pan the streets to record all traffic activity. In one embodiment, the plurality of AI EM devices communicates with each other via a peer-to-peer (P2P) protocol. Alternatively, an AI EM device 10 is operable to send an alert to the platform of the present invention, and the platform is operable to send an alert to a plurality of AI EM devices 10 registered with a platform as being associated with a particular neighborhood or specific geographic location, such as a zip code, a city, a borough, a community, or any other geographic area. In one embodiment, the alert is also sent to an authority device, such as a police device, a sheriff device, a firefighter device, a paramedic device, etc. In another embodiment, an AI EM device 10 is operable to communicate with other AI EM devices to request the other AI EM devices to deploy at least one drone or at least one robot. In one embodiment, each AI EM device, drone, robot, or profile associated with any of these devices includes a setting which authorizes the AI EM device, drone, or robot to accept a request to be deployed. The setting includes parameters which must be met for the AI EM device, drone, or robot to be deployed in one embodiment, such as a certain percentage of battery charge, no people, objects, or events detected within a predetermined time period of receiving the request, etc. In another embodiment, the AI EM device, drone, or robot is operable to override the request upon detection of an object, person, or event within an area associated with the AI EM device. In this instance, the AI EM device is operable to send a command to the drone or robot to return to the area associated with the AI EM device and perform a certain action, such as patrolling or engaging with an object or person. The at least one robot or the at least one drone is operable to follow a patrol path requested by the AI EM device 10 or a patrol path designated by the associated other AI EM device. In one embodiment, the patrol path is within a geofence associated with the relevant AI EM device. Alternatively, the patrol path is within a predetermined location such as a street of a neighborhood. In yet another embodiment, the drone or robot is operable to be take a defensive position around a house such as near an entry way (e.g., a door) or a window of a house or an entrance to a property such as an area near a gate and maintain the defensive position for a predetermined period of time. The drone or robot is operable to hover, remain stationary, and/or change the angle of a camera or other sensor in the defensive position. In one embodiment, the robot or drone is operable to hover, remain stationary, or change the angle of a camera or other sensor autonomously and in real time or near real time based on a detection of an object, person, or event of interest by the robot, the drone, another robot, another drone, an entry management device associated with the robot or drone, or another entry management device. In one embodiment, the robot or drone is operable to communicate data, such as audio data, video data, and positioning data, to the associated AI EM device, which then communicates the data to other AI EM devices. Alternatively, the AI EM device associated with the drone or robot communicates the data to the software platform of the present invention, which then communicates the data to other AI EM devices. Although this embodiment is described primarily with respect to drones and robots, the present invention is also operable to be utilized in connection with cameras and other electronic devices including sensors to reposition the angle or location of the camera and/or other electronic devices. In one embodiment, an electronic device associated with an AI EM device is operable to receive an alert from the software platform upon another AI EM device in the same community as the AI EM device sending data or an alert to the software platform.

Geographic location is just one parameter around which a community watch or neighborhood watch network of AI EM devices is established. In another example, a community watch network or neighborhood watch network is operable to be established regardless of geographic location, such as a group of family or a group of friends. By way of example, a family community watch network includes multiple AI EM devices from different family members across the country. Upon an AI EM device from a grandparent detecting an object, person, or event of concern, such as a gunshot, break in, unauthorized person, unknown person, unknown object, etc., the AI EM device is operable to communicate with the software platform of the present invention and send an alert to an AI EM device or electronic device associated with a child or grandchild, which provides for accessing the AI EM device or other electronic device such as a camera, robot, or drone associated with the AI EM device. In one embodiment, the AI EM device or electronic device associated with the child or grandchild allows for control of the AI EM device or other electronic device such as a camera, robot, or drone associated with the AI EM device located on the grandparent's property through the software platform of the present invention. Alternatively, the AI EM device or electronic device associated with the child or grandchild is operable to view data, including images, audio, or video, through a camera, robot, or drone associated with the AI EM device located on the grandparent's property through the software platform of the present invention and take a separate action, such as contacting a neighbor of the grandparent or contacting authorities. The invention therefore advantageously provides for family members to be informed in real-time or near real-time about events occurring in other family members' properties, and to take any action which helps prevent or reduce damage or harm to people or property.

As shown in FIG. 1, AI EM device 10 of AI EM system 100 is configured as a doorbell device 10. The doorbell device 10 is operable to be positioned on or proximate to a door, and the system includes a lock on the door. The doorbell device 10 includes a computing device comprising a computer processor, such as a microcontroller. The microcontroller is operatively connected to camera 22 and the lock on the door via a Wi-Fi or Bluetooth® (Bluetooth trademark owned by Bluetooth SIG, Inc. of Kirkland, WA) signal. When camera 22 scans and processes a preprogrammed bar code, image, numbers or pictures, the microcontroller of the doorbell device 10 sends a signal unlocking the door lock. Also, camera 22 processes a preprogrammed bar code, image, numbers or pictures, a signal is received from the cloud server or computer processor after authentication causing a locking device to open or access to be gained. In one embodiment, the doorbell device 10 includes a card reader adapted for electronically reading identification cards, credit cards, and the like. The microcontroller is operable to comprise a computer processor and a non-transitory computer readable storage medium comprising software having programming instructions that, when executed, cause the microcontroller to carry out the above-described steps. According to an embodiment of the invention, the software is operable to for use as an application on a mobile smart phone and/or a smart wearable device. The doorbell device 10 is operable to include and interface with one or more AI devices.

According to another embodiment of the invention, the system comprises the AI EM device 10 or doorbell device 10 or an independent scanner located near or secured to a door, or in proximity to or secured to a lock box or other storage apparatus. The lock box or other storage apparatus is operable to contain letters, packages, or other deliveries. The lock box is configured to be located near an entry point, built into a residential or commercial structure, located in a free-standing structure such as a mailbox or decorative column, in the ground or other places within the range of a Wi-Fi/Bluetooth® (trademark owned by Bluetooth SIG, Inc. of Kirkland, WA) signal. The independent scanner is configured for wireless or wired capabilities. The entire system is configured to be wired, wireless and/or battery operated. A warning signal is delivered to an administrator(s) when any battery in the system becomes weak.

The independent scanner is capable of reading bar codes, images, numbers, and pictures. Upon reading and processing a preprogrammed bar code, image(s), numbers or pictures, a lock on the door, lock box or other storage apparatus is unlocked. Also, upon reading and processing of preprogrammed bar code, image(s), numbers or pictures, the present invention is configured to audibly deliver an appointed message or a general message or to deliver the appointed message or general message via a text to a mobile phone or an e-mail.

The independent scanner and/or the EM device or devices connected to the independent scanner and/or the EM device is capable of voice recognition of audio input. In one embodiment, voice recognition refers to an ability to recognize words and/or phrases spoken by a person. Voice recognition according to the present invention includes any voice recognition technology known in the art, such as the technology described in U.S. Pat. No. 10,650,802, which is incorporated herein by reference in its entirety. The platform is operable to receive the voice commands, recognize at least one word and/or at least one phrase in the voice command, and instruct the independent scanner, the EM device, or a device connected to the independent scanner and/or the EM device to perform an action based on the at least one word and/or the at least one phrase. Alternatively, the independent scanner, the EM device, or a device connected to the independent scanner and/or the EM device is operable to perform an action based on a recognition of at least one word or at least one phrase in the voice command and the platform is operable to receive a notification that the action has been performed based on the voice command. Alternatively, the platform, the independent scanner, the EM device, or a device connected to the independent scanner and/or the EM device is operable to not take an action based on the voice command. For example, absolute or time-based restrictions or rules implemented for the independent scanner, the EM device, or a device connected to the independent scanner and/or the EM device by the platform overrule the voice command and cause the action requested via the voice command to not be taken. In one embodiment, a database of recognized voice commands is stored on the platform or in a device connected to the platform. If a voice command is not included in this database, the platform is operable to instruct the independent scanner, the EM device, or a device connected to the independent scanner and/or the EM device to take no action and optionally provide an audio or visual response or notification that the independent scanner, the EM device, or a device connected to the independent scanner and/or the EM device is not taking any action, such as a voice message (e.g., "I'm sorry, I did not recognize that command" or "I'm sorry, your request could not be completed") or flashing a red light. In one embodiment, a log of all voice commands is stored in a database connected to the platform of the present invention.

In another embodiment, the software application or software platform is operable to perform voice identification or voiceprint recognition, i.e., identification of a person by the sound of the person's voice. In one embodiment, voice identification or voiceprint recognition utilized in the present invention includes the voiceprint recognition described in U.S. Pat. No. 10,629,209. Voice identification is operable to be utilized in conjunction with voice recognition of voice commands, such that certain voice commands are implemented or denied based on voice identification of a user and the corresponding authorization status of the user. Implementation or denial of voice commands is operable to be performed by the platform or by the independent scanner, the EM device, or a device connected to the independent scanner and/or the EM device.

In one embodiment, the independent scanner includes numbered buttons for additional authentication or to route information or notification to the appropriate user device. The independent scanner is configured to be positioned at an entry point or in proximity of a lock box, storage facility or compartment. In another embodiment, the scanner comprises a storage or lockbox container with a built-in scanner either wired, wireless or battery operated.

According to an embodiment of the invention, the system includes a card reader capable of reading identification cards, credit cards, and the like. In one embodiment, the card reader is incorporated in the AI EM device 10, or in the independent scanner.

According to an embodiment of the invention, the system includes a scanner/reader incorporated in another device connected to a storage container, box, storage facility or the like.

According to an embodiment of the invention, the system includes a secure storage container located on a property for the purpose of receiving packages and deliveries. The container includes an automatic locking and unlocking mechanism triggered directly by the scanner remotely via wireless technology or via a signal from a computer or cloud server. The storage container is operable to be built into a structure, such as a house, located inside a column or other decorative structure, or is free standing. In one embodiment, the storage container or lock box is equipped with a scanner.

According to an embodiment of the invention, the system includes a computer processor and a non-transitory computer readable storage medium comprising software having programming instructions that, when executed, cause a computer processor to carry out various steps described herein. According to an embodiment of the invention, the software is adapted for use as an application on a mobile smart phone.

The software is configured to create a virtual key based on input (e.g. from a user device). Specifically, the software is operable to create bar codes, images, and pictures and is further operable to forward them, such as by text or e-mail, to allow access to authorized visitors, deliveries, service personnel, and the like. The virtual key includes a bar code, a graphic image such as a photograph, and/or an alphanumeric code comprised of letters and/or numbers. In a preferred embodiment, the virtual key comprises a graphic image and an underlying alphanumeric code, and the scanner is adapted to read graphic images and alphanumeric characters. If weather or other issues prevent the scanner from being able to read the graphic image, the scanner is operable to read the alphanumeric code. In another embodiment, the virtual key comprises a graphic image and an underlying code that is operable to be used for authentication of the image, and the scanner is adapted to read graphic images and bar codes. If weather or other issues prevent the scanner from being able to read the graphic image, the scanner is operable to read the alphanumeric code. When the scanner reads the virtual key, it initiates one or more actions, such as unlocking an associated lock to allow access to a secured location or container, or transfer data to a computer processor or a cloud server to authenticate the key or perform the functions enabling access.

The scanner is configured to wirelessly transmit notifications to the appropriate user device enabling a remote signature receipt. The software application or software platform is operable to deliver a specific message for the specific bar code, image, picture and/or number(s) to input. The software enables remote programming of the scanner, lockbox, storage etc.

The software application or software platform enables remote two-way communication via wireless mobile devices. The software application or software platform is operable to coordinate the actions of all features of the system. The software application or software platform is operable to receive data from a plurality of mobile devise or fixed devices via Internet, WI-FI, or other wireless or wired means.

The software enables the programmer to create a virtual key, which includes, but is not limited to, a unique barcode, character, picture, letter(s) and/or number(s). A corresponding virtual key is sent to designated recipient(s), such as delivery or service personnel. When scanned, access is gained, or a message is delivered from the system. The software allows access and messages to expire as programmed in accordance with each unique barcode, character, picture, letter(s) and/or number(s).

Each virtual key is operable to be programmed to have a predetermined limited life span. Upon creating a virtual key, the AI EM system is further operable to set a predetermined data and time at which the virtual key will expire and no longer provide access based on a selection (e.g., from a user device).

The software is configured to require a driver's license scan or card reader for the purposes of verifying entry. The software is operable to time stamp every activation and document identity when desired. The software allows notifications to be sent to one or more mobile devices.

The software enables the person notified wirelessly to forward a unique barcode, character, picture, letter(s), and/or number(s), etc. to one or more recipients to provide access or messages.

The software is operable to send a delivery confirmation to a user device of a sender, the delivery service and/or others involved. The software allows owners to change access according to need for residents or guests, thereby eliminating the need to change locks.

The software enables preprogrammed messages, directives to different individuals in accordance with the corresponding scan. The software enables a remote signature, symbol, and/or image to be sent from a handheld device to the system, enabling the delivery person to obtain such through the scanner or doorbell or other system apparatus.

The software is operable for a mobile or stationary transmission of a barcode, image, etc. for the purposes of access, message and/or information. The software has voice recognition and artificial intelligence, enabling dissemination to appropriate user devices and interface with an authorized delivery person or guest. The artificial intelligence is operable to provide information, directives, and/or greetings etc.

The software application or software platform enables all devices in the system to be synchronized in a secure manner by usernames and passwords or similar identification protocol. In one embodiment, the system is be referred to as "Virtual Access Locator Technology" (VALT). The system comprises:

- Scanner/Scanner/Doorbell/Light apparatus mounted in proximity to a door, lockbox, storage, compartment or other secured location or container.
- Scanner includes illumination, camera, speaker, microphone, alarm, and reader(s) for cards, mobile phones, and mobile devices.
- Controller comprised of a catalogue of keys for creation of a variety of selected inputs to be sent or transmitted to the scanner or to an individual(s) with a remote device or to an email address, or other address. Each virtual key, bar code, alphanumeric input has the capability of triggering a corresponding message, directive, etc. from the system when a scan is performed.
- Controller(s) consisting of programmable devices (computer, laptop, cell phone, tablet, smart wearable devices, etc.) running a software application controlling one or more systems of the invention.
- Lock box(s), storage, compartments for storage of deliveries that interface with the controller and the scanner.
- Software with a menu of features to customize the VALT system for uses such as managing construction sites and deliveries, providing remote contact by real estate agents with prospective buyers, forwarding an electronic code/virtual key for access utilizing the scanners, and serving property owners with a secure method of receiving deliveries.
- A camera for monitoring package deliveries, recording access and egress, and date stamping time of events.
- Two-way communication for wireless communication between person initiating scan and appropriate person(s).
- Motion detection for activation of system or the pressing of a button.
- If a delivery package requires a signature and the occupant is not home, the scan will enable the system to notify the occupant and to forward an electronic signature to the deliverer as well as remote access triggered to a selected structure, such as a lockbox, storage, compartment.
- An app enabling networking of AI devices within or outside the Wi-Fi network.

An embodiment of the invention comprises a general-purpose computer that has been programmed to perform particular functions as a specific purpose computer pursuant to the instruction from program software, such as the software described above.

According to an embodiment of the invention, when a package, letter or other delivery is anticipated, the source of the delivery (e.g., an online retailer), identifies itself as a VALT application member enabling the source to select delivery options which include the provision of a virtual key to the retailer or carrier for delivery. The system is operable to designate specific delivery instructions, access, and/or access points for each delivery after receiving input (e.g., from a user device). The virtual key includes, but is not limited to, a predetermined bar code(s), graphic image(s), and/or other access authorizing input. When the purchaser receives the access authorizing input, that input is entered into the VALT system. The delivery source is further configured to provide the authorizing delivery input (virtual key) to a delivery person responsible for delivering the package, letter, or other delivery to the purchaser. Alternatively, the purchaser provides the virtual key to the delivery person. The VALT system stores the authorizing input until an anticipated match is received (e.g., from a delivery person) (bar code, image, numbers, etc.).

The VALT system scanner scans the input from the delivery person to determine if it matches the authorizing input that had been entered by the purchaser. When a match occurs, the VALT system is triggered to initiate one or more of the following actions:

- Provide access (such as by unlocking a door or container)
- Deliver a preprogrammed message to the source of the delivery
- Establish contact with appropriate individual(s)
- Date stamp delivery
- Notify appropriate individuals of delivery (such as the intended recipient)
- Initiate two-way communication
- Activate camera
- Activate motion detection
- Activate the AI device which will then interface with the VALT system providing instructions, directives, etc.

In an alternative embodiment of the invention, the system is operable to receive the authorizing input, such as a bar code(s) or image(s) (e.g., via a user device) and the system is operable to transmit the authorizing input to an authorized delivery source device. For example, and not limitation, the system is configured to create a personalized authorizing input based on input received (e.g., via a user device from an individual). The individual provides the personalized authorizing input to an online retailer at the time of making a purchase from the online retailer.

According to an embodiment of the invention, the system is configured to create barcodes, images, etc. or other authorizing inputs based on input (e.g., from a user device (e.g., a system administrator device)) that are sent for the purpose of access:

- Deliveries
- Guest
- Family
- Real Estate Sales
- Service and repair personnel
- Property management
- Online real estate rental platforms, such as Airbnb In one embodiment, the EM system is operable to create a label and transmit the label to a plurality of vendor devices based on input (e.g., from a user device (e.g., an administrator/owner user device)) The label is created by using identified numbers or codes received by the EM system such as credit card number, number provided by administrator/owner at the time of order, and/or image selected by the administrator/owner at the time of order.

According to an embodiment of the invention, the VALT system is operable to send a signal to a variety of access points. One of which includes mail compartments, storage compartments, entry, or other. Once access is provided, the access information becomes invalid, or programmed to expire at a designated time.

The VALT system includes the ability to deliver messages or information associated with each scan. The system is further operable for voice recognition and AI (artificial intelligence), either built in or networked with other external AI devices, enabling it to conduct inquiries, provide information, and respond to inquiries.

The VALT system is connectable to a database for the purpose of reading drivers' licenses or other Identification cards or badges. The VALT system date stamps, stores and configures a report of all activity. The VALT system confirms deliveries, date stamping each, and provides access to package containers, storing them safely.

According to an embodiment of the invention, the two-way communication enables remote communication with the device of an owner/administrator and the device of a person triggering the scan.

Locking compartments or storage compartments for the VALT system are constructed and configured in the structure or located in proximity to a structure in range of the VALT wireless input, the cloud server running the application, edge computing network, and/or a mobile device running the application.

In select embodiments, the VALT system comprises a scanner device, such as the AI EM device 10 described above. Upon the purchase of an item from an online retail seller platform, a virtual key is created and transmitted to the AI EM device 10 of the item purchaser. The virtual key includes, but is not limited to, the specific IP address of the purchaser. The virtual key is also sent to the designated retailer or delivery service that is to deliver the item to the purchaser if a VALT membership is confirmed. Upon delivering the item to the purchaser's location, the delivery service presents the virtual key, which includes a bar code that is scanned by the doorbell device. Upon scanning the virtual key, the VALT scanner AI EM device 10 transmits a signal to the application server, computer processor or door lock that unlocks the door 112. The VALT system is operable to program the virtual key so that it expires after a predetermined number of uses at the AI EM device 10. For example, the virtual key is configured to expire after it has been scanned one time by the AI EM device 10. As such, the virtual key cannot be used again. Alternatively, the virtual key is programmed to activate at a predetermined time and expire at a predetermined time.

According to an embodiment of the invention, the VALT system is operable to be used in the field of real estate sales. Real estate agents send access information wirelessly via user devices in the form of a bar code or image to a potential buyer visiting a home for sale. The potential buyer inputs the access information into the system to unlock the door of the home and gain entrance. The VALT system is further configured to confirm the identity of the potential buyer via driver's license scan. The system is operable to monitor access via built in camera(s), conduct remote tour via interior cameras and monitor exit. The VALT system is operable be used with online real estate rental platforms, such as Airbnb.

In another embodiment of the invention, the VALT system is operable be used to receive service providers at a location, such as building contractors, sub-contractors, repair men, cleaning staff and other service personnel doing work at a residence. The VALT system is operable to create access information and transmit the access information to user devices corresponding to service providers. The system is operable to receive the access information to grant access to the residence.

Another embodiment of the invention comprises a mobile app that allows for the creation of a virtual key to enable the transfer of keys for accessing a structure.

According to an embodiment of the invention, the VALT system comprises an AI device and AI EM device 10 having camera 22 that is operable to be used as a scanner and a mobile app that is operable to be utilized by merchants. The mobile app allows the transfer of specific barcode or other information. Also, included in the app is the ability to create virtual keys which are operable to send to delivery personnel or service people. An unlocking component is associated with the creation of the virtual keys.

According to an embodiment of the invention, the virtual key expires at a predetermined time selected by the creator of the virtual key. The virtual key is configured to be securely sent to a cell phone and/or smart wearable device for access by various personnel.

In another embodiment of the invention, multiple artificial intelligence (AI) devices such as robots including aerial robots, communicate with one another in an established network. This allows messages to be shared, transmitted, and stored in other AI devices for both security and information purposes. If a delivery occurs and the recipient or occupant is not available, the VALT system communicates with the AI device with a notification that is stored or sent to another AI device. According to an embodiment of the invention, membership in the network is accepted via programming of a code, IP address, or some other identifier that is accepted by another device or devices for shared communication. The information extends to the merchant who has the ability to send a message to an AI device regarding delivery, shipping, or order information. The AI device is further operable to communicate instructions to the delivery person via the VALT scanner or independently, in addition to storing important information (e.g., from a delivery or service person).

Another embodiment of the invention provides a system for delivering merchandise comprising an online membership platform that is configured to receive personal data such as name, address, and credit card data information at the time of creating a membership via a user device. A virtual key is created in connection with at least one account corresponding to at least one member of the platform; the virtual key optionally includes special instructions for delivery personnel, for example preferred location for leaving packages at the delivery address. The membership platform is operable to be accessed at the time of making an online purchase. For example, an online retailer makes customers aware of the membership platform and provide a link to the platform when customers are about to make a purchase from the online retailer. Returning customers who have already created a membership enter a password to bring up their existing membership. The system includes a scanner device that is operable to read bar codes, images, and alphanumeric symbols. The scanner device is operable to be encoded with the personal data of a particular user, including a virtual key corresponding to a user's device. The online retailer delivers the encoded scanner device to the particular user when a membership is created on the membership platform that corresponds to the particular user.

The scanner device is configured to be positioned proximate to an access door of the user's home, business or other delivery location. The scanner device includes adhesive or other attachment means that allows the scanner device to be securely attached to the user's home, storage container or other secure location. The scanner device includes but is not limited to, a speaker, microphone, a display screen and a camera. Preferably, the display screen is a touch screen. When a delivery is scanned, confirmation of receipt of the package is transmitted to the online retailer and the user device. Upon scanning of the package, the scanner device reads the virtual key.

If the membership platform received special delivery instructions, then the speaker is configured to broadcast audibly the instructions (such as "place the package on the back porch") and/or present the text on a touch screen. The system is further operable to capture audio (e.g., from a delivery driver) via a microphone. Advantageously, this enables the delivery driver to communicate with a user via the system when the delivery driver is having an issue. The online retailer offers an "upgraded" scanner device that includes means for installing an electronic lock on the user's access door that is operatively connected to the scanner device. Upon scanning of the package by the scanner device, the scanner device reads the virtual key, which triggers the electronic lock on the access door to unlock for a predetermined amount of time to allow the delivery driver to place the package inside the user's home.

According to another embodiment of the invention, the VALT application is configured to maintain a record of every activation and access key. A record is maintained of each activation that includes the virtual key utilized for the activation, the IP address and authorized user of the mobile device of the individual and/or entity utilizing the virtual key for access, the duration of stay, and the date/time of departure and/or termination of the virtual key.

According to another embodiment of the invention, the VALT application includes voice recognition technology and the virtual key comprises an audible recording of a series of numbers, words and/or sounds, which is operable be created by input received from an administrator (e.g., via a user device). The voice recognition technology is operatively connected to the scanner device whereby the scanner device is adapted to receive and process voice data. When the scanner device receives and processes the audible sound of the virtual key one or more actions is initiated, such as unlocking a door to a structure and/or providing a greeting and/or logistics information.

According to another embodiment of the invention, access to the VALT application is protected by biometric recognition of at least one user. Access to the VALT application is granted by the system when predetermined biometric data of the at least one user is authenticated by the system. Authentication is achieved when scanned fingerprints and/or other physical features of the user are received by input capture mechanisms (e.g., camera, video lens, etc.) of the EM device.

According to another embodiment of the invention, the VALT system includes a secondary power source that enables the system to continue working in the event of a power outage. The secondary power source (a) serves as a backup power source, (b) charges a battery capable of powering the system when electricity is not available, and/or (c) contains a backup energy/power device capable of powering the system. In one embodiment, the secondary power source includes one or more solar (photovoltaic) panels.

According to another embodiment of the invention, the virtual key is operable to trigger a drone device that retrieves a package and takes it to a designated storage area. Rather than the virtual key being used to access a structure, the key activates a drone device that flies to the delivery area and retrieves the package when the key is scanned.

Another embodiment of the invention includes a system that is referred to herein as "Mapping and Locator Technology" (MALT). The MALT system is an optional or additional feature of the VALT system. In accordance with the MALT system, a global navigation satellite system, such as the Global Positioning System (GPS), is used to interface with multiple devices to initiate access and/or activate messages or logistics when devices are within a particular range of distance between each other. The MALT system is configured to receive the particular range of distance necessary to initiate access and/or messages or logistics. The range of distance includes but is not limited to, five feet. Alternatively, in another embodiment, the range of distance is less than five feet. In yet another embodiment, the range of distance is greater than five feet. The GPS detects the geo-location of each device, and when it is determined that the multiple devices are within the particular range of distance of each other, then a number of different actions are initiated, such as granting access to a structure and/or activate messages and logistics.

The MALT system, utilizing a standard GPS service, is operable to establish a relationship between a host device and one or more mobile devices running the VALT application. The mobile devices include, but are not limited to, mobile smartphones and smart wearable devices. The host device comprises a computer processor and is linked to each mobile device using the IP address of each mobile device. In one embodiment, the host device is an AI device. When the mobile device comes within proximity of the host device, the host device initiates one or more actions, such as providing access to a structure and/or providing a greeting and/or logistics information. This feature eliminates the need for optics and/or near-field communications (NFC). When utilized in delivery services it enables the carrier to simply arrive and come within proximity of the host device.

In another embodiment, the MALT system, utilizing a standard GPS service, is configured to establish a relationship between a mobile device and a specific landmark or address. When the mobile device is within proximity of the specific landmark or address, access or logistics are activated utilizing. The mobile devices include, but are not limited to, mobile smartphones or a mobile device (e.g., carrier's DIAD) which are be utilized for access and logistics. This feature eliminates the need for optics and/or near-field communications (NFC). When utilized in delivery services, it enables the carrier to simply arrive and come within proximity of the landmark or address.

The MALT system is configured to interface with devices of VALT members. Information and logistics are programmed into each carrier's mobile device and when the carrier's mobile device is within proximity of a landmark or address, access and directives are initiated.

According to a preferred embodiment, the MALT system is operable to utilize a virtual key for added security. The host device is the AI EM device 10 described above. The AI EM device 10 is linked to a mobile device using the IP address of the mobile device. In addition, a virtual key is created and transmitted to the linked mobile device. When the mobile device comes within proximity of the AI EM device 10 and the virtual key is read by the AI EM device 10, the host device initiates one or more actions, such as unlocking the door to the structure operatively connected to the AI EM device 10 and/or providing a greeting and/or logistics information. In order to initiate the action, the linked mobile device must be within the particular predetermined range of distance of the AI EM device 10 and the AI EM device 10 must read the virtual key from the mobile device. This provides an added layer of security. The virtual key includes, but is not limited to, a bar code, a graphic image, such as a photograph, and/or an alphanumeric code comprised of letters and/or numbers. Preferably, the virtual key comprises a graphic image and an alphanumeric code. If weather or other issues prevent the AI EM device 10 from being able to read the graphic image, the AI EM device 10 is operable to read the alphanumeric code.

In a method according to a preferred embodiment of the invention, the MALT system is operable to be used in a delivery process. When delivery of an item, such as package or letter, is anticipated, a virtual key is created and transmitted, such as by e-mail or text, to the delivery service responsible for delivering the item. The virtual key preferably comprises a graphic image and an underlying alphanumeric code. The virtual key is created by taking and selecting a photograph and entering a series of alphanumeric characters. Alternatively, the virtual key is created via a user device corresponding to a seller of the item to be delivered, and the seller user device transmits the virtual key to the user device of a recipient and the user device of the delivery service responsible for delivering the item. The delivery service transmits the virtual key to the mobile device of the delivery person delivering the item. In addition, the delivery person's mobile device is linked to the recipient's AI EM device 10 via the IP address of the mobile device. The AI EM device 10 is provided at the home of the recipient. The AI EM device 10 is operatively connected to an access point of a structure, such as the front door of the recipient's home whereby the AI EM device 10 is configured to lock and unlock the front door. When the delivery person arrives at the recipient's home, the delivery person presents the virtual key on his mobile device to the AI EM device 10. When the AI EM device 10 detects that the delivery person's linked mobile device is within the required range of distance and reads the virtual key on the mobile device, the VALT system initiates one or more actions, such as provide access (such as by unlocking the front door), provide a preprogrammed message to the delivery person, contact the recipient or other appropriate individual(s), date stamp delivery, notify appropriate individuals of delivery (such as the intended recipient), initiate two-way communication between the recipient and the delivery person, activate the camera, activate motion detection, and activate an AI device which interfaces with the VALT system providing instructions, directives, etc.

The MALT feature is operable to be activated or canceled via the VALT application. VALT offers at least two levels of authentication and convenience: (1) image identification with a code to prevent the forwarding or transfer of the image, and (2) code detection via NFC for the purposes of verifying the image code. The use of GPS makes deliveries interactional and intuitive by providing immediate access and/or information or directives.

Figure 9:
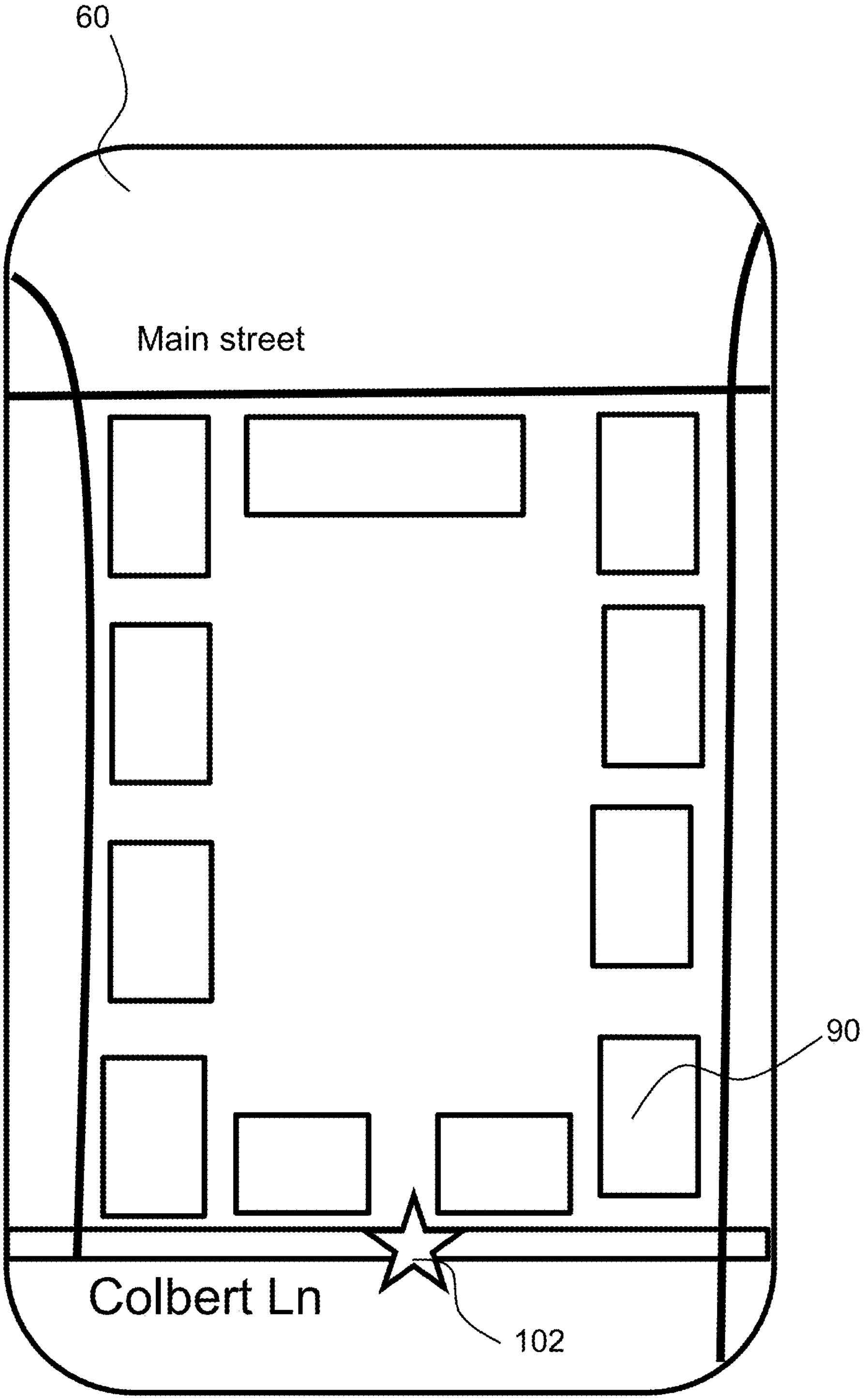
FIG. 9 shows a display screen showing the AI EM system tracking a mobile electronic device, such as a mobile phone, of a third party to enable a contextual greeting and to provide logistic instructions to said third party when their mobile device moves within a threshold distance of the AI EM device.

Mobile electronic devices and GPS provide advantages over GPS and vehicle location. The VALT application uses GPS to provide delivery confirmation when the mobile device of the carrier and the VALT host are in proximity. As shown in FIG. 9, a mobile electronic device 60 is tracked by the AI EM device system, wherein a location of a mobile electronic device 102 of a third party 102, such as a mobile phone or beacon with respect to an access point 90, as represented by display 15 of the AI EM device system, as an example. It is to be understood that the tracking is accomplished without any display output, however the display 15 is provided on the AI EM device 10, and/or on the third party's mobile electronic device and/or an administrator's mobile electronic device. The AI EM device system 100 is operable to provide a contextual greeting when the third party's mobile electronic device moves within a threshold distance from the AI EM device 10, such as within about 20 m or less, about 10 m or less, about 5 m or less and any range between and including the threshold ranges provided. The contextual greeting includes the name of the person associated with the third party mobile electronic device or the name of a company that they are associated with. The AI EM system is operable to provide a greeting and/or logistic instructions for delivery of a package, such as "Hi UPS driver, please place the package in the storage container on the porch." This tracking and display feature is provided and/or accessed by an administrator on an electronic device including a mobile electronic device. Furthermore, the display on the AI EM device is operable to show the location of a tracked delivery person, as shown. The AI EM system enables a person to pull up the location of a delivery person before leaving or entering their home to know when to expect a delivery.

Figure 10:
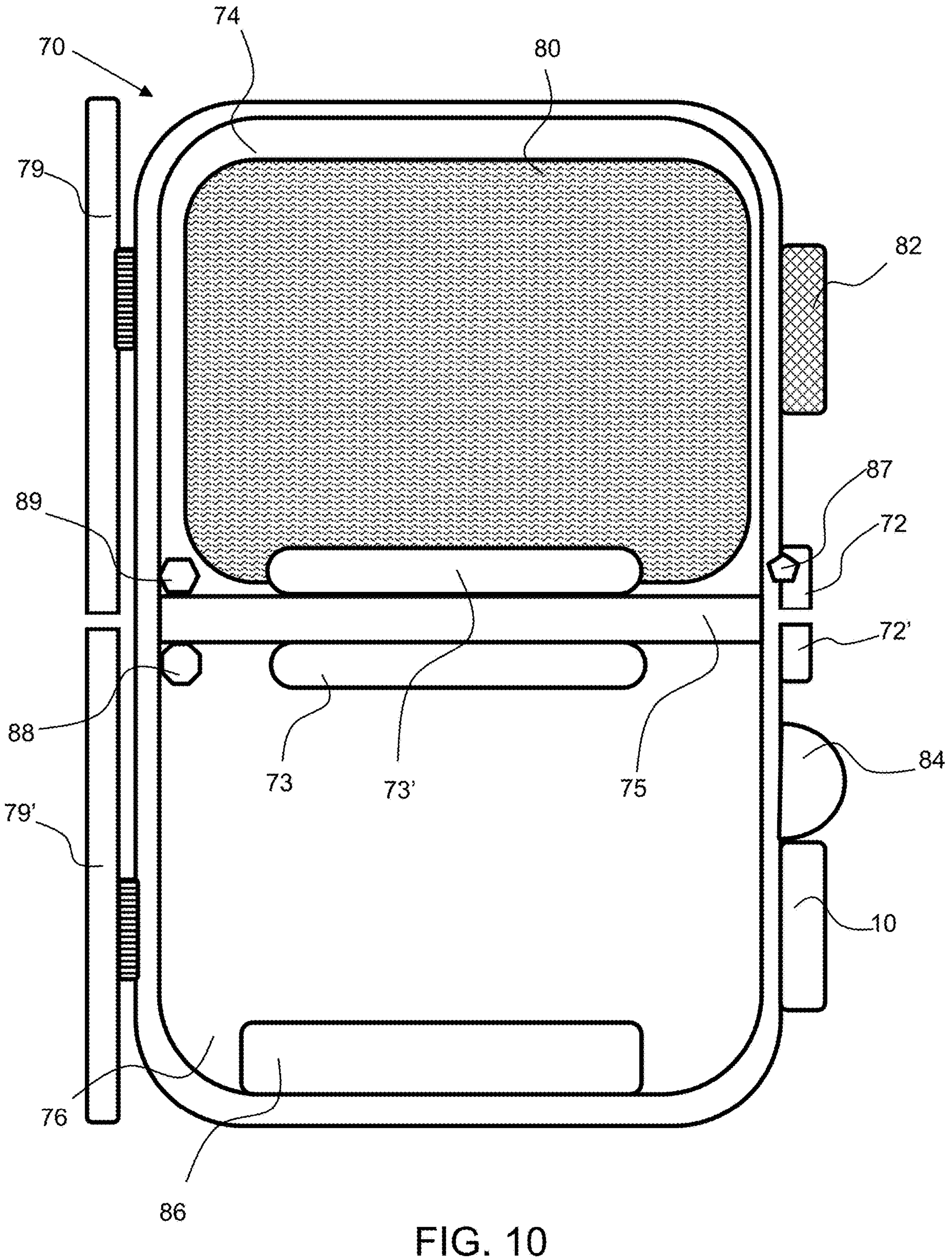
FIG. 10 is a top view of an exemplary storage container having two compartments therein.

As shown in FIG. 10, an exemplary storage container 70 has a first compartment 74 and a second department 76 formed by a divider 75. The first compartment has a heating device 80 and the second compartment has a refrigeration device 86. Also, the UV lights 73, 73' are configured to produce a disinfecting UV light used to disinfect packages and contents within the storage container. The storage container 70 is also configured with a lock, which is an electronic lock that is unlocked and locked by the AI EM device system when a virtual key is verified. The storage container also has a light 84 and a speaker 82. The light is operable to be used to aid in finding and opening the storage container, when used after dark and the speaker is operable to be used to emit audible phrase from the AI EM device system, such as logistic information. For example, and not limitation, the audible phrase is operable to direct the delivery person to place a package in a specific compartment of the storage container. Also, the speaker and light are further operable to be used as an alarm in the event the storage container is jostled or moved or in the event that the storage container is opened without authorized access.

Figure 11:
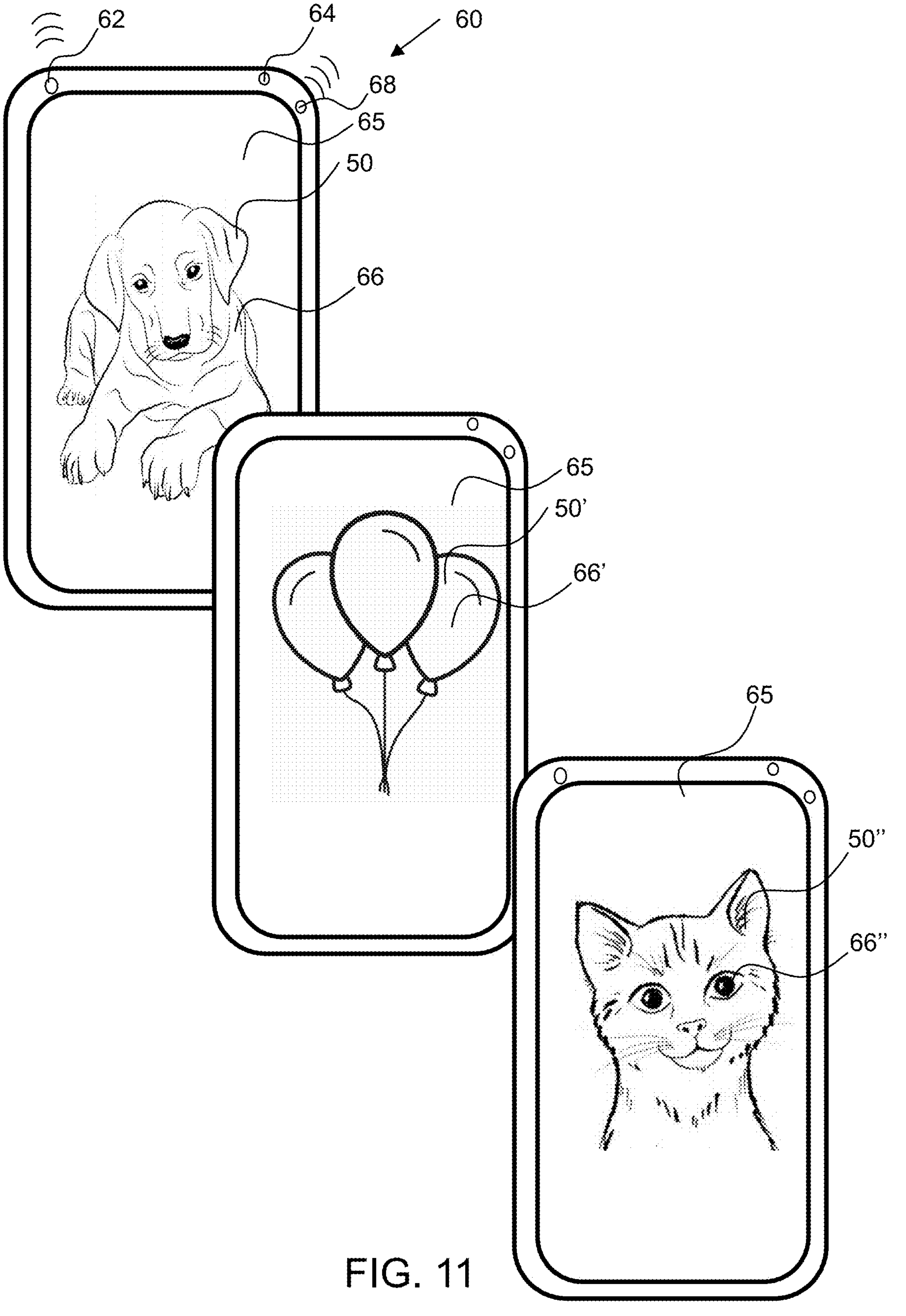
FIG. 11 shows a front view of a mobile electronic device that displays a plurality of digital photographs that in series are an image virtual key configured to be identified by the camera of the AI EM device and verified for access to an access point.

As shown in FIG. 11, a mobile electronic device 60 is configured to display a plurality of digital images 66, which includes, but is not limited to, digital photographs that, in series, are an image virtual key 50, 50', 50" configured to be identified by the camera of the AI EM device and verified for access to an access point. For example, and not limitation, a user device is configured and operable to receive a plurality of digital images or photographs from the EM system as a single file or in separate files. The EM device is configured to received displayed virtual key images via the camera of the EM device. The displayed virtual key images correspond to a sequence. For example, and not limitation, the sequence includes dog, balloons, cat. The AI EM system is operable to unlock a lock when a virtual key is verified by the AI EM device.

Figure 12:
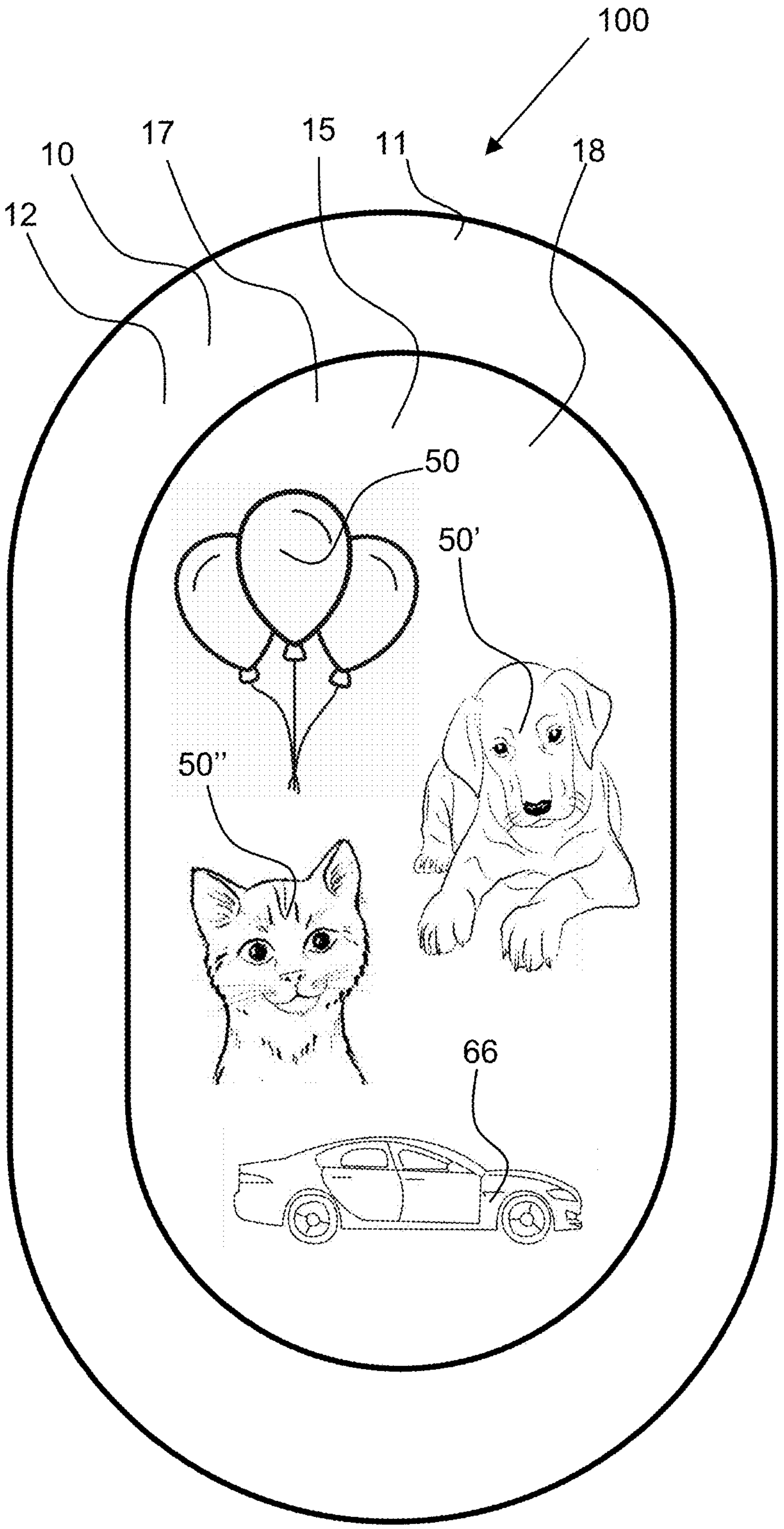
FIG. 12 shows a front view of an exemplary AI EM device having a display screen that displays images for selection as a selected virtual key.

As shown in FIG. 12, an exemplary AI EM system 100 requires a virtual key to be selected on a display screen 15, from a plurality of digital images 66, before a lock is unlocked. The AI EM device 10 includes a display screen 15 that includes, but is not limited to, a touch screen 17 that is configured to receive a selection of at one or more digital images for entry. For example, and not limitation, the AI EM device is configured to receive a selection of a plurality of digital images to produce a virtual key and the image virtual key requires each image virtual key 50, 50', 50" to be selected in a specific sequence, such as balloon, dog, cat, for example. A plurality of other digital images 66 or photographs are also displayed on the display screen during the selection or entry of the virtual key. Again, the AI EM system is operable to automatically send an image virtual key. The user device is configured to display the virtual key and to receive a selection of images corresponding to the virtual key. The AI EM system is operable to send image virtual keys to a user device when a user corresponding to the user device is expected to arrive, such as to a cleaning professional prior to their weekly scheduled arrival.

Figure 13:
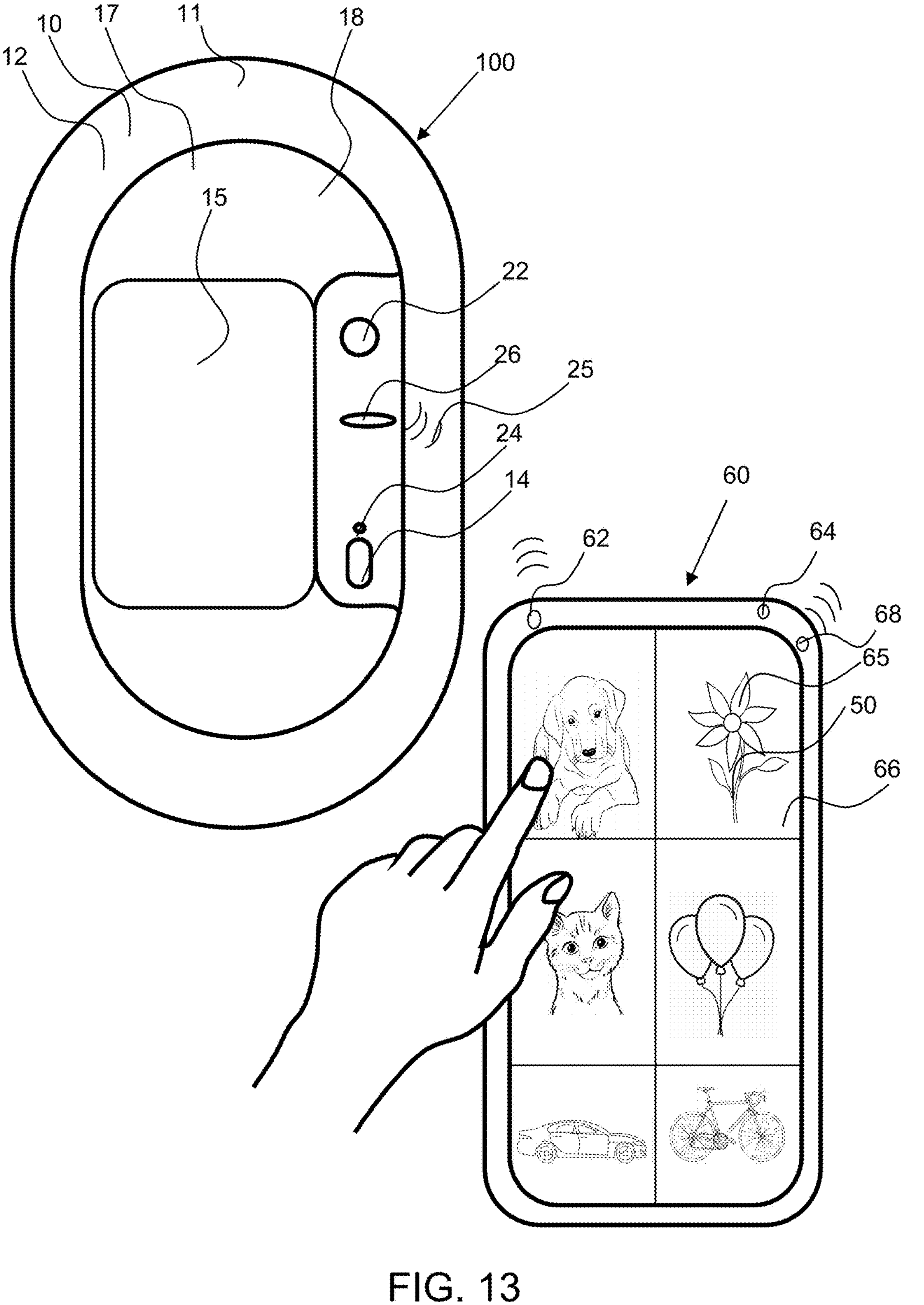
FIG. 13 shows a front view of an exemplary AI EM device communicating with a mobile electronic device to present a plurality of images for selection to produce an image virtual key for access to an access point.

As shown in FIG. 13, an exemplary AI EM system 100 requires a virtual key to be selected on a display screen 65, of a mobile electronic device 60, from a plurality of digital images 66, before an access point is unlocked. The AI EM device 10 is operable to communicate with the mobile electronic device through a wireless signal 25, such as a Bluetooth signal and send a plurality of digital images for the person to select on their own mobile device to enable entry to an access point. In one embodiment, the plurality of digital images are configured in a grid and include one or more images that were sent previously to said user device via the AI EM system. The user device is operable to receive a selection of images when approaching the AI EM device 10. The user device is further operable to receive a selection of a plurality of digital images to produce a virtual key. The image virtual key requires each image virtual key 50, 50', 50" to be selected in a specific sequence, such as balloon, dog, cat, for example. In another embodiment, a plurality of other digital images 66 or photographs are displayed on the display screen 65 during the selection or entry of the virtual key. Again, a system administrator device, or the AI EM system is operable to automatically, send an image virtual key. The user device is configured to display the virtual key via display screen and to receive a selection of at least one image corresponding to the virtual key via a touch screen. The AI EM system is operable to send image virtual keys to a user device based on when the user corresponding to a user device is expected to arrive, such as to a cleaning professional prior to their weekly scheduled arrival.

In another embodiment, the AI EM device 10 is positioned on the storage container and includes a speaker and camera configured to interface with the person to scan a virtual key and provide access to the storage container and/or another access point. An exemplary storage container 70 comprises a closure sensor 87 that detects the position of a storage container closure, such as a lid or door. In the event the closure is opened without authorization, the light 84 and/or speaker 82 is activated to produce an alarm. Also, an exemplary storage container includes accelerometer 88 that detects motion and when the motion above a motion threshold is detected, an alarm is activated on the storage container and/or EM device. An exemplary storage container, in one embodiment, includes but is not limited to, a global positioning system (GPS) location device 89 that is used to monitor a location of the storage container and when the storage container is moved beyond a perimeter limit or a threshold distance from a location, an alarm is activated on the storage container and/or EM device. These theft prevention measures help to ensure that packages delivered into a storage container and the storage container are not stollen.

Figure 14:
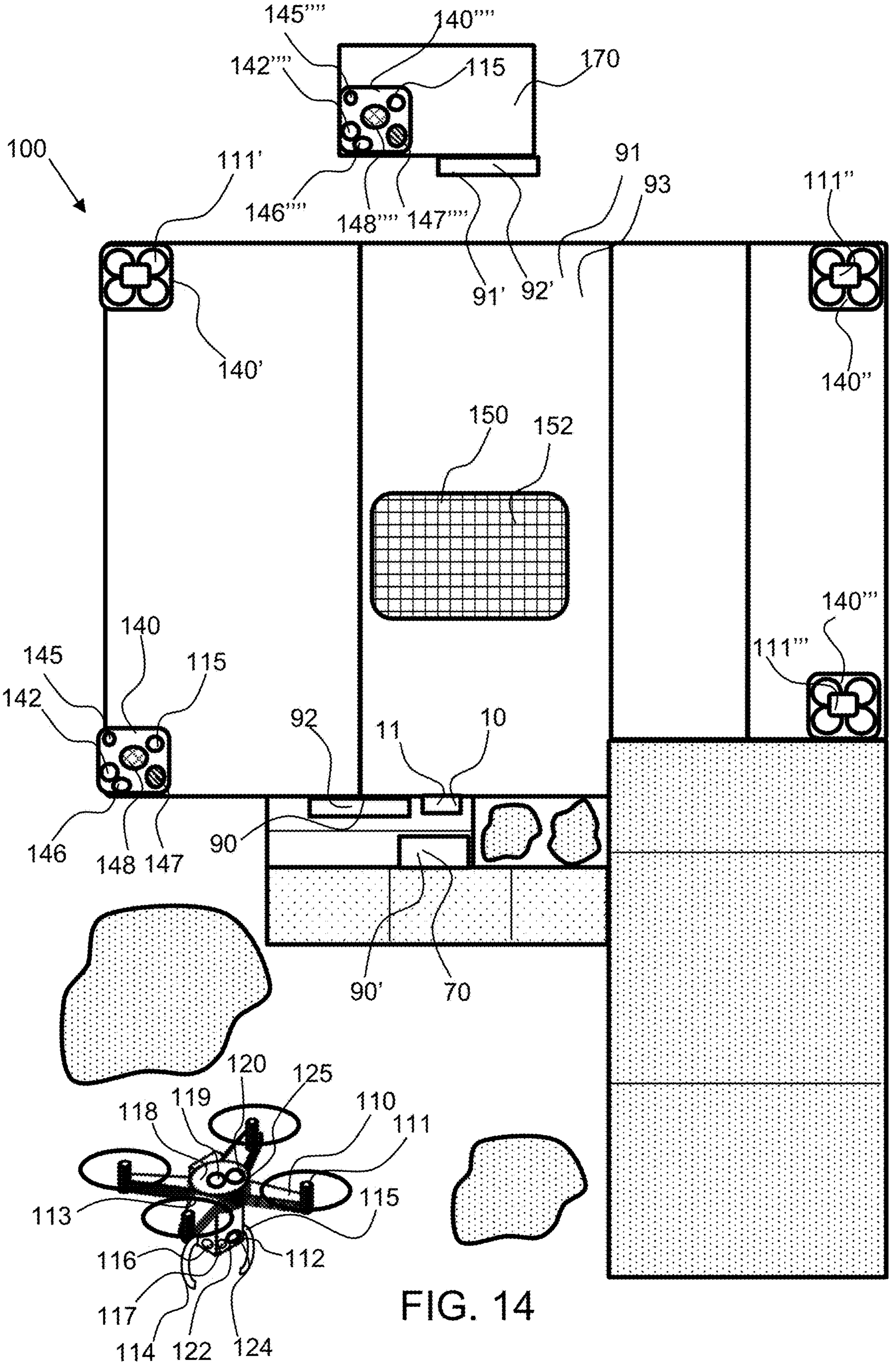
FIG. 14 shows a top view of a building, a dwelling, having robot docking stations configured on each corner of the building to provide substantially complete monitoring of the perimeter of the building.
Figure 15:
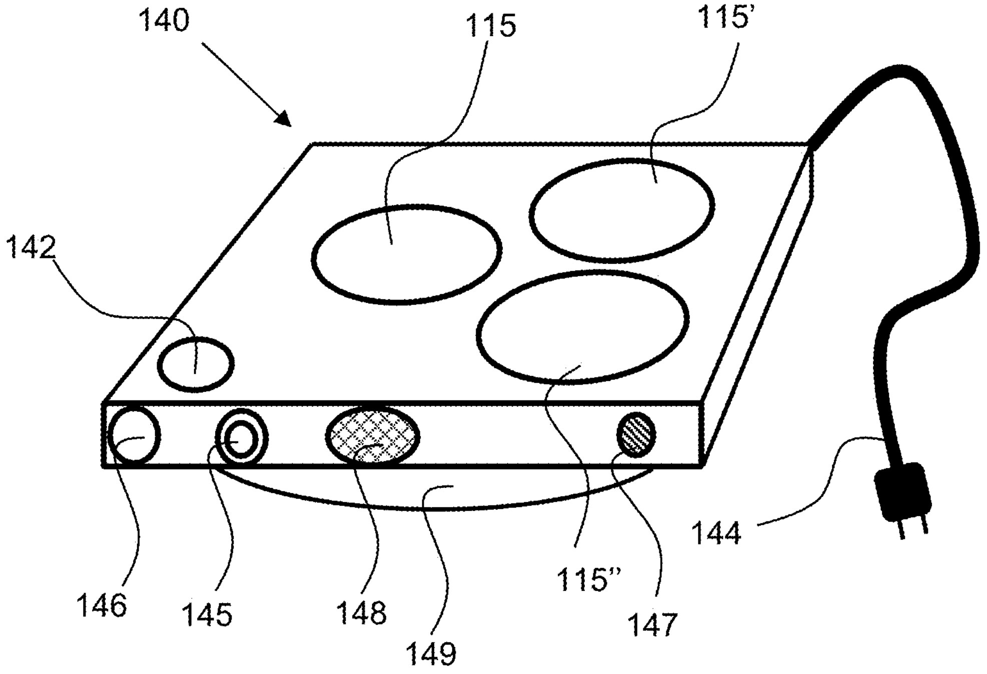
FIG. 15 shows an exemplary docking station having a plurality of batteries and a charging interface for charging a robot docked thereon.

Referring now to FIGS. 14 and 15, an exemplary AI EM system 100, comprises an AI EM device 10 an access point 90, the front door to the home and 90' a storage container 70, as well as a plurality of robots 110, aerial robots 111, 111', 111" and 111'" that are configured to dock on corresponding docking stations 140, 140', 140" and 140'". The docking stations are configured to provide power to the robot via a charging port 142 and/or interchangeable batteries 115, 115', 115". A battery on the robot 115 is charged by the charging port 142 when the robot is docked on the docking station 140, and/or the battery on the robot is operable to interchanged with a battery of the docking station. In one embodiment, the power for the charging of the batteries are from a power source of the building, such as from a power line 144 that is plugged into or otherwise coupled with the building electrical power system. In yet another embodiment, the power comes from a renewable power source, such as a solar panel 152. The power generated from the solar panel is coupled directly with the docking station(s) and is configured on or near the docking stations. Although the drones and robots of the present invention are described as docking or patrolling specific locations throughout the present application, one of ordinary skill in the art will understand that the drones and robots are operable to be located anywhere on a premises or property, including out of a line of sight of an AI EM device, or hidden or otherwise obscured from plain view. In one embodiment, the drone or robot includes camouflage. Alternatively, a docking station of a drone or a robot is located in an enclosure such that the drone or robot is not visible until the drone or robot moves from within the enclosure to outside the enclosure. In one embodiment, the enclosure includes a door which is operable to be opened by the robot via physical contact or via electronic communication such as short range communication (BLUETOOTH®, NFC, RF, etc.).

Four of the docking stations are configured proximal to the corners of the building to provide substantially complete perimeter monitoring via the camera 112, motion detector 120 and/or microphone 117 on the robot 110, such as the aerial robot 111. Also, the docking station 140 includes a camera 145, motion detector 146, microphone 147 and/or a speaker 148. The docking station also effectively monitors an area around an access point, such as around a perimeter of a home or business. The docking station emits an alarm when motion is detected or when a threat is detected by the robot or docking station. In the event that the camera on either the robot or the docking station detects motion for example, the aerial robots are deployed from the docking station to investigate more closely by flying to be in closer proximity to the source of the motion and/or sound. An alert is provided to the intelligence EM system 100 and images and audio received by the microphone, of the robot or docking station, are transferred in real time to the intelligence EM system 100 for an administrator to review. Also, the access points are operable to be locked in the event that any motion or sound above a threshold amount is detected. The robot is operable to act autonomously when monitoring the perimeter of the building and is operable to interface with the intelligence EM system 100 only when the detected sound or movement is determined to be threat. A robot is configured for surveillance or a property or an area around a building or access point and includes a camera that is operable to detect motion and a microphone to detect sound. The robot(s) is operable to act independently to monitor, record events detected and/or follow a threat or person that is detected.

In another embodiment, a robot is programmed with one or more patrol routes on a predetermined schedule within a property, with the one or more patrol routes controlled or determined by the EM device or a software platform to which the EM device is connected over a network. The software platform preferably includes at least one server or at least one edge device. Alternatively, the software platform is a cloud-based platform. The patrol routes are operable to include random movement across a property, a patrol around a perimeter of a property, a patrol around a perimeter of a house, a patrol around the outside of a specific area of a house such as the front porch or bedrooms, or any combination thereof. Patrol routes are operable to differ based on the day of the week or the time of day.

In another embodiment, robots are operable to maintain one or more patrol positions within a property. By way of example and not limitation, a patrol position includes a position where the robot is in a stationary position or substantially stationary position (e.g., hovering in a predetermined location). In the patrol position, the robot is operable to use any method of detecting potential objects, people, threats, vehicles, events, activities, or any other object or motion described herein or known in the art. The robot preferably sends a notification or alert to a device associated with the platform upon detection of an object or motion. In an exemplary embodiment, the robot is a drone operable to hover in a patrol position above a property such that the drone has a view of a certain portion of the property or the entirety of the property. In one embodiment, a geofence is utilized to restrict the area of detection for the drone. A geofence includes any geofence described herein or known in the art. The drone is operable to return to a docking station when a battery of the drone is low to recharge. In one embodiment, the EM device or the platform is operable to instruct a second drone to take up a secondary patrol position near the drone in the patrol position before the drone in the patrol position returns to the docking station to recharge. In this embodiment, the property always has a drone in a patrol position capable of detecting motion or any other action or object described herein. Additionally, the drone and the second drone are operable to implement whitelisting rules to prevent notifications from being sent to upon the drone detecting the second drone or the second drone detecting the drone. The robots are operable to work in conjunction with other security, surveillance, or threat detection systems when on a patrol path, in a patrol position, in pursuit of an object, or in any other position described herein. Preferably, the platform or EM device of the present invention is operable to control the security, surveillance, or threat detection system, including activation of the system, determining which areas in a property should be scanned, and managing notifications to devices associated with the platform. By way of example and not limitation, threat detection systems include counter drone systems and unmanned aerial vehicle deterrent systems, including radar systems. Examples of these systems are described in US Patent Pub. No. 20200363824, US Patent Pub. No. 20210302533, and U.S. Pat. No. 10,408,936, each of which is incorporated herein by reference in its entirety. Preferably, the threat detection system does not emit a signal detectable via radar outside of a boundary of the property in which the threat detection system is implemented or far beyond the boundary of the property in which the threat detection system is implemented. This passive radar advantageously prevents detection of the threat detection system by other devices that are not within the property or not close to the threat detection system. However, one drawback of passive radar or radar that does not emit a large radar signature is that such systems often do not detect smaller drones such as mini drones. Accordingly, by using a combination of the threat detection system and drones of the present invention operable to detect motion, the present invention is operable to detect typical size drones and smaller drones such as mini drones without emitting a large radar signature.

Although the functionality of drones and robots has primarily been described with respect to aerial or land robots, the present invention is also utilized in connection with aquatic or water robots including aquatic or water drones such as autonomous underwater vehicles (AUVs), in one embodiment. In another embodiment, the drones or robots are amphibious drones or robots operable to operate in land or in an aquatic environment. The drones and robots are preferably operable to operate in any liquid environment or any aqueous environment. The water robots of the present invention are operable to operate in freshwater, saltwater, and/or brackish water environments. In one embodiment, the water robots are in communication with the platform of the present invention, the AI EM device, or another device in communication with the platform of the present invention.

Water robots are operable to perform any action described with respect to land robots, aerial robots, or drones. For example, water robots are operable to follow a patrol path or to track or follow an object of interest, such as a vehicle or person. Advantageously, the water robots are operable to track or follow objects of interest that are in the water, or on land or in the air if viewable by the water robots. In another embodiment, water robots are operable to track or follow animals of interest. The water robots are operable to capture images, video, and/or audio of objects or animals of interest and send the images, video, and/or audio in real time or near real time to an administrator device or another device associated with the platform. Water robots are operable to be utilized with the AI EM device of the present invention for applications such as port security to detect unauthorized vessels, people, or objects and security at international borders to detect people who might be illegally crossing a border or vehicles which may be carrying illegal immigrants. In yet another embodiment, the water robots or drones are operable to be used to protect critical infrastructure, such as pipelines and oil rigs. In one embodiment, the AI EM device does not provide access or entry to a space or an account, but rather provides for coordination, command, and control of water robots. In another embodiment, the AI EM device is operable to provide access or entry to an area or access to a device upon receiving a virtual key or other information for granting access or entry.

In one example, drones associated with the platform or EM device of the present invention are whitelisted and therefore no notification is generated when a threat detection system such as a counter drone system detects the drones associated with the platform or EM device of the present invention. Similarly, devices associated with the threat detection system are whitelisted and no notification is generated when drones associated with the platform or EM device detect devices associated with the threat detection system. In an exemplary embodiment, one or more drones are operable to take a patrol position in the air or follow patrol paths while the threat detection system is operable to be stationed on the ground. In one embodiment, the threat detection system is operable to be moved to continuously scan different areas, or components of the threat detection system are operable to be moved while the base of the threat detection system is stationary to continuously scan different areas. The one or more drones are operable to move in coordination with the threat detection system to cover different areas simultaneously. The drones are operable to communicate with the platform and the threat detection system regarding detected motion, including the geolocation of the detected motion, and to track an object or person associated with the detected motion. The drones are also operable to communicate with the platform and instruct the platform to send a command to the threat detection system to scan an area in which one or more drones observed motion. The combination of the drones which are in a patrol position or on a patrol path and the threat detection system is operable to be utilized in areas with lots of people, chemicals, or other vulnerable locations, such as airports, military bases, military camps, prisons, theaters, stadiums, arenas, chemical facilities, government buildings, compounds, etc. Advantageously, the drones and the threat detection system are operable to be deployed inside a building, outside of a building, or a combination thereof. In one embodiment, the drones are mini drones, such as drones operable to participate in a drone swarm.

In one embodiment, the robots include image recognition technology to assist in providing security for a property. Alternatively, the platform of the present invention is operable to provide image recognition technology upon receiving images or videos from a robot. In one example, the image recognition technology includes facial recognition technology, whereby certain people are whitelisted (i.e., allowed on the premises) or blacklisted (i.e., not allowed on the premises). Upon detection of a blacklisted person on the premises, the robot is operable to automatically send a command to the EM device to alert the authorities, a registered user device associated with the EM device, or a guest device granted access by the EM device upon recognition of a blacklisted person. Alternatively, the platform is operable to receive the image or video, recognize the blacklisted person, and alert the authorities, a registered user device associated with the EM device, or a guest device granted access by the EM device. In one embodiment, recognition of a whitelisted person causes an alert to be sent to a registered user device associated with the EM device or a guest device granted access by the EM device. The EM device is operable to communicate with a database or web crawler to retrieve information relating to an unknown person, a blacklisted person, or a whitelisted person based on facial recognition. In one embodiment, the information includes an identification of a career or position of the person, information about a company associated with the person, an age of the person, an identification of any criminal history, litigation history of a person, mutual contacts between an owner of the EM device and the person, or any other information available from a web search, an online criminal background search, or a social media search including recent activity, media, posts, reported locations of the user, etc. In the event that facial recognition is not possible due to concealment of the user's face, such as via a mask, a hood, sunglasses, or any other face obscuring article or item, the robot is operable to automatically send a command to the EM device to alert a registered user device associated with the EM device or a guest device granted access by the EM device.

The EM device is also operable to include a facial recognition module operable to identify individuals who are approaching the access point and identify the individuals as authorized or unauthorized individuals. The EM device is operable to automatically transmit a lock command to the electronic lock when an unrecognized or unauthorized individual approaches the access point. Advantageously, this command is operable to be sent when the individual is more than a predetermined distance away from the access point, such as 1 meter away or more than 2 meters away from the access point, thereby effectively locking an access point before the unauthorized or unrecognized individual is able to open the access point. The EM device is operable to automatically send a command to the at least one secondary camera to zoom in on a face of at least one unrecognized individual within a predefined distance of the access point. If the facial recognition module identifies an unauthorized individual, then the EM device automatically transmits an alert to at least one registered user device associated with the access point. The EM device is operable to activate and/or deactivate the at least one robot, and wherein activation of the at least one robot causes the at least one robot to track and follow at least one individual proximate to the access point.

In another embodiment, image recognition technology includes weapon recognition technology providing for recognition of weapons. Upon recognition of a weapon, such as a firearm, a knife, a crowbar, a baseball bat, etc., the robot automatically sends a command to the EM device to alert the authorities, a registered user device of the EM device, or a guest device granted access by the EM device. Alternatively, the platform is operable to receive the image or video, recognize a weapon, and alert the authorities, a registered user device associated with the EM device, or a guest device granted access by the EM device. In another embodiment, image recognition technology provides for recognition of threatening or damaging actions, such as kicking a door, breaking a window, throwing an object at a house, shooting a firearm, physical violence such as hitting another person, or injury or medical emergencies such as someone falling, fainting, or passing out. Upon recognition of this action, the robot sends a command to the EM device to alert the authorities, a registered user device of the EM device, or a guest device granted access by the EM device upon recognition of the action. Alternatively, the platform is operable to receive the image or video, recognize an action, and alert the authorities, a registered user device associated with the EM device, or a guest device granted access by the EM device. Artificial intelligence or machine learning algorithms are utilized by the platform connected to the EM device in one embodiment to assist in image recognition.

In another embodiment, the robots or the platform include audio recognition technology which is operable to identify and classify certain sounds. Examples of recognizable sounds include a gunshot, glass breaking, screaming or yelling, or any other sound that signifies a threat, a potential threat, violence, or physical injury. Upon recognition of a recognizable sound, the robot sends a command to the EM device to alert the authorities, a registered user device of the EM device, or a guest device granted access by the EM device upon recognition of the action. Alternatively, the platform is operable to receive the audio, recognize the recognizable sound, and alert the authorities, a registered user device associated with the EM device, or a guest device granted access by the EM device. Artificial intelligence or machine learning algorithms are utilized by the platform connected to the EM device in one embodiment to assist in audio recognition.

A docking station 140 is configured on the ground or on another structure 170 detached from the building 93, such as a dwelling 91, having an access point 90, such as a door 92. This structure 170 further includes an access point 90', such as a door 92' and for example, and not limitation, be a shed or other dwelling or building. In one embodiment, the structure is specific for docking and be configured proximal to the ground for servicing.

Figure 16:
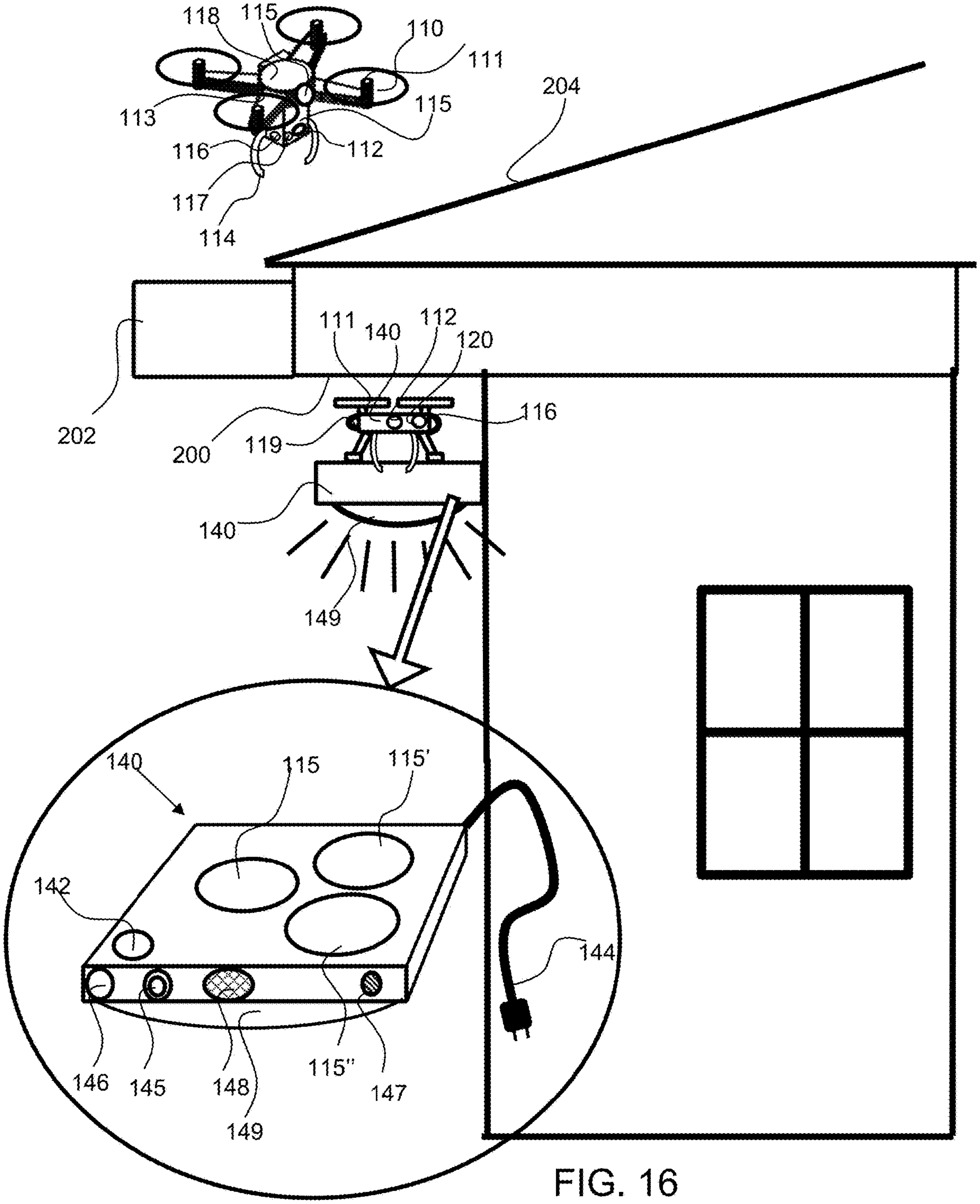
FIG. 16 shows an exemplary docking station configured under the eave of a home.
Figure 17:
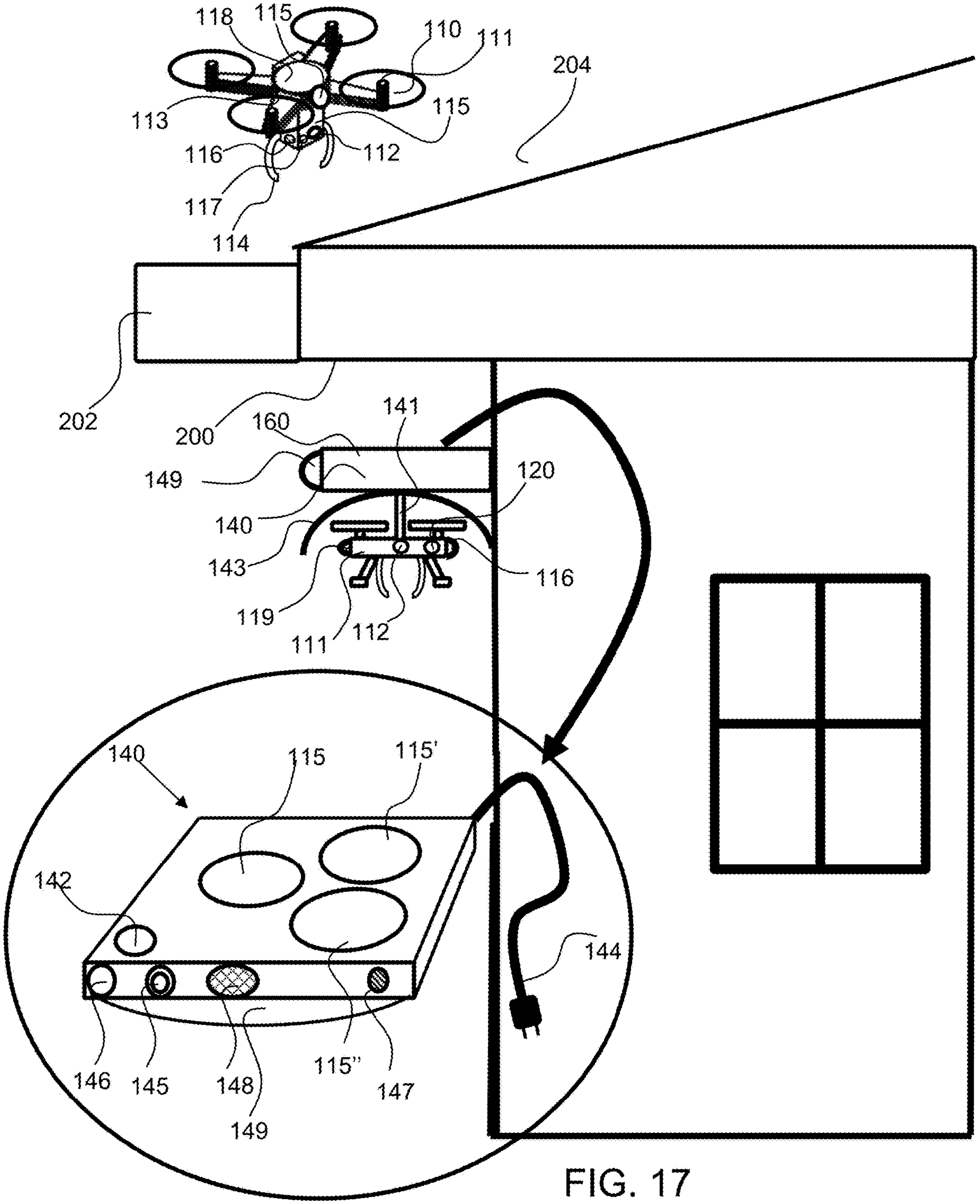
FIG. 17 shows an exemplary docking station configured under the eave of a home.
Figure 18:
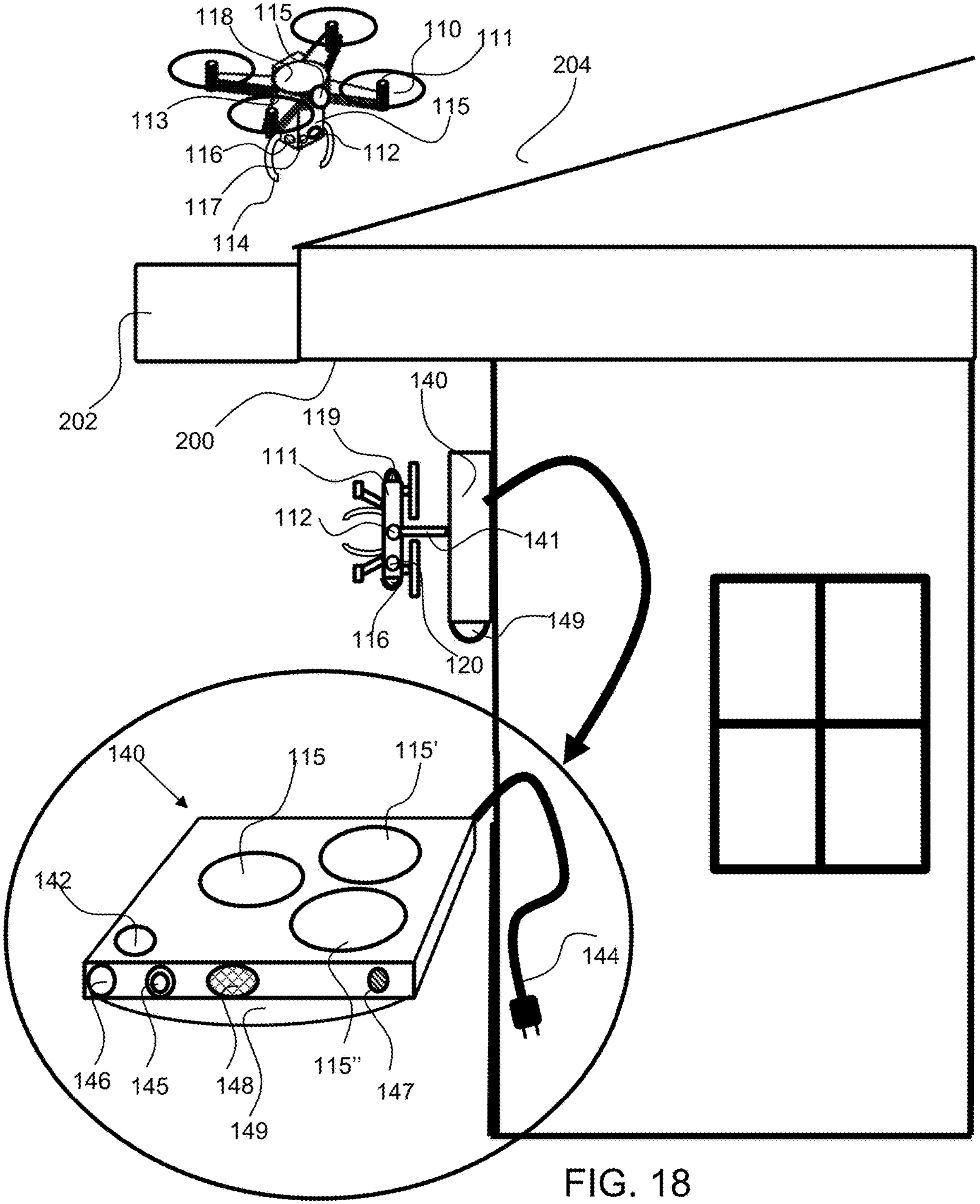
FIG. 18 shows an exemplary docking station configured under the eave of a home.

Referring now to FIGS. 16, 17 and 18, an exemplary docking station 140 is configured under the eave 200 of a home, or under the gutter 202 for protection from the elements. The docking station includes a docking station light 149, which is operable to act as an exterior light or flood light. As shown in FIG. 16, the aerial robot 111 is configured on top of the docking station 140, between the docking station and the eave 200 and gutter 202. The docking station light 149 is on to provide illumination which aids in the aerial robot surveilling an area around the home. A second aerial robot 111' is flying above the roof 204 of the home. The details of the docking station 140 are shown in the docking station in the circle, for clarity. The docking station includes, but is not limited to, any of the components as describe and shown in FIG. 15. As shown in FIG. 17, the aerial robot 111 is configured on under the docking station 140 and under a docking cover, a dome shaped cover to protect the aerial robot from the elements. The docking cover is transparent to enable surveillance through the cover by the motion detector 120 and/or camera 112 of the aerial robot. A docking extension 141 is coupled with the docking station 140 to retain the aerial robot 111 to the docking station. Again, the docking station includes, but is not limited to, any of the components as describe and shown in FIG. 15. As shown in FIG. 17 the aerial robot is coupled with a docking station 140 that is also a light fixture 160, such a flood light for the home. The aerial robot is small and inconspicuous with respect to the light fixture. As shown in FIG. 18, the aerial robot 111 is docked horizontally via the docking extension 141 that is coupled with the docking station 140. The docking extension is operable to extend from the top, bottom or side of the aerial robot. The docking extension or receiver on the docking station for the docking extension includes a latch or pin or other mechanical retaining mechanism to keep the aerial robot securely docked.

In another embodiment, a robot, such as an aerial robot, land robot, or water robot, is housed in an enclosure attached to a structure when not in use. The enclosure is operable to be attached to a side of a structure to a soffit of a structure, such as a soffit of a house. The enclosure includes an opening through which the aerial robot enters the enclosure to charge when not in use, such as a side of a shape which is open or includes a door or gate, opening to permit the aerial robot to enter the enclosure when the aerial robot approaches the enclosure and closing after the aerial robot enters the enclosure to protect the aerial robot from the elements. Preferably, the door or gate to the enclosure provides a waterproof or water resistant seal to the enclosure when closed. In one embodiment where the enclosure includes a door or a gate, the aerial robot is operable to be open the door via physical contact or via electronic communication such as short range communication (BLUETOOTH®, NFC, RF, etc.). The enclosure is operable to be any shape known in the art, including a rectangular prism, a sphere, a cube, a tetrahedron, an octahedron, or an icosahedron. Preferably, the enclosure is constructed of a weatherproof, weather resistant, waterproof, water resistant, fireproof, bullet resistant, and/or bullet proof material. The enclosure includes a power source which provides for the drone to be recharged. In one embodiment, the power source includes a battery. Additionally or alternatively, the power source includes solar panels. In another embodiment, the enclosure is connected to an electrical system of a structure, such as via direct electrical wiring with the structure's existing electrical system or a plug of the enclosure plugging into an outlet of the structure. In one embodiment, the power source provides for conductive or inductive wireless charging of the aerial robot. The power source is also operable to power other components of the enclosure, including but not limited to, a gate, a door, a light such as a flood light operable to illuminate an area around the enclosure such as an area of a premises or a structure in proximity to the enclosure, and a motion detector of the enclosure.

Preferably, the enclosure is attachable to a structure via mechanical and/or chemical attachment. In one example, the enclosure is attached to the structure via fasteners such as screws or nails. Alternatively, the enclosure is attached to the structure via an adhesive, such as one or more adhesive strips or sections that are included on the back of the enclosure and revealed by removing a cover from the strips or sections. Advantageously, by providing for fastening the enclosure to the structure via mechanical fasteners or chemical attachment, the present invention provides for ease of installation of one or more enclosures to an existing structure. Attaching an enclosure to a structure does not require modification of the existing structure, other than affixing the enclosure to the structure via mechanical and/or chemical attachment. Although the enclosure has been described for an aerial robot, other robots such as land robots or water robots are operable to be housed and charged in enclosures of the present invention.

In one embodiment, the enclosure includes a motion detector operable to detect motion in a field of view of the enclosure. Upon detecting motion, the motion detector of the enclosure is operable to instruct the aerial robot to engage with the object which was or is in motion, or to patrol an area where the motion was detected and/or areas proximate to where the motion was detected. In another embodiment, the aerial robot includes a motion detector which is operable to be activated when the aerial robot is docked or charging in the enclosure. In one embodiment, the enclosure does not include a door or gate such that the aerial robot has a field of view into the environment even when contained within the enclosure. Alternatively, a door or gate of the enclosure is transparent or translucent and the motion detector of the aerial robot is operable to detect motion through the transparent or translucent gate or door of the enclosure.

A robot is operable to be activated to begin surveillance by the system, or by a separate mobile device. For example, and not limitation, the robot(s) are operable to be activated to monitor an area around a home when occupants leave. A robot is operable to interface with any smart-home system, a system configured to lock and unlock doors for access to a building, such as a home and place of business. A smart-home system includes, but is not limited to, an AI EM system as described herein. A robot is operable to be controlled by the smart-home system, wherein they receive instructions through a wired or wireless connection with the smart-home system to perform a function. A robot includes some autonomous functions, such as surveillance, monitoring and capturing images and sound recordings. Also, a robot is operable to act independently to follow a threat to record images of said threat and/or vehicle. In another embodiment, a robot or drone is operable to dispense a dye, liquid marker, or other marker or identifier onto an object or person when the object or person is identified as a threat by the drone or robot to provide for easy identification of the object or person by authorities or other parties.

In one embodiment, the EM device instructs one or more robots to patrol the premises for a vehicle and capture images of a vehicle, including a license plate, if a person is detected by the EM device or by another device in network communication with the EM device or another device that transmits an alert to the EM device regarding detection of a person on the premises. As described above, the or more robots are operable to recognize the license plate characters and send these characters to the platform and/or the law enforcement device in one embodiment. In one embodiment, the one or more robots or another device connected to the platform of the present invention such as a camera includes a license plate reader such as an automated license plate reader. Alternatively, recognition of the license plate characters is performed via software on the platform according to any method known in the art, including but not limited to optical character recognition. In one embodiment, the images, license plate characters, locational information, and/or directional information are sent to a platform of the present invention. Additionally, the images, license plate characters, locational information, and/or directional information are operable to be sent directly to a law enforcement device, either through the platform or by the robot directly. Alternatively, other devices such as cameras are instructed by the EM device to capture images or videos of a vehicle. These instructions include movement or pivoting of a camera or a camera zooming in or out in one embodiment. This functionality is useful for cataloging a list of visitors to a property or premises, and in one embodiment the platform or the EM device creates a searchable database of visitors who have visited a property along with a time of entry to the property, a time of exit from the property, a duration of time spent on the property, and an identification of guests with a person during their visit. If a person is not detected damaging property on camera, but property damage occurs the day a person visited the premises, this information assists a resident and the authorities in obtaining more information about potential suspects.

In one embodiment, the software platform receives a set path for a patrol route for one or more robots (e.g., aerial drones) inside or outside a building. In one embodiment, the patrol route is set by manually holding the one or more robots and walking along the set path until the path is complete. The one or more robots are then able to record GPS data (or other location-based data) while the set path is being walked to develop spatial map along which the one or more robots follow. In another embodiment, the one or more robots and/or other cameras or sensors are configured to automatically generate a scan of the building (or a portion of the building) using LiDAR sensors, using visual cameras, and/or other means. The one or more robots and/or other cameras or sensors then send the scan data to the software platform, which generates a virtual layout map of the building (or the portion of the building). The software platform is then able to receive a selection of a path on the virtual layout map.

In one embodiment, the patrol route includes both a movement path and a designated selection of one or more turns during the patrol route. In one embodiment, the one or more turns are set to be performed while the one or more robots are stationary or moving at a specific location in the set path. In one embodiment, the angle at which the one or more robots are turned at one or more specific locations in the set path is able to be specified and received from at least one user device. In one embodiment, the one or more robots are only operable to rotate at preset angles during the set path (e.g., 90 degrees, 180 degrees, 270 degrees, etc.), while, in another embodiment, the one or more robots are able to turn at any angle. In one embodiment, the rotational speed (e.g., 45 degrees per second, 30 degrees per second, etc.) of the one or more turns are received from at least one user device. In one embodiment, a length of time in which the one or more robots are to remain stationary at any point in the set path (e.g., after turning to examine a specific feature) is received from the at least one user device.

In one embodiment, the one or more robots execute the patrol route at preset times (e.g., 8:00 PM, 10:00 PM, etc.), or at preset time intervals (e.g., every 30 minutes, every hour, etc.). In one embodiment, the one or more robots continuously record video footage while executing the patrol route and the video footage is able to be sent to a database and/or transmitted live to at least one user device. In another embodiment, the one or more robots only record and/or take individual photographs at specific spots on the set path, decreasing the amount of necessary data storage. In one embodiment, the software platform receives a selection from at least one user device designating where on the set path the one or more robots should begin and/or end recording the video footage and/or where photographs should be taken. In one embodiment, the software platform is configured to automatically compare video footage and/or photographs taken in each patrol run and automatically detect differences in the photographs and/or video footage between each run. In one embodiment, the comparison is performed by at least one artificial intelligence algorithm, including any image similarity analysis known in the prior art, such as is described in U.S. Pat. No. 10,467,526, which is incorporated herein by reference in its entirety. In one embodiment, the software platform automatically flags any significant difference between each photograph and/or video footage (e.g., a window being open, a door being open, a door lock changing position, larger objects such as furniture being moved, etc.). In one embodiment, if the software platform detects a significant difference in the photographs and/or video footage between patrol runs, the software platform automatically transmits a message to relevant police authorities. In one embodiment, if the software platform detects a significant difference in the photographs and/or video footage between patrol runs, the software platform automatically transmits an alert notification to at least one user device. In one embodiment, the alert notification includes a description of the possible difference between runs and/or any relevant video footage and/or images showing a difference between patrol runs.

One or a plurality of the robots and in particular aerial robots is operable to monitor and track a threat, such as an unauthorized person on or around an access point. The robot or robots are deployed from a docking station and follow the threat for closer surveillance. The robot(s) 110 is operable to activate the robot light 119 to deter the threat. The light is operable to flash and in one embodiment, is a bright light, such as more than 500 lumen or more than 1,000 lumen. The light is operable to flash rapidly such as about 1 hertz or more, or about 2 hertz or more, about 5 hertz and any range between and including the cycles per second provided. This bright rapidly flashing light effectively deters the threat. Also, the robot or robots are operable to emit an alarm by the robot speaker 116 and this alarm is operable to be directed at the threat via the directional speaker capability as described herein. By way of example and not limitation, the EM system is configured to receive input to activate the alarm or siren, such as the EM system is notified of activity detected by the robot. The EM system is configured to send a picture or video of an intruder that is actively moving about the building to a user device. The EM system is configured to receive a selection to activate the alarm, and or deploy the robots to take action to deter the intruder via the user device. The alarm or siren is operable to generate a sound at about 75 decibels or more, about 100 decibels or more, about 120 decibels or more and any range between and including the sound levels provide. The docking stations are operable be activated when a threat is detected and emit a bright light and also an alarm having the lumens and decibel levels, respectively, or even higher lumens and decibels. A first robot detects a threat and the robot is operable to communicate with one or more additional robots to enable additional robots to find the threat, such as by communicating a location of the first robot. The robots include GPS location and are operable to use this to ensure that they do not collide with one another. A plurality of aerial robots is operable to create a robot swarm around a threat to effectively deter the threat. The robot swarm of flying aerial robot further includes one or more of the aerial robots emitting a light deterrent and/or sound deterrent.

In one embodiment, a robot includes a physical deterrent 122, or a deterrent that is carried by the robot and delivered to the threat, such as being projected at a threat, such as pepper spray 124, a stunning device 125, a net, a projectile such as a bullet, a fluid such as a dye or foul-smelling fluid. One or more of the robots, such as an aerial robot is operable to dispense pepper spray at a threat to effectively deter the threat from proceeding. When a dye is dispensed by a robot on a threat, the dye helps authorities to later identify the threat as they leave the area. A stunning device includes electrodes to deliver an electrical shock and this disables the threat temporarily. The robot is operable to project the electrodes at the threat or deliver the electrodes to the threat, such as by intercepting with the threat. An aerial robot is operable to fly into the threat with an electrode armed to deliver the stunning and immobilizing electric shock. Likewise, a robot is operable to project a net over a threat. When the threat is disabled by the pepper spray, a stunning device, or by a net, an administrator and/or the authorities are contacted by the AI EM system, including directly by the robot. A very bright light, or flashing light, as well as an alarm or siren is used as a deterrent that is projected at a threat, as described herein.

A robot is operable to be weaponized to do bodily harm and is configured with a weapon, such as a gun to shoot a projectile into a threat, or a piercing object, such as a knife or spear. In one embodiment, a robot is configured to project the bullet, knife or spear at the threat from a distance, or delivery a projectile to a threat when they intercept the threat, such as by flying into the threat. A small charge projects a bullet into the threat when the aerial robot intercepts the threat. In one embodiment, a knife or spear is retractable and is deployed prior to intercepting with a threat. Alternatively, a robot is weaponized with a weapon intended to temporarily incapacitate an individual such as a TASER, TASER darts, a stun gun, and/or tranquilizer darts. In one embodiment, a robot is operable to enter a structure through a variety of entry points, such as through a vent, a window, or a door. The robot is operable to create an ingress point by breaking glass or another material in a window or door using a projectile. Alternatively, the robot is operable to break a wire or mesh screen covering an open window. By enabling the robot to enter a structure when a threat is detected, the robot provides additional security for occupants of the structure.

The AI EM system is activated when unauthorized persons or activity is detected by the EM device and/or when inputs are received by the system (e.g., from a mobile device), smart mobile device, smart wearable device, or other input device, thereby enabling monitoring and surveillance by the robot(s) and/or through the AI EM system or EM device. In one embodiment, the robots are configured to travel in a programmed path in a routine manner to provide improved surveillance of the premises. The AI EM system is operable to program the robot or robots to fly around the building such as a home every 10 minutes, or have one of the aerial robots flying in a prescribed path while the other robots remain stationed on their docking stations based on input received (e.g., via the user device). The robots are operable to alternate which one is conducting a surveillance, or patrol, route, such as a surveillance flight path around a building, for example. Other flight maneuvers are programmed in as well, such as a deterring and coordinated flight path by a plurality of aerial robots. An administrator user device is operable to control when the aerial robots run surveillance and to direct aerial robots to return to a docking station, such as when bad weather is approaching.

Robots are configured to communicate directly with each other, wherein when a first aerial robot finishes a surveillance route or flight path, it is operable to communicate with a second aerial robot which is then operable to fly a surveillance route before docking and communicating with the first or another, third aerial robot. The robots also communicate collectively with the controller or the EM system, and/or an authority, such as the police when required, such as when an intruder is detected or when requested by an administrator.

A robot is configured within a building, such as within a home and is configured to open an access point, such as the door for greeting a person or visitor or delivery person. The robot is operable to produce an audible greeting to the person and this audible greeting includes a customized greeting as the AI EM system opens another access point for delivery of a package or give logistic instruction to the person. The robot is operable to take a package from the person and deliver the package to an access point such as to a storage container or inside of the home, behind a door which is an access point. The robot is configured with a camera to scan a package including an address, or code, such as a bar or QR code to determine what the appropriate action should be with respect to the package. The AI EM system in combination with the robot(s) is operable to act as a security system around an access point, such as around a home or storage container.

In one embodiment, one or more robots include at least one container including powder or other fine particulates connected to at least one nozzle for spraying small amounts of the powder on a location in front of the one or more robots. In one embodiment, the one or more robots further include at least one ultraviolet light-emitting diode (or other ultraviolet light emitting device). In one embodiment, when responding to an alarm from at least one entry management device, if the one or more robots detect that at least one door or window is opened without authorization, the one or more robots spray a portion of the door or window (e.g., a handle) with powder, shines the at least one ultraviolet light on the spray location, and takes a photograph and/or video of the spray location to identify any potential fingerprints as quickly as possible. In one embodiment, the photograph and/or video is transmitted to at least one user device and/or to at least one relevant police authority reporting system.

Data recorded by the AI EM system including images, including still and videos, and audio recording captured by the AI EM device or robot(s) is stored on a SIM card or a local data storage device, and/or is uploaded to the cloud for safety and security. The AI EM system is configured to display the recorded files and to identify a threat and/or a threat's vehicle based on the recorded files. As described herein, the robots are operable to be programed to capture images of license plate and/or other identifying features of a threat or a threat's vehicle.

The GPS application comprises a device capable of being tracked by GPS. The device is a mobile device or other device capable of being tracked by GPS. When the GPS device and the host device are in proximity, access and/or messaging and logistics is triggered. The host device is an AI device. The robots include a GPS application.

According to another embodiment of the invention, access and/or messaging is triggered when a linked mobile device is within a predetermined distance of a particular address. In such embodiment, a host device is not needed.

According to another embodiment of the invention, the MALT system comprises a transponder device that is positioned at a specific location, such as a location where a delivery is to be made. The transponder device is used to identify the location of an object or location not associated with an address or landmark. This is particularly useful for rural delivery locations that do not have a valid or determinable address. For example, the transponder device is positioned on a mailbox or house where a delivery is to be made.

In one embodiment, the transponder device is a GPS transponder that transmits a signal to a receiver device. The transponder device is positioned at a particular location, such as a storage facility, building or house, or on a particular object, such as a box or container. The receiver device is a GPS-integrated smartphone with GPS tracking software. The transponder is positioned at a location where an item is to be delivered. The receiver smartphone is provided to a delivery person responsible for delivering the item. The transponder transmits a signal to the smartphone guiding the delivery person to the transponder.

The transponder has an identifier number or signal that is programmed into a device or a master server, or other designated application. The designated controller device or application programs the transponder to transmit a signal to one or more receiving devices, such as a mobile phone or other device, utilizing GPS capabilities.

The GPS transponder is operable to serve as a guide to a specific box, package, location or object that does not have an association with a GPS address in a mapping application. The transponder is operable to confirm the correct and appropriate match with a receiver device when identified. The transponder serves as a beacon/locator device for deliveries or pickup.

The system is operable to be used by delivery personnel to facilitate delivery of an item. The system is operable to be used by first responders, such as law enforcement officers, fire fighters and emergency medical personnel, to help them find a particular location. The system is operable to be used in any circumstance to help locate a stationary structure or moveable object.

The GPS transponder is preferably physically attached to or built into devices, boxes, or objects. The transponder is reusable and added and removed for similar uses. The transponder is disposable.

The transponder is operable to be utilized to assist a delivery person locate a specific package or mailbox within a high-rise building or apartment. The transponder is utilized to identify or locate a package, mailbox or location when weather or other conditions interfere with GPS mapping satellites.

Once the transponder and the receiver establish a match, the transponder is operable to be reprogrammed to match with other receivers. The transponder is operable to be programmed to signal one or more receivers. The transponder utilizes GPS technology to assist in establishing a relationship with one or more receivers. The GPS transponder is battery powered or hardwired if at a fixed location.

According to an embodiment of the invention, the system is used to track the location of a package. The GPS transponder is fixed to the package and transmits a signal to the receiver indicating the location of the package.

According to an embodiment of the invention, the system includes a container that is adapted to automatically open when the receiving device is within a specific range or proximity of the transponder.

According to an embodiment of the invention, an action is triggered when the receiver device (e.g., smartphone, smart wearable device) comes within a certain range or proximity of the transponder. In one embodiment, the action is a text message provided to the smartphone, or the event is access granted to the building where the transponder is located. Access is granted by unlocking an electronic lock on door of the building.

In an alternative embodiment, the transponder functions outside of a GPS network and is independent of GPS. The transponder utilizes a unique identifier network.

The AI EM system as disclosed herein is further operable for security applications including vault security systems, object security systems, art work security systems, security surveillance systems, factory security, machine security, and theft protection systems.

The AI EM system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AI EM system is operable to use any of the aforementioned learning techniques alone or in combination. In one embodiment, the AI EM system or device utilizes an autoregressive language model that uses deep learning such as Generative Pre-trained Transformer 3 (GPT-3).

Further, the AI EM system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AI EM system is preferably operable to recommend and/or perform actions based on historical data, external data sources, ML, AI, NNs, and/or other learning techniques. The AI EM system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques. In one embodiment, the AI EM system is operable to suggest an electronic device to incorporate into the AI EM system, such as a camera or a robot, based on future predictions and/or models of foot traffic, vehicles, deliveries, etc. In another embodiment, the AI EM system is operable to suggest products or services based on analysis of data from deliveries or data captured from service providers, such as logos or names from vehicles in an area. In yet another embodiment, the AI EM system is operable to suggest a service to an owner or manager of a property. By way of example, an entry management device or other device connected to the software platform is operable to capture imagery data of a yard and recommend a yard maintenance service to the owner or manager based on the length of the grass, presence of weeds, or lack of landscaping plants. Alternatively, the software platform is operable to create a calendar event for the owner or the manager to perform yard maintenance. In another example, a driveway is analyzed by the entry management device or another device connected to the software platform, and based on the analytics, it is determined that the driveway needs repair. In another embodiment, areas of moisture are detected using the entry management device or another device connected to the software platform, and an alert is sent to the owner or manager. In yet another embodiment, an alert is generated when the entry management device or another device connected to the software platform detects that a trash bin or recycling bin is not at a pickup location for trash/recycling pickup the on a certain time the night before the trash/recycling pickup, such as 7 pm on a Tuesday night before Wednesday morning trash/recycling pickup.

In yet another embodiment, the entry management device or access management device of the present invention is installed in a structure during construction of the structure or a structure that is under construction. During construction or under construction means that the structure is not yet inhabitable, has not been completed or finished, and/or has not passed the required inspections by the relevant city or county agencies. The entry management device or access management device is operable to be installed during construction of the frame of a structure in one embodiment. The entry management device or access management device is operable to remain in the structure after construction is completed and function as an entry management device or access management device for the completed structure as described herein. In another embodiment, the entry management device or access management device is installed in a contractor trailer or other standalone structure to facilitate communication among personnel involved in the construction of a structure and an owner of the structure. In one embodiment, the entry management device or access management device of the present invention provides for facial recognition of personnel involved in construction of the structure and logs information including an identity of the personnel, a time the personnel was scanned by the entry management device or access management device, and other pertinent information in a log stored on the platform of the present invention. In this manner, a log of all people who have worked on the construction of a structure is created, enabling an owner of the entry management device or access management device to identify the appropriate people in the event of a security issue or workmanship issue.

Advantageously, the entry management device or access management device of the present invention provides for voice recording of messages to deliver to another party in an audio form, text form, or other form. Traditionally, messages between parties working on a construction project or messages between these parties and other parties with an interest in the project, such as the owner or inspectors, are communicated in an ad hoc or disorganized fashion, such as by leaving paper notes (sticky notes) in locations on a property or by sending a one-off text message or email. The present invention provides a solution to this problem through the use of a centralized entry management or access management device which is operable to deliver messages associated with the construction project. The voice recordings are operable to be delivered to the other party upon the other party accessing the entry management device or access management device via a virtual key or other access means, or upon the access management device or entry management device recognizing the other party via facial recognition or receiving and recognizing a unique device identifier emitted from a device associated with the other party. The entry management device or access management device is operable to receive an indication of one or more recipients of the message by a vocal instruction included in the message (e.g., send this message to John and Austin). A format of the message for the recipients is also operable to be identified via vocal command (e.g., send this message to John and Austin via email). Alternatively, a format of the message is selected on an application running on an electronic device of the recipient (email, text message, audio message, etc.). In another embodiment, the entry management device or access management device is operable to receive a command to send a message to a particular pre-defined group of people, with the group of people having been pre-defined in the platform of the present invention (e.g., send this message to all subs). The entry management or access management device of the present invention is operable to respond with a list of all personnel who will receive the message in one embodiment to verify that the recipient list is correct. In another embodiment, a unique virtual key on a device of a sender of the message is scanned by the entry management device or access management device to determine which accounts or devices should receive the message. In this example, the unique virtual key unlocks the access management device or entry management device and provides an indication of the recipient of the message simultaneously. The sender is operable to be identified by the entry management device or access management device of the present invention by facial recognition, voice recognition, or by a unique virtual key scanned by the entry management device or access management device. Alternatively, the entry management device or access management device is operable to receive an audio input of the name of the sender of the message. The access management device or entry management device is operable to look up the sender in a database on the software platform to determine a full name of the sender, a role or title of the sender (subcontractor, general contractor, etc.), and to determine permissions of the sender of the message. In one embodiment, subcontractors are not permitted to send a message to an owner of the construction project directly, and only general contractors are permitted to send a message to an owner of the construction project. The software platform is operable to verify a permission of the sender based on the identity of the sender and the identity of the recipient before completing transmission of the message. Permissions are operable to be stored in the database on the platform of the present invention.

In one embodiment, the audio from the voice recordings is transcribed into text and delivered to another party via an email communication or a short message service (SMS) text communication or other form of text communication. In one embodiment, the voice recording and/or text communication is sent through the entry management device or access management device to an application on a mobile device. The mobile device is operable to display a notification including the text and/or the audio via a push notification. The present invention is advantageous in providing communication between subcontractors, between a general contractor and a subcontractor, between an owner and a general contractor, between a general contractor and inspections personnel, and/or communication between any other parties involved with or with an interest in the construction process. In one embodiment, the entry management device or access management device is operable to create a record of a construction project, including information about progress within each stage of the project and completion of the project. For example, the entry management device or access management device is operable to receive an indication from a general contractor that electrical and plumbing work is complete, record the completion date and time of the electrical and plumbing work, and notify personnel responsible for installing insulation that insulation installation is needed via a SMS text message or text or audio message in a mobile application. By creating a log of all steps in the construction process, the present invention provides transparent documentation for parties involved with the construction process, including the owner of the structure, to track and review the progress of the project. In one embodiment, device associated with the owner of the structure receives a notification such as a SMS text message or text or audio message in a mobile application, upon completion of a phase of a construction project.

In one embodiment, the entry management device or access management device of the present invention provides for ordering of supplies or materials through a connection to an online ecommerce platform of a company such as AMAZON, LOWES, or HOME DEPOT. The entry management device or access management device is operable to engage in a conversation with a person ordering the supplies or materials and confirm the type of product and amount of product required. In one embodiment, the entry management device or access management device must receive a virtual key or access key to authorize ordering the supplies or materials. Goods which are operable to be shipped or delivered to the construction site are automatically delivered to the address associated with the entry management device or access management device upon being ordered in one embodiment.

Any of the communications described above are operable to be transmitted via text, email, audio, or any other means known in the art.

Figure 19:
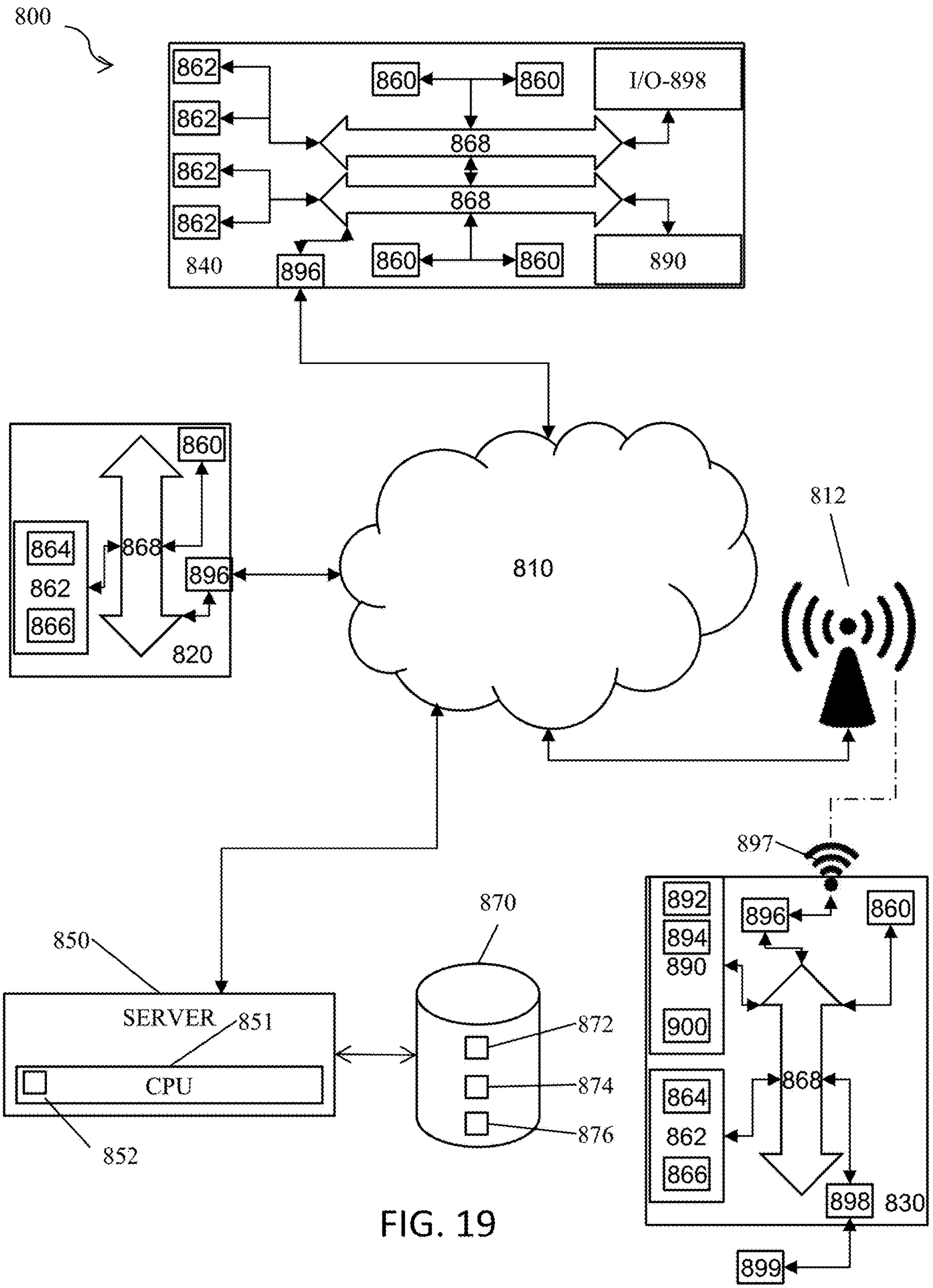
FIG. 19 is a schematic diagram of a system of the present invention.

FIG. 19 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random-access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 19, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that is operable to be used to store the computer readable instructions and which is operable to be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 19, is operable to include other components that are not explicitly shown in FIG. 19, or is operable to utilize an architecture completely different than that shown in FIG. 19. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An access management system comprising:

an access management device including a processor, a memory, and a microphone; and a software platform including at least a processor and a memory;

wherein the access management device is operable to receive audio via the microphone;

wherein the access management device is operable to send audio or a transcription of the audio to the software platform upon validation of a virtual key, which upon validation, indicates a sender account associated with the audio is authorized to send the audio through the software platform;

wherein the software platform is operable to send the audio or the transcription of the audio to at least one recipient account;

wherein a log is updated on the software platform based on the audio or the transcription of the audio, wherein the update to the log indicates completion of a portion of a construction project; and wherein the software platform sends an update message to a third account based on the update to the log.

2. The access management system of claim 1, wherein the audio or the transcription of the audio is sent via email to the at least one recipient account.

3. The access management system of claim 1, wherein the software platform is operable to send the audio or a transcription of the audio to the software platform upon validation of an identity of the sender account associated with the audio and upon validation that the sender account is authorized to communicate with the at least one recipient account.

4. The access management system of claim 1, wherein the audio or the transcription of the audio is sent via an electronic mail communication to the at least one recipient account.

5. The access management system of claim 1, wherein the audio or the transcription of the audio is sent via a short message service (SMS) text message to the at least one recipient account.

6. The access management system of claim 1, wherein the audio or the transcription of the audio is sent via a mobile application push message to the at least one recipient account.

7. The access management system of claim 1, wherein the access management device is installed in a structure which is under construction.

8. The access management system of claim 1, wherein the software platform is operable to communicate with an electronic commerce platform, wherein the audio received via the microphone includes an order for goods or services from the electronic commerce platform, and wherein the software platform is operable to order the goods or the services from the electronic commerce platform upon authorizing an identity of a user associated with the audio.

9. The access management system of claim 8, wherein the authorization of the identity of the user associated with the audio is accomplished via voice recognition, facial recognition, or recognition of a virtual key associated with the user.

10. An access management system comprising:

an access management device including a processor, a memory, a camera, and a microphone; and a software platform including at least a processor and a memory;

wherein the access management device is operable to receive audio via the microphone;

wherein the software platform is operable to authorize an identity of a user associated with the audio via voice recognition, facial recognition, or recognition of a virtual key associated with the user upon the audio or an image including facial features of the user or the virtual key associated with the user being captured by the access management device;

wherein the access management device is operable to send the audio or a transcription of the audio to the software platform upon authorization of the identity of the user;

wherein the software platform is operable to send the audio or the transcription of the audio to at least one recipient account; and wherein a log is updated on the software platform based on the audio or the transcription of the audio, wherein the update to the log indicates an identity of the user associated with the audio and an action associated with the audio.

11. The access management system of claim 10, wherein the access management device is installed in a structure which is under construction, wherein the access management device is affixed to a portion of the structure, and wherein the access management device is operable to be utilized for access management of the structure upon completion of the construction of the structure.

12. The access management system of claim 10, wherein the access management device is operable to capture images of people passing by the access management device via the camera of the access management device, wherein the access management device is operable to send the images of people to the software platform, and wherein the software platform is operable to create a log of the people who have passed by the access management device including a time each person passed by the access management device.

13. The access management system of claim 12, wherein the software platform is operable to determine an identity of each person using facial recognition, wherein the software platform is operable to include an identity of each person in the log.

14. The access management system of claim 10, wherein the audio or the transcription of the audio is sent via a short message service (SMS) text message, an email communication, or a mobile application push message to the at least one recipient account.

15. An access management system comprising:

an access management device including a processor, a memory, a camera, and a microphone; and a software platform including at least a processor and a memory;

wherein the access management device is operable to receive audio via the microphone;

wherein the access management device is operable to send the audio or a transcription of the audio to the software platform;

wherein the audio or the transcription of the audio includes at least one recipient account;

wherein the software platform is operable to send the audio or the transcription of the audio to the at least one recipient account;

wherein the software platform is operable to authorize an identity of a user associated with the audio via voice recognition, facial recognition, or recognition of a virtual key associated with the user upon the audio or an image including facial features of the user or the virtual key associated with the user being captured by the access management device;

wherein the access management device is operable to send the audio or a transcription of the audio to the software platform upon authorization of the identity of the user;

wherein a log is updated on the software platform based on the audio or the transcription of the audio, wherein the update to the log indicates completion of a portion of a construction project; and wherein the software platform sends an update message to a third account based on the update to the log.

16. The access management system of claim 15, wherein the update to the log indicates an identity of the user associated with the audio and an action associated with the audio.

* * * * *